United States Patent
Ko et al.

(10) Patent No.: US 9,680,552 B2
(45) Date of Patent: Jun. 13, 2017

(54) METHOD AND APPARATUS FOR REPORTING CHANNEL STATE INFORMATION IN WIRELESS COMMUNICATION SYSTEM

(71) Applicant: LG ELECTRONICS INC., Seoul (KR)

(72) Inventors: Hyunsoo Ko, Seoul (KR); Jiwon Kang, Seoul (KR); Kilbom Lee, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/779,925

(22) PCT Filed: Apr. 7, 2014

(86) PCT No.: PCT/KR2014/002985
§ 371 (c)(1),
(2) Date: Sep. 24, 2015

(87) PCT Pub. No.: WO2014/171658
PCT Pub. Date: Oct. 23, 2014

(65) Prior Publication Data
US 2016/0050006 A1    Feb. 18, 2016

Related U.S. Application Data

(60) Provisional application No. 61/812,682, filed on Apr. 16, 2013.

(51) Int. Cl.
*H04B 7/04* (2017.01)
*H04B 7/06* (2006.01)
(Continued)

(52) U.S. Cl.
CPC ......... *H04B 7/0634* (2013.01); *H04B 7/0478* (2013.01); *H04B 7/0617* (2013.01); *H04B 17/00* (2013.01); *H04W 72/0406* (2013.01)

(58) Field of Classification Search
None
See application file for complete search history.

(56) References Cited

U.S. PATENT DOCUMENTS

2012/0134334 A1    5/2012    Ko et al.
2012/0155561 A1*   6/2012    Seo .................... H04B 7/15542
                                                    375/260
(Continued)

FOREIGN PATENT DOCUMENTS

JP      2013-502135       1/2013
KR      10-2011-0091839   8/2011
(Continued)

OTHER PUBLICATIONS

PCT International Application No. PCT/KR2014/002985, Written Opinion of the International Searching Authority dated Jun. 26, 2014, 13 pages.

(Continued)

*Primary Examiner* — Chi H Pham
*Assistant Examiner* — Soon-Dong D Hyun
(74) *Attorney, Agent, or Firm* — Lee Hong Degerman Kang Waimey

(57) ABSTRACT

The present invention relates to a wireless communication system and, more specifically, to a method and an apparatus for reporting channel state information (CSI). Particularly, the method comprises the steps of: receiving a reference signal (RS) from a base station; and reporting, to the base station, the CSI generated by using the RS, wherein the CSI is measured on the basis of a specific CSI-RS set among a plurality of CSI-RS sets, beamforming weight vectors in a (Continued)

vertical domain which are set differently for each of horizontal domain antenna ports to which the same beamforming weight vectors in a vertical domain is applied.

11 Claims, 25 Drawing Sheets

(51) Int. Cl.
　　*H04W 72/04* 　　(2009.01)
　　*H04B 17/00* 　　(2015.01)

(56) References Cited

U.S. PATENT DOCUMENTS

| | | | |
|---|---|---|---|
| 2012/0213111 A1 | 8/2012 | Shimezawa et al. | |
| 2013/0156001 A1* | 6/2013 | Gomadam | H04W 72/0406 370/330 |
| 2013/0329649 A1* | 12/2013 | Wernersson | H01Q 3/00 370/329 |
| 2013/0329772 A1* | 12/2013 | Wernersson | H01Q 3/00 375/219 |
| 2014/0018115 A1* | 1/2014 | Zhuang | H04B 7/024 455/501 |
| 2014/0177744 A1* | 6/2014 | Krishnamurthy | H04B 7/0469 375/267 |
| 2015/0180628 A1* | 6/2015 | Kim | H04B 7/0667 370/336 |
| 2015/0382205 A1* | 12/2015 | Lee | H04B 7/0417 370/329 |

FOREIGN PATENT DOCUMENTS

| | | |
|---|---|---|
| WO | 2013/024350 | 2/2013 |
| WO | 2013/048030 | 4/2013 |

OTHER PUBLICATIONS

PCT International Application No. PCT/KR2014/002985, Written Opinion of the International Searching Authority dated Jun. 26, 2014, 15 pages.

* cited by examiner

FIG. 5
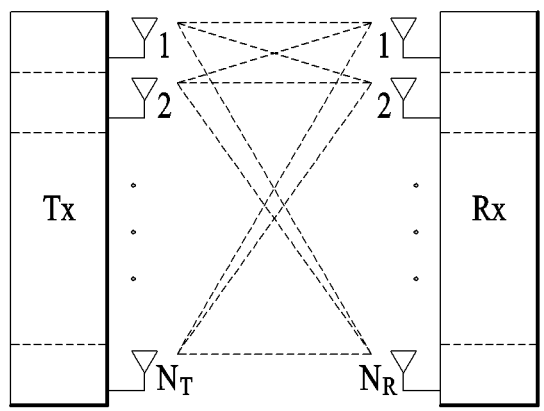
(a)
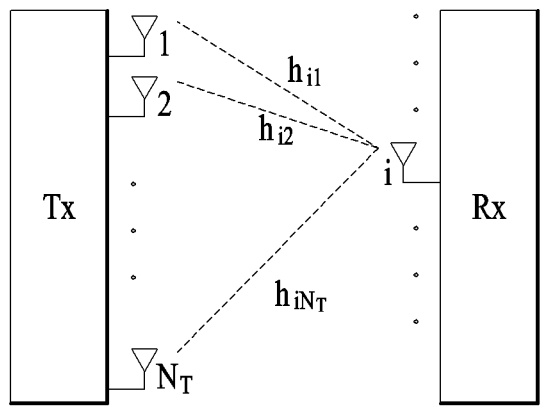
(b)

FIG. 10
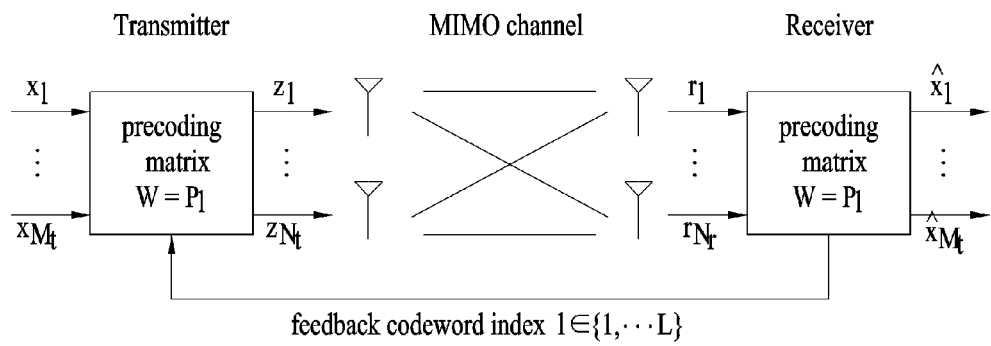
FIG. 11
(a) 
(b) 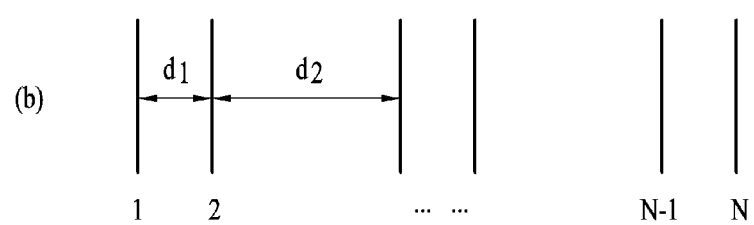
(c) 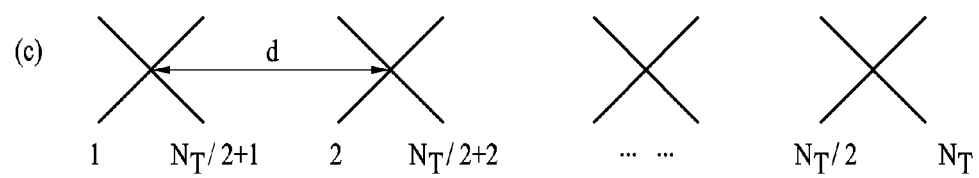

(a)　　　　　　　　　　　(b)

(a)        (b)

FIG. 17
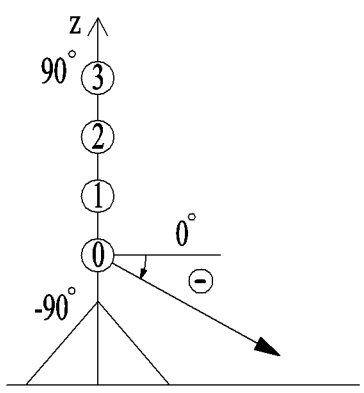
(a)
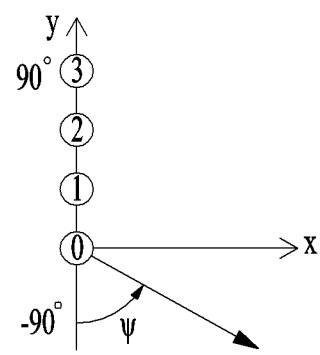
(b)

FIG. 18
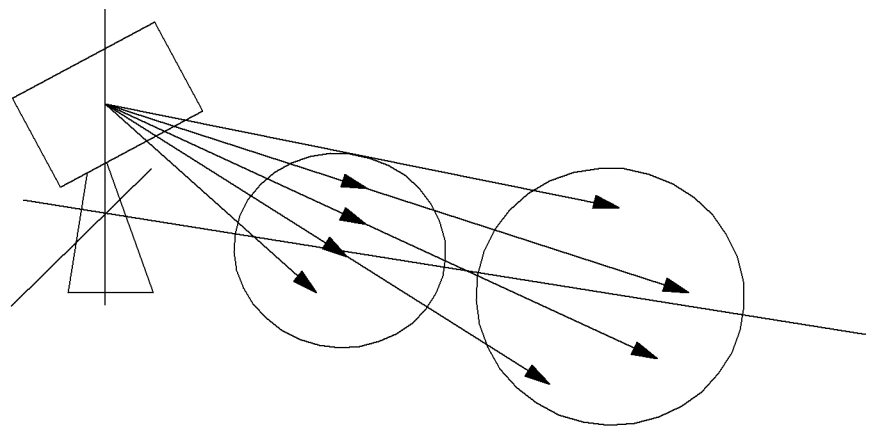
(a)
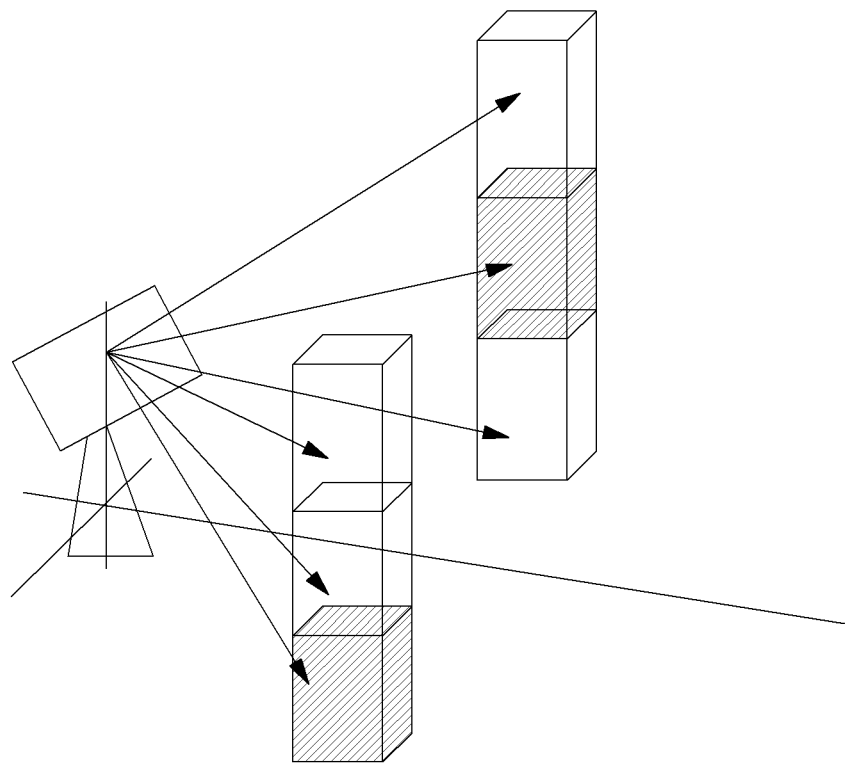
(b)

FIG. 19
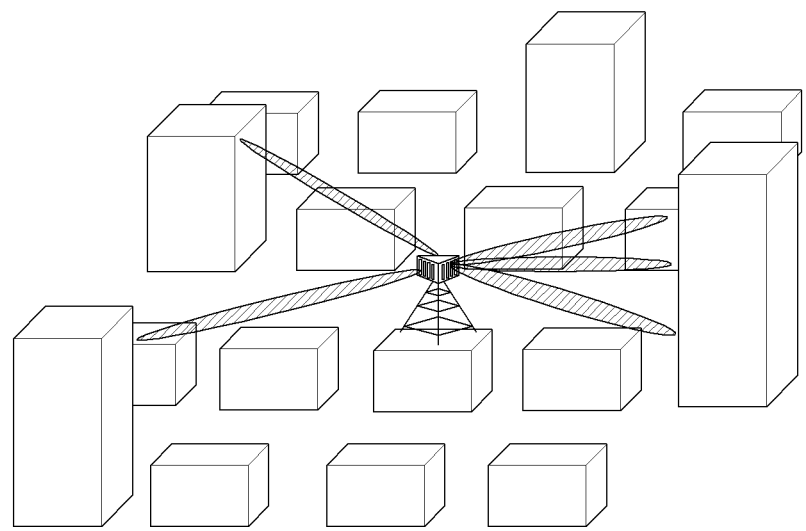
(a)
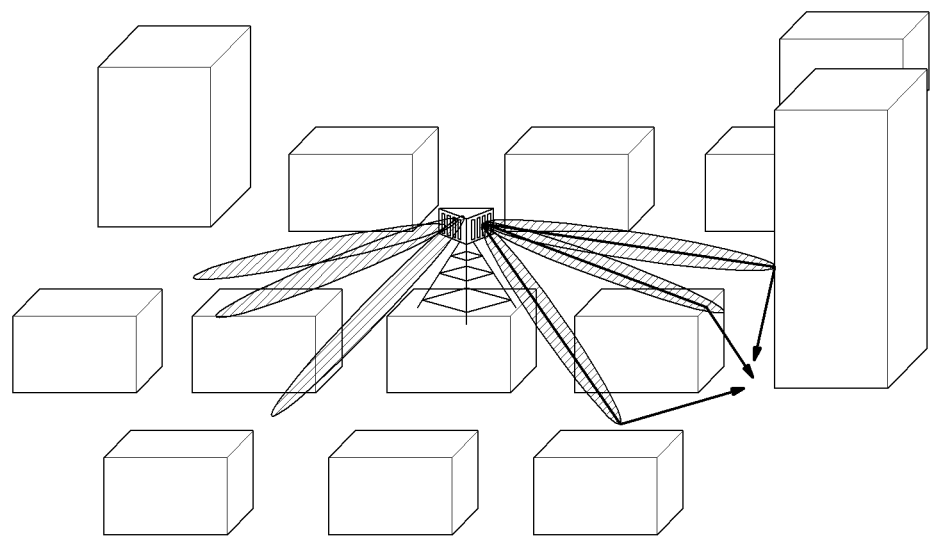
(b)

FIG. 20D
8Tx (H) - 8 ports (V)

| | | | | | | | |   -56...63

| | | | | | | | |   -48...55

| | | | | | | | |   -40...47

| | | | | | | | |   -32...39

| | | | | | | | |   -24...31

| | | | | | | | |   -16...23

| | | | | | | | |   -8...15

| | | | | | | | |   -0...7

FIG. 21A
8Tx (H) - 1 ports (V)
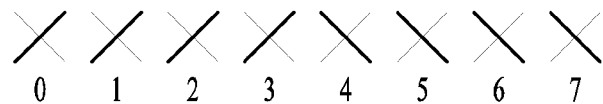
0   1   2   3   4   5   6   7
FIG. 21B
8Tx (H) - 2 ports (V)
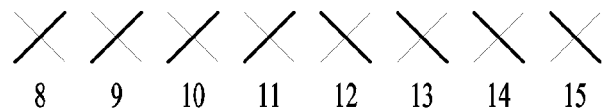
8   9   10   11   12   13   14   15
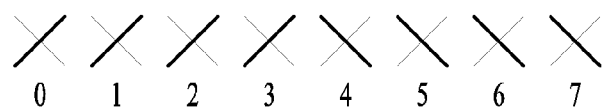
0   1   2   3   4   5   6   7
FIG. 21C
8Tx (H) - 4 ports (V)
 -24…31
 -16…23
 -8…15
 -0…7

8Tx (H) - 1 ports (V)

16Tx (H) - 2 ports (V)

32Tx (H) - 4 ports (V)

64Tx (H) - 8 ports (V)

FIG. 23A
8Tx (H) - 1 ports (V)
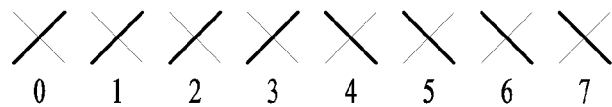
0    1    2    3    4    5    6    7
FIG. 23B
16Tx (H) - 2 ports (V)
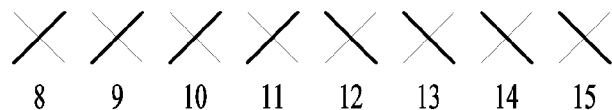
8    9    10    11    12    13    14    15
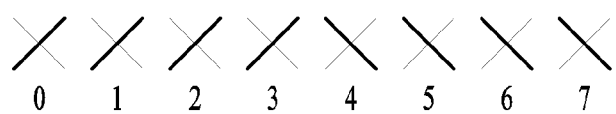
0    1    2    3    4    5    6    7
FIG. 23C
32Tx (H) - 4 ports (V)
 -24…31
 -16…23
 -8…15
 -0…7

METHOD AND APPARATUS FOR REPORTING CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2014/002985, filed on Apr. 7, 2014, which claims the benefit of U.S. Provisional Application No. 61/812,682, filed on Apr. 16, 2013, the contents of which are all hereby incorporated by reference herein in their entirety.

TECHNICAL FIELD

The present invention relates to a wireless communication system and, more particularly, to a method for reporting channel state information (CSI) in a wireless communication system, and an apparatus therefor.

BACKGROUND ART

Multiple-Input Multiple-Output (MIMO) technology is a technology capable of improving data transmission/reception efficiency using multiple transmit (Tx) antennas and multiple receive (Rx) antennas instead of using a single Tx antenna and a single Rx antenna. A receiver using a single antenna receives data through a single antenna path, but a receiver using multiple antennas receives data through multiple paths. Accordingly, data transfer rate and data throughput may be improved, and coverage may be expanded.

To increase a multiplexing gain of MIMO operation, a MIMO transmitter may receive and use channel state information (CSI) fed back from a MIMO receiver. The receiver may determine CSI by performing a channel measurement using a predefined reference signs (RS) from the transmitter.

DISCLOSURE OF THE INVENTION

Technical Task

An object of the present invention devised to provide a method of generating and reporting CSI for supporting a 2-dimensional antenna structure correctly and efficiently.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these and other advantages and in accordance with the purpose of the present invention, as embodied and broadly described, according to one embodiment, a method of reporting channel state information (CSI), which is reported by a user equipment in a wireless communication system, includes the steps of receiving a reference signal from a base station and reporting the CSI generated using the reference signal to the base station. In this case, the CSI is measured based on a specific CSI-RS set among a plurality of CSI-RS sets (channel state information-reference signal sets), a vertical domain beamforming weight vector differently configured according to each CSI-RS set is applied to a plurality of the CSI-RS sets and each CSI-RS set is generated for a plurality of horizontal domain antenna ports to which an identical vertical domain beamforming weight vector is applied.

Preferably, the specific CSI-RS set is configured in a manner of combining vertical domain antenna ports selected from each of a plurality of the CSI-RS sets with each other and the vertical domain antenna ports have an identical horizontal domain antenna port index.

Preferably, the specific CSI-RS set is configured in a manner of combining vertical domain antenna ports selected from each of a plurality of the CSI-RS sets with each other and the vertical domain antenna ports have an index preferred by the user equipment in a predefined codebook.

Preferably, the CSI includes channel state information measured according to a plurality of the CSI-RS sets and channel state information measured in a manner of combining specific vertical domain antenna ports among a plurality of the CSI-RS sets. More preferably, if a plurality of vertical domain antenna ports are measured in a manner of being combined with each other, the CSI includes a single PMI (single precoding matrix index).

Preferably, the CSI includes an average CSI for all CSI-RS ports associated with the CSI-RS set and a CQI (channel quality indicator) for each of a plurality of the CSI-RS sets.

Preferably, the specific CSI-RS set is configured by antenna ports precoded using a vertical beamforming weight vector. More preferably, the antenna ports correspond to one of a UE-specific antenna port and a cell-specific antenna port. More preferably, the CSI includes at least one selected from the group consisting of an index of a preferred antenna port, index strength of an antenna port, strength of all measured antenna ports and information on a precoding used for a combination of antenna ports.

Preferably, a plurality of the CSI-RS sets are configured via RRC signaling from the base station.

To further achieve these and other advantages and in accordance with the purpose of the present invention, according to one embodiment, a user equipment reporting channel state information (CSI) in a wireless communication system includes a radio frequency unit and a processor, the processor configured to receive a reference signal from a base station, the processor configured to report the CSI generated using the reference signal to the base station. In this case, the CSI is measured based on a specific CSI-RS set among a plurality of CSI-RS sets (channel state information-reference signal sets), a vertical domain beamforming weight vector differently configured according to each CSI-RS set is applied to a plurality of the CSI-RS sets and each CSI-RS set is generated for a plurality of horizontal domain antenna ports to which an identical vertical domain beamforming weight vector is applied.

It is to be understood that both the foregoing general description and the following detailed description of the present invention are exemplary and explanatory and are intended to provide further explanation of the invention as claimed.

Advantageous Effects

According to the present invention, a new method of generating and reporting CSI for supporting a 2-dimensional antenna structure correctly and efficiently can be provided.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

FIG. 5 shows the configuration of a wireless communication system including multiple antennas;

FIG. 10 is a diagram for explaining a basic concept of a codebook-based precoding;

FIG. 11 is a diagram for examples of configuring 8 transmission antennas;

FIG. 17 is a diagram for explaining different definition on an angle direction;

FIG. 18 is a diagram for examples of beamforming according to 2-dimensional antenna configuration;

FIG. 19 is a diagram for explaining examples of vertical beamforming;

BEST MODE

Mode for Invention

Figure 1:
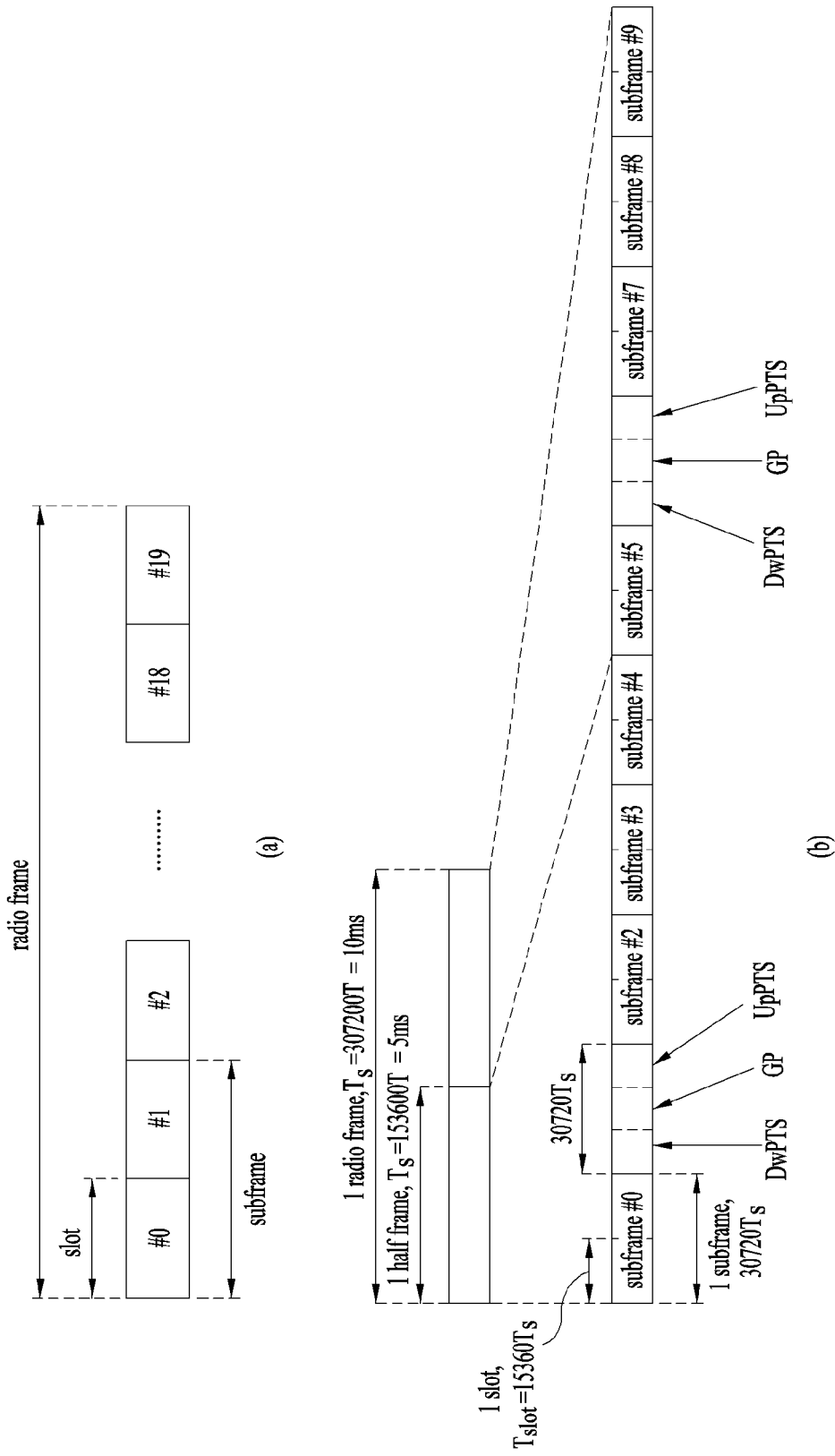
FIG. 1 exemplarily shows a radio frame structure.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on the data transmission and reception between a base station BS and a user equipment UE. In this case, the base station BS means a terminal node of a network, which performs direct communication with the user equipment UE. A specific operation which has been described as being performed by the base station may be performed by an upper node of the base station BS as the case may be.

In other words, it will be apparent that various operations performed for communication with the user equipment UE in the network which includes a plurality of network nodes along with the base station may be performed by the base station BS or network nodes other than the base station BS. At this time, the base station BS may be replaced with terms such as a fixed station, Node B, eNode B (eNB), and an access point (AP). A relay node may be replaced with terms such as a relay node (RN) and a relay station (RS). Also, a terminal may be replaced with terms such as a user equipment (UE), a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

FIG. 1 exemplarily shows a radio frame structure.

In a cellular OFDM wireless packet communication system, an uplink/downlink data packet is transmitted on a eme basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PDSCH).

FIG. 1(b) illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The radio frame can be configured differently according to duplex mode. Downlink transmission is discriminated from uplink transmission by frequency in FDD (Frequency Division Duplex) mode, and thus the radio frame includes only one of a downlink subframe and an uplink subframe in a specific frequency band.

Figure 2:
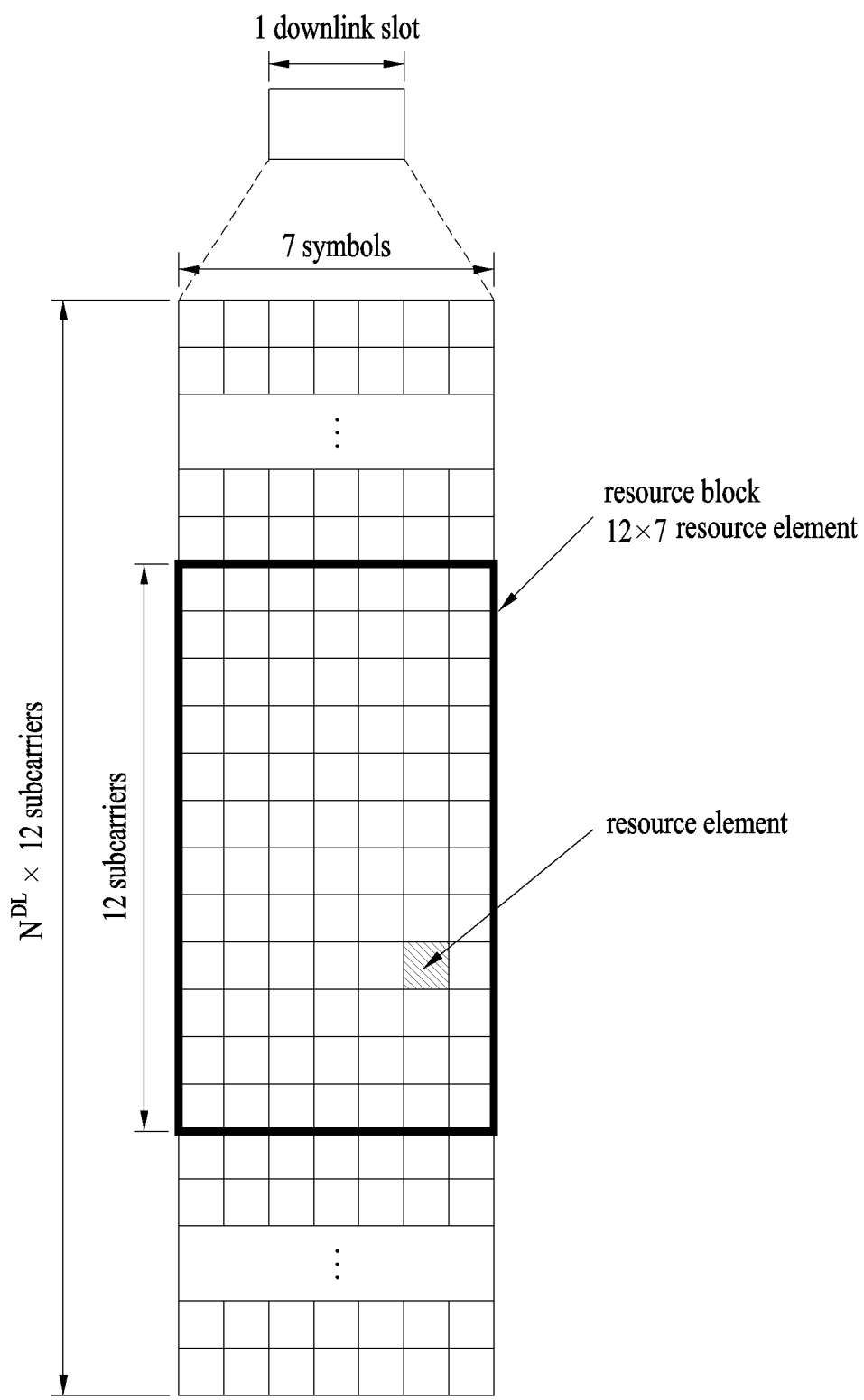
FIG. 2 exemplarily shows a resource grid of a downlink slot.

FIG. 2 illustrates a resource grid for a downlink slot.

A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, $N^{DL}$ depends on a downlink transmission bandwidth. An uplink slot may have the same structure as a downlink slot.

Figure 3:
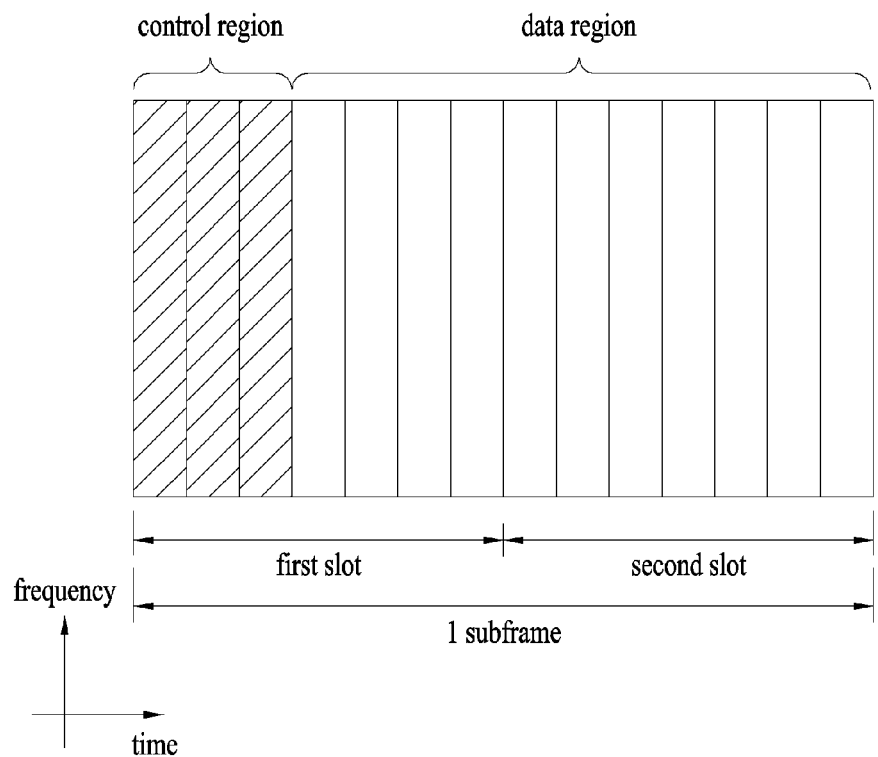
FIG. 3 exemplarily shows a downlink subframe structure.

FIG. 3 illustrates a downlink subframe structure.

Up to three OFDM symbols at the start of the first slot in a downlink subframe are used for a control region to which control channels are allocated and the other OFDM symbols of the downlink subframe are used for a data region to which a PDSCH is allocated.

Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs.

A PDCCH is formed by aggregation of one or more consecutive Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs.

An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
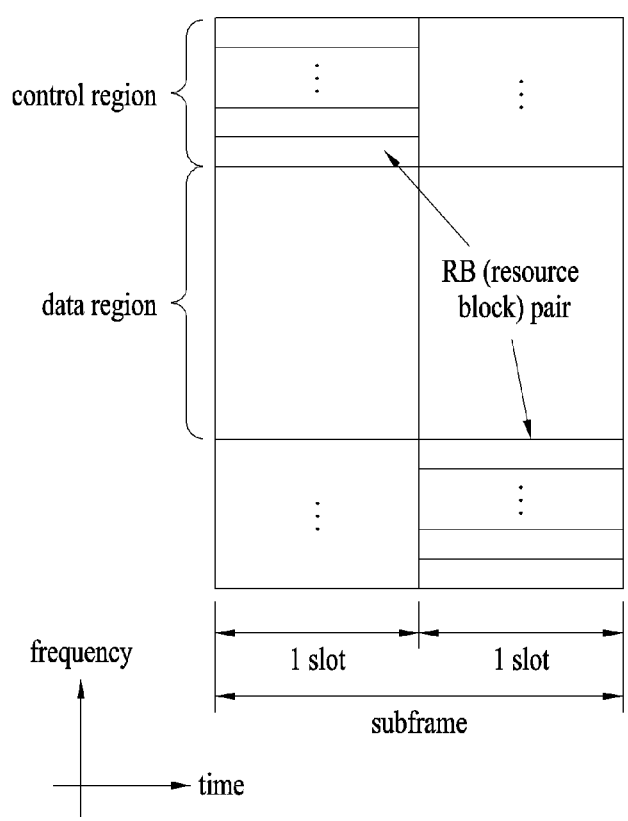
FIG. 4 exemplarily shows an uplink subframe structure.

FIG. 4 illustrates an uplink subframe structure.

An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

MIMO) System Modeling

FIG. 5 shows the configuration of a wireless communication system including multiple antennas.

As shown in FIG. 5(a), when both the number of transmit (Tx) antennas and the number of Rx antennas are increased respectively to $N_T$ and $N_R$, a theoretical channel transmission capacity of the MIMO communication system increases in proportion to the number of antennas, differently from the case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate ($R_o$) acquired when one antenna is used and a rate of increase ($R_i$). The rate of increase ($R_i$) can be represented by the following equation 1.

$$R_i = \min(N_T, N_R) \qquad \text{[Equation 1]}$$

For example, provided that a MIMO system uses four Tx antennas and four Rx antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. It is assumed that there are $N_T$ Tx antennas and $N_R$ Rx antennas.

In the case of a transmission signal, a maximum number of transmission information pieces is $N_T$ under the condition that $N_T$ Tx antennas are used, so that the transmission information can be represented by a specific vector shown in the following equation 2.

$$S = [s_1, s_2, \ldots, s_{N_T}]^T \qquad \text{[Equation 2]}$$

Individual transmission information pieces $s_1, s_2, \ldots, s_{N_T}$ may have different transmission powers. In this case, if the individual transmission powers are denoted by $P_1, P_2, \ldots, P_{N_T}$, transmission information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

Also, $\hat{s}$ is a transmission vector, and can be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

In the meantime, the information vector $\hat{s}$ having an adjusted transmission power is applied to a weight matrix W, so that $N_T$ transmission signals $x_1, x_2, \ldots, x_{N_T}$ to be actually transmitted are configured. In this case, the weight matrix W is adapted to properly distribute transmission information to individual antennas according to transmission channel situations. The above-mentioned transmission signals $x_1, x_2, \ldots, x_{N_T}$ can be represented by the following equation 5 using the vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

Here, $w_{ij}$ denotes a weight corresponding to i-th Tx antenna and j-th information. W represents a weight matrix or precoding matrix.

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T \qquad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an $i^{th}$ Rx antenna. The channels may be represented as vectors and matrices by grouping them. As illustrated in FIG. 5(b), the channels from the $N_T$ Tx antennas to an $i^{th}$ Rx antenna may be expressed as follows.

$$h_i^T = [h_{i1}, h_{i2}, \ldots, h_{iN_T}] \qquad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

In general, the rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_R) \quad \text{[Equation 11]}$$

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

In the specification, 'rank' with respect to MIMO transmission represents the number of paths through which signals can be independently transmitted in a specific frequency resource at a specific instance and 'number of layers' refers to the number of signal streams transmitted through each path. Since a transmitter transmits as many layers as the number of ranks used for signal transmission, the rank corresponds to the number of layers unless otherwise mentioned.

Reference Signal (RS)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
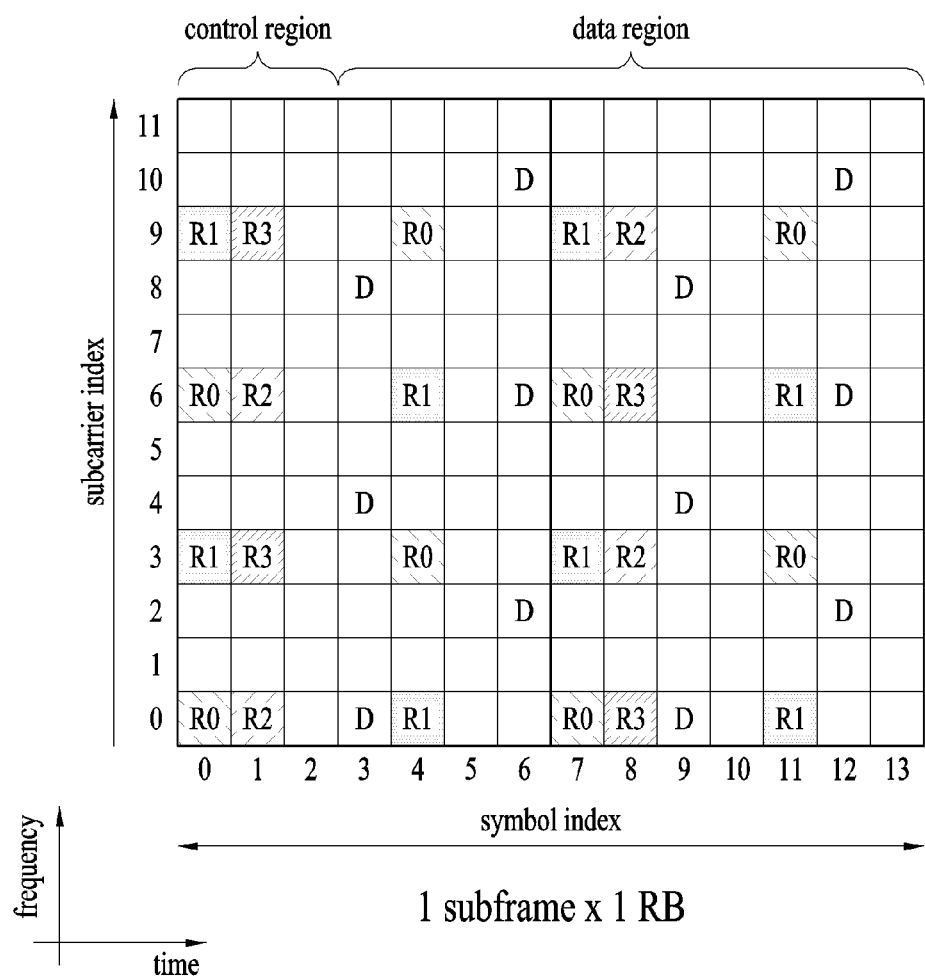
FIG. 6 is a diagram for an exemplary pattern of a CRS and a DRS in a resource block pair.

FIG. 6 illustrates a CRS and DRS pattern for an RB (Resource Bock).

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'ID' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
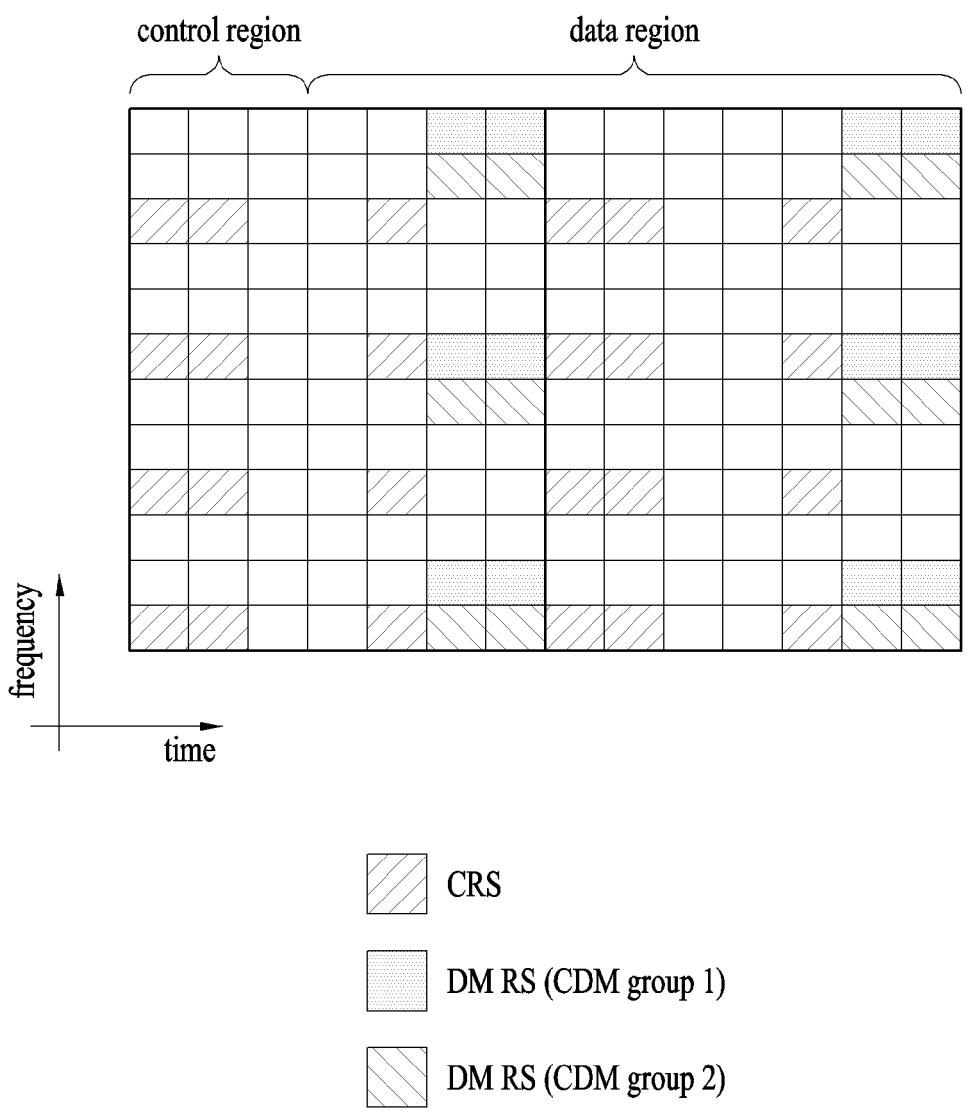
FIG. 7 is a diagram for an example of a DMRS pattern defined in LTE-A system.

FIG. 7 illustrates an exemplary DM RS pattern defined for the LTE-A system.

In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

When a DMRS is transmitted in a base station, precoding, which is identical to precoding applied to data, is applied to the DMRS. Hence, channel information estimated in a user equipment using a DMRS (or a UE-specific RS) corresponds to pre-coded channel information. The UE can easily perform data demodulation using the pre-coded channel information, which is estimated using the DMRS. Yet, since the UE is unable to know precoding information applied to the DMRS, the UE is unable to obtain channel information, which is not pre-coded, from the DMRS. The UE can obtain the channel information, which is not pre-coded, using a separate reference signal, i.e., the aforementioned CSI-RS rather than the DMRS.

Figure 8:
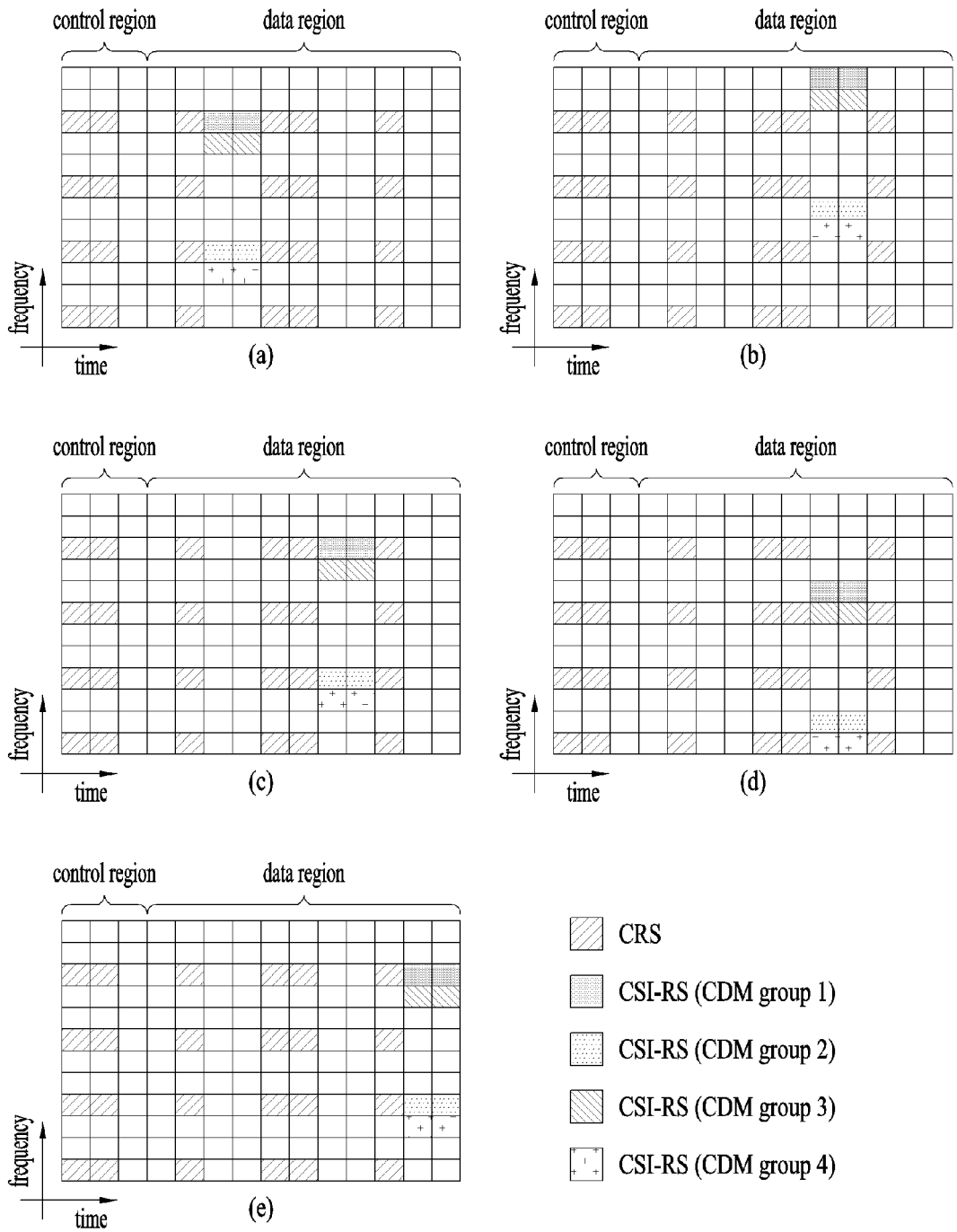
FIG. 8 is a diagram for examples of a CSI-RS pattern defined in LTE-A system.

FIG. 8 illustrates exemplary CSI-RS patterns defined for the LTE-A system.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

The RS patterns illustrated in FIGS. 6, 7 and 8 are purely exemplary. Thus it should be clearly understood that various embodiments of the present invention are not limited to specific RS patterns. That is, various embodiments of the present invention can also be implemented in the same manner when other RS patterns than those illustrated in FIGS. 6, 7 and 8 are applied.

CSI-RS Configuration

As described above, a BS needs to transmit CSI-RSs for all antenna ports in an LTE-A system for supporting a maximum of 8 Tx antennas for downlink. When CSI-RSs for maximum of 8 Tx antennas are transmitted every subframe, it is disadvantageous in terms of very high overhead. Thus, the overhead can be reduced by intermittently transmitting CSI-RSs instead of transmitting CSI-RSs every subframe. Accordingly, CSI-RSs may be periodically transmitted with a period as an integer multiple of one subframe or may be transmitted in a specific transmission pattern.

In this case, the period or pattern for transmitting a CSI-RS may be configured by a BS. In order to measure a CSI-RS, a UE needs to know CSI-RS configuration for each CSI-RS antenna port of a cell to which the UE belongs. The CSI-RS configuration may include a downlink subframe index for transmitting a CSI-RS, a time-frequency location (e.g., the CSI-RS patterns illustrated in FIGS. 8(a) to 8(e)) of a CSI-RS RE in a transmission subframe, and a CSI-RS sequence (which is a sequence used as a CSI-RS and is pseudo-randomly generated according to a predetermined rule based on a slot number, a cell ID, a CP length, etc.). That is, a given BS may use a plurality of CSI-RS configurations and may indicate CSI-RS configuration to be used for UE(s) in a cell of the plural CSI-RS configurations.

A plurality of the CSI-RS configurations may or may not include a CSI-RS configuration assumed by a UE as configuration of which transmit power of a CSI-RS is not zero (non-zero). And, a plurality of the CSI-RS configurations may or may not include one or more CSI-RS configurations assumed by the UE as configuration of which transmit power of a CSI-RS is zero.

Each bit of a parameter (e.g., 16-bit bitmap ZeroPowerCSI-RS parameter) for a CSI-RS configuration of which transmit power is zero may correspond to a CSI-RS configuration (or REs to which a CSI-RS is assigned according to the CSI-RS configuration) by upper layer and the UE may assume that transmit power of CSI-RS REs of CSI-RS configuration, which corresponds to a bit set to 1 in the parameter, is zero.

In addition, the CSI-RSs for the respective antenna ports need to be differentiated, and thus, resources for transmitting a CSI-RS for each antenna port need to be orthogonal to each other. As described with reference to FIG. 8, CSI-RSs for the respective antenna ports may be multiplexed using orthogonal frequency resources, orthogonal time resources, and/or orthogonal code resources via FDM, TDM, and/or CDM.

Upon informing UEs in a cell of CSI-RS information (CSI-RS configuration), a BS needs to inform the UEs of information about time and frequency to which a CSI-RS about each antenna port is mapped. In detail, the information about time may contain subframe numbers for transmitting the CSI-RS, a period for transmitting the CSI-RS, a subframe offset for transmitting the CSI-RS, an OFDM symbol number for transmitting a CSI-RS RE of a specific antenna, etc. The information about frequency may contain frequency spacing for transmitting a CSI-RS RE of a specific antenna, an offset or shift value of an RE in a frequency axis, etc.

Figure 9:
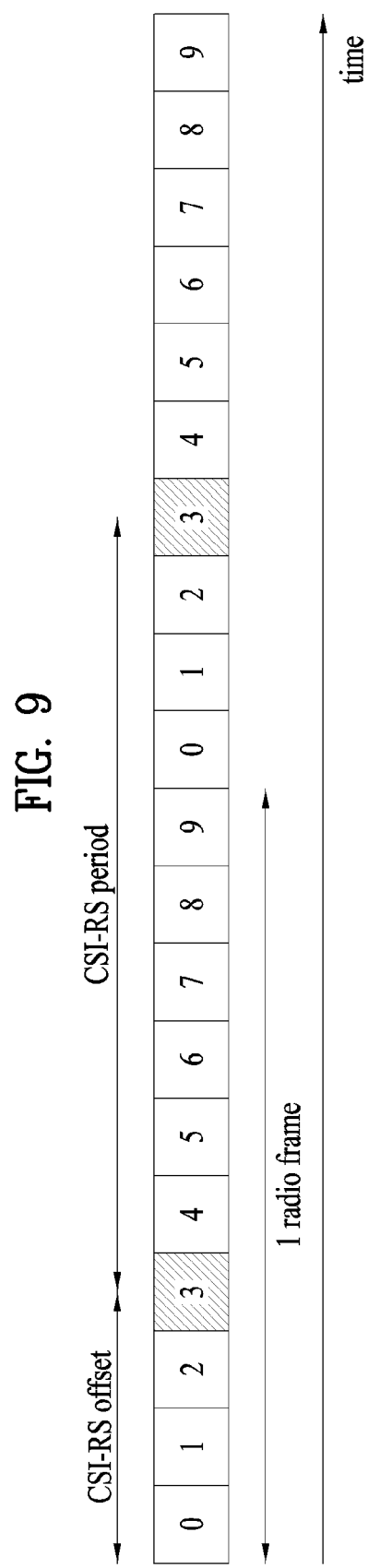
FIG. 9 is a diagram for explaining an example of a scheme of periodically transmitting a CSI-RS.

FIG. 9 illustrates an exemplary periodic CSI-RS transmission.

A CSI-RS may be transmitted periodically at every integer multiple of one subframe (e.g. in every 5, 10, 20, 40 or 80 subframes).

Referring to FIG. 9, one radio frame is divided into 10 subframes, subframe 0 to subframe 9. The BS transmits a CSI-RS with a CSI-RS transmission period of 10 ms (i.e. in every 10 subframes) and a CSI-RS transmission offset of 3, by way of example. Different BSs may have different CSI-RS transmission offsets so that CSI-RSs transmitted from a plurality of cells is uniformly distributed in time. If a CSI-RS is transmitted every 10 ms, its CSI-RS transmission offset may be one of 0 to 9. Likewise, if the CSI-RS is transmitted every 5 ms, the CSI-RS transmission offset may be one of 0 to 4. If the CSI-RS is transmitted every 20 ms, the CSI-RS transmission offset may be one of 0 to 19. If the CSI-RS is transmitted every 40 ms, the CSI-RS transmission offset may be one of 0 to 39. If the CSI-RS is transmitted every 80 ms, the CSI-RS transmission offset may be one of 0 to 79. A CSI-RS transmission offset indicates a subframe in which a BS starts CSI-RS transmission in every predetermined period. When the BS signals a CSI-RS transmission period and offset to a UE, the UE may receive a CSI-RS from the BS in subframes determined by the CSI-RS transmission period and offset. The UE may measure a channel using the received CSI-RS and thus may report such information as a Channel Quality Indicator (CQI), a PMI, and/or a Rank Indicator (RI) to the BS. Unless a CQI, a PMI and an RI are separately described herein, they may be collectively referred to as a CQI (or CSI). A CSI-RS transmission period and offset may be set separately for each individual CSI-RS configuration.

Unlike a CRS transmitted in all subframes in which PDSCH is transmittable, a CSI-RS can be configured to be transmitted in a partial subframe only. For instance, a CSI subframe set $C_{CSI,0}$ and $C_{CSI,1}$ can be configured by upper layer. A CSI reference resource may belong to either the $C_{CSI,0}$ or the $C_{CSI,1}$ and may not belong to the $C_{CSI,0}$ and the $C_{CSI,1}$ at the same time. Hence, when the CSI subframe sets $C_{CSI,0}$ and $C_{CSI,1}$ are configured by upper layer, a UE may not expect to receive a trigger (or indication on CSI calculation) for a CSI reference resource existing in a subframe not belong to any CSI subframe sets.

And, a CSI reference resource can be configured in a valid downlink subframe. The valid downlink subframe can be configured as a subframe satisfying various requirements. In case of periodic CSI report, if a CSI subframe set is set to a UE, one of the requirements may correspond to a subframe belonging to the CSI subframe set linked with the periodic CSI report.

And, a UE can deduct a CQI index from a CSI reference resource in consideration of assumptions described in the following (it may refer to 3GPP TS 36. 213 for details).

First 3 OFDM symbols in a subframe are occupied by control signaling

No resource element used by a primary synchronization signal, a secondary synchronization signal or a physical broadcasting channel (PBCH)

A CP length of a non-MBSFN (multicast broadcast single frequency network) subframe Redundancy version corresponds to 0

If a CSI-RS is used for measuring a channel, a ration of PDSCH EPRE (energy per resource element) to CSI-RS EPRE follows a prescribed rule When CSI reporting is performed in a transmission mode 9 (a mode supporting maximum 8-layer transmission), if PMI/RI report is set to a UE, it may assume that DMRS overhead is matched with a most recently reported rank. (For instance, as mentioned earlier in FIG. 7, the DMRS overhead corresponds to 12 REs in a resource block pair when two or more antenna ports (i.e., equal to or less than rank 2) are used. Yet, when three or more antenna ports (i.e., equal to or greater than rank 3) are used, the DMRS overhead corresponds to 24 REs. Hence, it may be able to calculate a CQI index in a manner of assuming DMRS overhead corresponding to a most recently reported rank value.)

RE is not allocated to a CSI-RS and zero-power CSI-RS

RE is not allocated to a PRS (positioning RS)

PDSCH transmission scheme follows a transmission mode (e.g., a default mode) currently set to a UE A ratio of PDSCH EPRE to cell-specific reference signal EPRE follows a prescribed rule For instance, a base station can inform a UE of the CSI-RS configuration using RRC (radio resource control) signaling. In particular, information on the CSI-RS configuration can be provided to each of UEs in a cell using dedicated RRC signaling. For example, when a UE establishes a connection with a base station via an initial access or handover, it may be able to make the base station inform the UE of the CSI-RS configuration via the RRC signaling. Or, when the base station transmits an RRC signaling message requiring CSI-RS measurement-based channel state feedback to the UE, it may be able to make the base station inform the UE of the CSI-RS configuration via the RRC signaling message.

Meanwhile, time position at which a CSI-RS exists, in particular, a cell-specific subframe configuration period and a cell-specific subframe offset can be summarized as Table 1 in the following for example.

TABLE 1

| CSI-RS subframe configuration $I_{CSI-RS}$ | CSI-RS period $T_{CSI-RS}$ (subframe) | CSI-RS subframe offset $\Delta_{CSI-RS}$ (subframe) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

As mentioned in the foregoing description, a parameter $I_{CSI-RS}$ can be separately configured by a UE for a CSI-RS of which transmit power is assumed as not zero and a CSI-RS of which transmit power is assumed as zero. A subframe including a CSI-RS can be represented as Equation 12 in the following (In equation 12, $n_f$ corresponds to a system frame number and $n_s$ corresponds to a slot number).

$$(10n_f+\lfloor n_s/2\rfloor-\Delta_{CSI-RS}) \bmod T_{CSI-RS}=0 \quad \text{[Equation 12]}$$

A CSI-RS-Config information element (IE) defined as Table 2 in the following can be used to specify CSI-RS configuration.

TABLE 2

CSI-RS-Config information elements

```
-- ASN1START
CSI-RS-Config-r10 ::=    SEQUENCE {
    csi-RS-r10              CHOICE {
        release                 NULL,
        setup                   SEQUENCE {
            antennaPortsCount-r10       ENUMERATED {an1, an2, an4, an8},
            resourceConfig-r10          INTEGER (0..31),
            subframeConfig-r10          INTEGER (0..154),
            p-C-r10                     INTEGER (-8..15)
        }
    }                                                           OPTIONAL,
    -- Need ON
    zeroTxPowerCSI-RS-r10   CHOICE {
        release                 NULL,
        setup                   SEQUENCE {
            zeroTxPowerResourceConfigList-r10   BIT STRING (SIZE (16)),
            zeroTxPowerSubframeConfig-r10       INTEGER (0..154)
        }
    }                                                           OPTIONAL
    -- Need ON
}
-- ASN1STOP
```

In Table 2, an antenna port count (antennaPortsCount) parameter indicates the number of antenna ports (i.e., CSI-RS port) used for transmitting a CSI-RS and corresponds to 1 and an2 corresponds to 2.

In Table 2, a p_C parameter indicates a ratio of PDSCH EPRE (energy per resource element) to CSI-RS EPRE, which is assumed when a UE derives CSI feedback.

In Table 2, a resource configuration (resourceConfig) parameter has a value for determining a position of a resource element to which a CSI-RS is mapped in a RB pair shown in FIG. 8.

In Table 2, a subframe configuration (subframeConfig) parameter corresponds to $I_{CSI-RS}$ in Table 1.

In Table 2, zeroTxPowerResourceConfigList and zeroTxPowerSubframeConfig correspond to resourceConfig and subframeConfig for a CSI-RS of which transmit power is zero, respectively.

For more details of the CSI-RS configuration IE shown in Table 2, it may refer to standard document TS 36.331.

Channel State Information (CSI)

MIMO can be categorized into an open-loop scheme and a closed-loop scheme. The open-loop scheme performs MIMO transmission at a transmitter without feedback of CSI from a MIMO receiver, whereas the closed-loop scheme performs MIMO transmission at the transmitter using feedback of CSI from the MIMO receiver. In closed-loop MIMO, each of the transmitter and the receiver can perform beamforming based on CSI to obtain MIMO Tx antenna multiplexing gain. The transmitter (e.g. eNB) can allocate an uplink control channel or an uplink shared channel to the receiver (e.g. UE) such that the receiver can feed back CSI.

A UE may perform estimation and/or measurement for a downlink channel using CRS and/or CSI-RS. CSI fed back by the UE to a base station may include a rank indicator (RI), a precoding matrix index (PMI) and a channel quality indictor (CQI).

The RI indicates information about a channel rank. The channel rank represents a maximum number of layers (or streams) through which different pieces of information can be transmitted through the same time-frequency resource. The RI is determined by long term fading of a channel, and thus the RI can be fed back to an eNB at a longer period than the PMI and CQI.

The PMI is information about a precoding matrix used for transmission from a transmitter and is a value in which spatial characteristics of a channel are reflected. Precoding refers to mapping a transport layer to a transmit antenna. A layer-to-antenna mapping relation can be determined by a precoding matrix. The PMI indicates a precoding matrix index of an eNB preferred by a UE based on a metric such as signal-interference plus noise ratio (SINR). To reduce feedback overhead of precoding information, the transmitter and receiver can share a codebook including precoding matrices and only an index indicating a specific precoding matrix in the codebook can be fed back. For example, the PMI can be determined based on the last-reported RI.

The CQI is information indicating channel quality or channel strength. The CQI can be represented by a combination of predetermined MCS. In particular, a feedback CQI index indicates a corresponding modulation scheme and a code rate. The CQI can be calculated in a manner that a specific resource region (e.g., a region specified by a valid subframe and/or a physical resource block) is configured as a CQI reference resource, PDSCH transmission is assumed as being existed in the CQI reference resource and a case of receiving PDSCH while not exceeding a prescribed error rate (e.g., 0.1) is assumed. In general, the CQI corresponds to a value for reflecting a reception SNR capable of being obtained when a base station configures a spatial channel using the PMI. For instance, the CQI can be calculated based on a most recently reported RI and/or PMI.

In a system supporting an extended antenna configuration (e.g. LTE-A), additional multi-user diversity is obtained using multi-user MIMO (MU-MIMO). When an eNB performs downlink transmission using CSI fed back by one of multiple UEs, it is necessary to prevent downlink transmission from interfering with other UEs since an interference channel is present between UEs multiplexed in the antenna domain in MU-MIMO. Accordingly, MU-MIMO requires more accurate CSI feedback than single user MIMO (SU-MIMO).

Hence, in order to measure and report more precise channel state information, it may be able to apply a new CSI feedback method, which is enhanced from the CSI consisting of a legacy RI, PMI and CQI. For instance, precoding information fed back by a receiving end can be indicated by a combination of 2 PMIs (e.g., i1 and i2). In doing so, more delicate PMI can be fed back and more delicate CQI can be calculated and reported based on the delicate PMI.

Meanwhile, CSI can be periodically transmitted on PUCCH or can be aperiodically transmitted on PUSCH. And, it may be able to define various reporting modes depending on which one is fed back among an RI, a first PMI (e.g., W1), a second PMI (e.g., W2) and a CQI and whether a feedback PMI and/or CQI is for a wideband (WB) or a subband (SB).

CQI Calculation

In the following, CQI calculation is explained in detail under an assumption that a downlink receiving end corresponds to a UE. Yet, contents described in the present invention can also be identically applied to a relay as a downlink receiving entity.

When a UE reports CSI, a method of configuring/defining a resource becoming a reference for calculating CQI (hereinafter, a reference resource) is explained in the following. First of all, definition of the CQI is explained in more detail.

The CQI reported by a UE corresponds to a specific index value. A CQI index corresponds to a value indicating a modulation scheme corresponding to a channel state, a code rate, and the like. For instance, CQI indexes and interpretation of the CQI indexes can be given as Table 3 in the following.

TABLE 3

| CQI index | modulation | code rate × 1024 | efficiency |
| --- | --- | --- | --- |
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

A UE can determine a highest CQI index satisfying a prescribed requirement among a CQI index 1 to a CQI index 15 in Table 3 for each of CQI values reported in an uplink subframe n based on examination not restricted in time and frequency domain. The prescribed requirement can be determined by a requirement having a combination of a modulation scheme (e.g., MCS) corresponding to the CQI index and a transport block size (TBS) and capable of receiving a single PDSCH transport block, which occupies a group of downlink physical resource blocks corresponding to the CQI reference resource, with a transport block error rate not exceeding 0.1 (i.e., 10%). If the CQI index 1 does not satisfy the aforementioned requirement, the UE can determine a CQI index 0.

In case of a transmission mode 9 (corresponding to maximum 8-layer transmission) and a feedback reporting mode, a UE can perform channel measurement for calculating a CQI value reported in an uplink subframe n based on a CSI-RS only. In case of a different transmission mode and corresponding reporting modes, the UE can perform channel measurement for calculating a CQI based on a CRS.

When requirements described in the following are all satisfied, a combination of a modulation scheme and a transport block size may correspond to a single CQI index. The combination can be signaled in response to transmission on PDSCH in a CQI reference resource according to a relevant transport block size table. When a modulation scheme is indicated by a corresponding CQI index and the combination of the transport block size and the modulation scheme is applied to the reference resource, to have a valid channel code rate as close as possible to a code rate indicated by the CQI index corresponds to the aforementioned requirement. If two or more of the combination of the transport block size and the modulation scheme are close to the code rate indicated by the CQI index with an identical level, it may be able to determine a combination of which a transport block size is minimum.

The CQI reference resource is defined as follows.

The CQI reference resource in frequency domain is defined by a group of downlink physical blocks corresponding to a band related to a derived CQI value.

The CQI reference resource in time domain is defined by a single downlink subframe n-nCQI_ref. In this case, nCQI_ref is determined by a value, which is smallest among values equal to greater than 4 and the value corresponding to a downlink subframe of which the downlink subframe n-nCQI_ref is valid. In case of aperiodic CQI reporting, the nCQI_ref is determined by a downlink subframe identical to a valid downlink subframe corresponding to (or CQI request is received) a CQI request in an uplink DCI format (i.e., a PDCCH DCI format for providing uplink scheduling control information to a UE) as the CQI reference resource. And, in case of the aperiodic CQI reporting, the nCQI_ref corresponds to 4 and the downlink subframe n-nCQI_ref corresponds to a valid downlink subframe. In this case, the downlink subframe n-nCQI_ref can be received after a subframe corresponding to a CQI request in a random access response grant. In this case, the valid downlink subframe corresponds to a downlink subframe configured as a downlink subframe for a corresponding UE, the downlink subframe which is not an MBSFN subframe except a transmission mode 9, the downlink subframe not including a DwPTS field when a length of a DwPTS is equal to or less than 7680*Ts (Ts=1/(15000*2048) second, and the downlink subframe not belonging to a measurement gap set to the UE. If there is no downlink subframe valid for the CQI reference resource, CQI report can be omitted in an uplink subframe n.

In a layer region, the CQI reference resource is defined by a random RI and PMI on the premise of CQI.

In order for a UE to derive a CQI index from the CQI reference resource, it may assume items described in the following: (1) First 3 OFDM symbols of a downlink subframe are used for the use of control signaling. (2) There is no resource element used by a primary synchronization signal, a secondary synchronization signal or a physical broadcasting channel. (3) A CP length of a non-MBSFN subframe. (4) Redundancy version corresponds to 0. (5) When a CSI-RS is used for channel measurement, a ratio of PDSCH EPRE (energy per resource element) to CSI-RS EPRE has a prescribed value signaled by upper layer. (6) A PDSCH transmission scheme (single antenna port transmission, transmission diversity, spatial multiplexing, MU-MIMO, etc.) defined according to a transmission mode is currently set to a UE (it may correspond to a default mode). (7) When a CRS is used for channel measurement, a ratio of PDSCH EPRE to CRS EPRE can be determined according to a prescribed requirement. For more details on the CQI definition, it may refer to 3GPP TS 36.213.

For example, a downlink receiving end (e.g., a UE) configures a previous specific single subframe as a CQI reference resource on the basis of timing of performing CQI calculation. When PDSCH is transmitted from a base station in the CQI reference resource, the downlink receiving end can calculate CQI satisfying a requirement not exceeding an error rate of 10%.

Codebook-Based Precoding Scheme

In order to support MIMO antenna transmission, it may be able to apply precoding configured to appropriately distribute transmission information to each of multiple antennas according to a channel status and the like. A codebook-based precoding scheme corresponds to a scheme that a transmitting end and a receiving end determine a set of precoding matrixes in advance, the receiving end measures channel information from the transmitting end and gives feedback on a most suitable precoding matrix (i.e., precoding matrix index (PMI) to the transmitting end, and the transmitting end applies appropriate precoding to signal transmission based on the PMI. Since the codebook-based precoding scheme is a scheme of selecting an appropriate precoding matrix from the predetermined set of precoding matrixes, although an optimized precoding is not always applied, feedback overhead can be reduced compared to a case of explicitly giving feedback on optimized precoding information to actual channel information.

FIG. 10 is a diagram for explaining a basic concept of a codebook-based precoding.

In case of following a codebook-based precoding scheme, a transmitting end and a receiving end share codebook information including the prescribed number of precoding matrixes, which are predetermined according to a transmission rank, the number of antennas, and the like. In particular, when feedback information is finite, the codebook-based precoding scheme can be used. The receiving end measures a channel state via a reception signal and may be then able to give feedback on information on the finite number of preferred precoding matrixes (i.e., an index of a corresponding precoding matrix) to the transmitting end based on the aforementioned codebook information. For instance, the receiving end measures a reception signal using ML (maximum likelihood) or MMSE (minimum mean square error) scheme and may be then able to select an optimized precoding matrix. Although FIG. 10 shows a case that the receiving end transmits precoding matrix information to the transmitting end according to a codeword, by which the present invention may be non-limited.

Having received the feedback information from the receiving end, the transmitting end can select a specific precoding matrix from a codebook based on the received information. The transmitting end, which has selected the precoding matrix, performs precoding in a manner of multiplying the number of layer signals corresponding to a transmission rank by the selected precoding matrix and may be then able to transmit a transmission signal on which the precoding is performed via a plurality of antennas. In a precoding matrix, the number of rows is identical to the number of antennas and the number of columns is identical to a rank value. Since the rank value is identical to the number of layers, the number of columns is identical to the number of layers. For instance, if the number of transmission antennas corresponds to 4 and the number of transmission layers corresponds to 2, a precoding matrix can be configured by a 4×2 matrix. Information transmitted via each layer can be mapped to each antenna through the precoding matrix.

Having received a signal, which is transmitted from the transmitting end in a manner of being pre-coded, the receiving end can restore the received signal in a manner of performing reverse processing on the precoding processed in the transmitting end. In general, since a precoding matrix satisfies a unitary matrix (U) condition such as $U*U^H=I$, the reverse processing performed on the precoding can be performed using a scheme of multiplying Hermite matrix ($P^H$) of a precoding matrix (P) used in the precoding of the transmitting end by the received signal.

For instance, Table 4 in the following shows a codebook used for downlink transmission using 2 transmission antennas in 3GPP LTE release-8/9 and Table 5 in the following shows a codebook used for downlink transmission using 4 transmission antennas in 3GPP LTE release-8/9.

TABLE 4

| | Number of rank | |
|---|---|---|
| Codebook index | 1 | 2 |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\j\end{bmatrix}$ | $\frac{1}{2}\begin{bmatrix}1&1\\j&-j\end{bmatrix}$ |
| 3 | $\frac{1}{\sqrt{2}}\begin{bmatrix}1\\-j\end{bmatrix}$ | — |

TABLE 5

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 5, $W_n^{\{s\}}$ can be obtained by a set $\{s\}$ configured from an equation represented as $W_n = I - 2u_n u_n^H / u_n^H u_n$. In this case, I indicates a 4×4 single matrix and $u_n$ is a value given in Table 5.

As shown in Table 4, in case of a codebook for 2 transmission antennas, it may have total 7 precoding vectors/matrixes. In this case, since a single matrix is used for an open-loop system, total 6 precoding vectors/matrixes are used for a close-loop system. And, in case of a codebook for 4 transmission antennas shown in Table 5, it may have total 64 precoding vectors/matrixes.

In addition, for instance, MIMO transmission using 8 transmission antennas can be performed in a system (e.g., 3GPP LTE release-10 or a later) supporting an extended antenna configuration and it is required to design a codebook for supporting the system.

In order to perform CSI reporting on a channel transmitted through 8 antenna ports, it may consider using codebooks shown in Table 6 to 13 in the following. 8 CSI-RS antenna ports can be represented by an antenna port 15 to 22. Each of Table 6, 7, 8, 9, 10, 11, 12 and 13 shows an example of a codebook used for a 1-layer, 2-layer, 3-layer, 4-layer, 5-layer, 6-layer, 7-layer and 8-layer CSI reporting, respectively.

In Table 6 to 13, $\phi_n$ and $v_m$ can be given as shown in Equation 13 in the following.

$$\phi_n = e^{j\pi n/2}$$

$$v_m = [1 \; e^{j2\pi m/32} \; e^{j4\pi m/32} \; e^{j6\pi m/32}]^T \quad \text{[Equation 13]}$$

TABLE 6

| $i_1$ | $i_2$ | | | | |
|---|---|---|---|---|---|
| | 0 | 1 | 2 | 3 | 4 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ |

| $i_1$ | $i_2$ | | | | |
|---|---|---|---|---|---|
| | 5 | 6 | 7 | 8 | 9 |
| 0-15 | $W_{2i_1+1,1}^{(1)}$ | $W_{2i_1+1,2}^{(1)}$ | $W_{2i_1+1,3}^{(1)}$ | $W_{2i_1+2,0}^{(1)}$ | $W_{2i_1+2,1}^{(1)}$ |

| $i_1$ | $i_2$ | | | | |
|---|---|---|---|---|---|
| | 10 | 11 | 12 | 13 | 14 |
| 0-15 | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ |

| $i_1$ | $i_2$ |
|---|---|
| | 15 |
| 0-15 | $W_{2i_1+3,3}^{(1)}$ | where $W_{m,n}^{(1)} = \frac{1}{\sqrt{8}} \begin{bmatrix} v_m \\ \varphi_n v_m \end{bmatrix}$

TABLE 7

| $i_1$ | $i_2$ | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |

| $i_1$ | $i_2$ | | | |
|---|---|---|---|---|
| | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

TABLE 7-continued

| $i_1$ | $i_2$ | | | |
|---|---|---|---|---|
| | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| $i_1$ | $i_2$ | | | |
|---|---|---|---|---|
| | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4} \begin{bmatrix} v_m & v_{m'} \\ \varphi_n v_m & -\varphi_n v_{m'} \end{bmatrix}$

TABLE 8

| $i_1$ | $i_2$ | | |
|---|---|---|---|
| | 0 | 1 | 2 |
| 0-3 | $W_{8i_1,8i_1,8i_1+8}^{(3)}$ | $W_{8i_1+8,8i_1,8i_1+8}^{(3)}$ | $\tilde{W}_{8i_1,8i_1+8,8i_1+8}^{(3)}$ |

| $i_1$ | $i_2$ | | |
|---|---|---|---|
| | 3 | 4 | 5 |
| 0-3 | $\tilde{W}_{8i_1+8,8i_1,8i_1}^{(3)}$ | $W_{8i_1+2,8i_1+2,4i_1+10}^{(3)}$ | $W_{8i_1+10,8i_1+2,8i_1+10}^{(3)}$ |

| $i_1$ | $i_2$ | | |
|---|---|---|---|
| | 6 | 7 | 8 |
| 0-3 | $\tilde{W}_{8i_1+2,8i_1+10,8i_1+10}^{(3)}$ | $\tilde{W}_{8i_1+10,8i_1+2,8i_1+2}^{(3)}$ | $W_{8i_1+4,8i_1+4,8i_1+12}^{(3)}$ |

| $i_1$ | $i_2$ | | |
|---|---|---|---|
| | 9 | 10 | 11 |
| 0-3 | $W_{8i_1+12,8i_1+4,8i_1+12}^{(3)}$ | $\tilde{W}_{8i_1+4,8i_1+12,8i_1+12}^{(3)}$ | $\tilde{W}_{8i_1+12,8i_1+4,8i_1+4}^{(3)}$ |

| $i_1$ | $i_2$ | | |
|---|---|---|---|
| | 12 | 13 | 14 |
| 0-3 | $W_{8i_1+6,8i_1+6,8i_1+14}^{(3)}$ | $W_{8i_1+14,8i_1+6,8i_1+14}^{(3)}$ | $\tilde{W}_{8i_1+6,8i_1+14,8i_1+14}^{(3)}$ |

| $i_1$ | $i_2$ |
|---|---|
| | 15 |
| 0-3 | $\tilde{W}_{8i_1+14,8i_1+6,8i_1+6}^{(3)}$ | where $W_{m,m',m''}^{(3)} = \frac{1}{\sqrt{24}} \begin{bmatrix} v_m & v_{m'} & v_{m''} \\ v_m & -v_{m'} & -v_{m''} \end{bmatrix}$, $\tilde{W}_{m,m',m''}^{(3)} = \frac{1}{\sqrt{24}} \begin{bmatrix} v_m & v_{m'} & v_{m''} \\ v_m & v_{m'} & -v_{m''} \end{bmatrix}$

TABLE 9

| $i_1$ | $i_2$ | | | |
|---|---|---|---|---|
| | 0 | 1 | 2 | 3 |
| 0-3 | $W_{8i_1,8i_1+8,0}^{(4)}$ | $W_{8i_1,8i_1+8,1}^{(4)}$ | $W_{8i_1+2,8i_1+10,0}^{(4)}$ | $W_{8i_1+2,8i_1+10,1}^{(4)}$ |

| $i_1$ | $i_2$ | | | |
|---|---|---|---|---|
| | 4 | 5 | 6 | 7 |
| 0-3 | $W_{8i_1+4,8i_1+12,0}^{(4)}$ | $W_{8i_1+4,8i_1+12,1}^{(4)}$ | $W_{8i_1+6,8i_1+14,0}^{(4)}$ | $W_{8i_1+6,8i_1+14,1}^{(4)}$ | where $W_{m,m',n}^{(4)} = \frac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$

TABLE 10

| $i_1$ | $i_2$ |
| --- | --- |
|  | 0 |
| 0-3 | $W_{i_1}^{(5)} = \frac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

TABLE 11

| $i_1$ | $i_2$ |
| --- | --- |
|  | 0 |
| 0-3 | $W_{i_1}^{(6)} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

TABLE 12

| $i_1$ | $i_2$ |
| --- | --- |
|  | 0 |
| 0-3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

TABLE 13

| $i_1$ | $i_2$ |
| --- | --- |
|  | 0 |
| 0 | $W_{i_1}^{(8)} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

Multi-Antenna Array

FIG. 11 is a diagram for examples of configuring 8 transmission antennas.

FIG. 11 (a) shows a case that the N number of antennas configure a channel independent from each other without grouping. In general, this is called ULA (uniform linear array).

FIG. 11 (b) shows an antenna configuration (paired ULA) of a ULA type that 2 antennas make a pair. In this case, it may have an associated channel between the two antennas making a pair and there may exist an independent channel with a different pair of antennas.

When it is necessary to install many numbers of transmission antennas in an insufficient space, the ULA antenna configuration shown in FIG. 11 (a) and FIG. 11 (b) may not be appropriate. Hence, as shown in FIG. 11 (c), it may consider applying a dual-pole (or cross-pole) antenna configuration. If transmission antennas are configured using the dual-pole antenna configuration, although a distance d between antennas is relatively short, since it is able to configure an independent channel by lowering antenna correlation, data of high throughput can be transmitted.

Referring to an example shown in FIG. 11 (c), when total $N_T$ number of transmission antennas are arrayed, a group 1 ranging from an index 1, 2, . . . , to an index $N_T/2$ and a group 2 ranging from an index $N_T/2+1$, $N_T/2+2$, . . . , to an index $N_T$ can be configured to have polarization orthogonal to each other. Antennas belonging to the antenna group 1 have identical polarization (e.g., vertical polarization) and antennas belonging to the antenna group 2 may have another identical polarization (e.g., horizontal polarization). And, the two antenna groups are located at a same position (co-located). For instance, an antenna 1 and $N_T/2+1$, an antenna 2 and $N_T/2+2$, an antenna 3 and $N_T/2+3m$, . . . , an antenna $N_T/2$ and $N_T$ can be arrayed at a same position. In other word, antennas belonging to a single antenna group have identical polarization like the ULA (uniform linear array) does and correlation between antennas belonging to a single antenna group has a linear phase increment characteristic. And, correlation between antenna groups has a characteristic of which a phase is rotated.

1-Dimensional Antenna Structure 1-dimensional antenna array can include the ULA or the cross-polarization antenna array configuration shown in FIG. 11. If the 1-dimensional antenna array is applied, the aforementioned reference signal transmission and the CSI feedback scheme are applied. In particular, when downlink transmission is performed, in order to estimate a channel between a transmitting end and a receiving end (or between a base station and a user equipment), the transmitting end transmits a reference signal (e.g., a CRS or a CSI-RS) to the receiving end and the receiving end can estimate a channel state from the reference signal. The receiving end can calculate a rank, a precoding weight, and CQI based on the rank and the precoding weight, which are expected as being appropriate for transmitting downlink data, based on channel information obtained via the reference signal.

Precoding information is required for MIMO transmission such as precoded spatial multiplexing. In this case, a precoding weight can be configured in a codebook form.

For instance, in a MIMO system using 4 transmission antennas (hereinafter, 4Tx), CSI feedback for precoded spatial multiplexing (SM) using a CRS can be explained as follows. When a base station including 4 transmission antennas transmits a CRS, if an index of an antenna port (AP) mapped to each RS corresponds to an AP0, 1, 2 and 3, a UE can estimate a channel from the AP0, 1, 2 and 3 using the CRS.

In this case, if a matrix (or a vector) representing a channel estimated by a UE corresponds to H, the H can be represented as $[H_{11}\ H_{12}\ H_{13}\ H_{14}; H_{21}\ H_{22}\ H_{23}\ H_{24}; \ldots; H_{Nr1}\ H_{Nr2}\ H_{Nr3}\ H_{Nr4}]$. In particular, the H can be represented by a matrix (or a vector) of a size of $N_r \times N_t$. In this case, the $N_r$ corresponds to the number of reception antennas and the $N_t$ corresponds to the number of transmission antennas.

And, a UE may be able to assume that a base station transmits data using a precoding weight matrix (or a vector) $W_m(k)$. In the $W_m(k)$, m indicates a transmission rank and the k indicates an index of a precoding weight matrix (or a vector) defined for Rnak-m. The $W_m(k)$ can be represented as $[W_{11}\ W_{12}\ W_{13}\ \ldots\ W_{1m};\ W_{21}\ W_{22}\ W_{23}\ \ldots\ W_{2m};\ W_{31}\ W_{32}\ W_{33}\ \ldots\ W_{3m};\ \ldots;\ W_{41}\ W_{42}\ W_{43}\ \ldots\ W_{4m}]$. In particular, the $W_m(k)$ can be represented by a matrix (or a vector) of a size of $N_t \times m$.

And, a UE can calculate an equivalent channel $H_{eq}$. The equivalent channel $H_{eq}$ can be calculated by composition (i.e., $H_{eq}=HW_m(k)$) of an estimated channel H and a precoding weight $W_m(k)$ or a composition (i.e., $H_{eq}=RW_m(k)$) of a covariance matrix R of an estimated channel and the precoding matrix $W_m(k)$. A UE can select a rank appropriate for downlink transmission and a precoding weight based on the equivalent channel $H_{eq}$. And, the UE can calculate CQI, which is expected when the selected rank and the precoding weight are applied.

As a different example, in a MIMO system using 8 transmission antennas (hereinafter, 8Tx), CSI feedback for precoded spatial multiplexing (SM) using a CSI-RS can be explained as follows. When a base station including 8 transmission antennas transmits a CSI-RS, if an index of an antenna port (AP) mapped to each RS corresponds to an AP15, 16, 17, 18, 19, 20, 21 and 22, a UE can estimate a channel from the AP15, 16, 17, 18, 19, 20, 21 and 22 using the CSI-RS.

In this case, if a matrix (or a vector) representing a channel estimated by a UE corresponds to H, the H can be represented as $[H_{11}\ H_{12}\ H_{13}\ H_{14}\ H_{15}\ H_{16}\ H_{17}\ H_{18};\ H_{21}\ H_{22}\ H_{23}\ H_{24}\ H_{25}\ H_{26}\ H_{27}\ H_{28};\ \ldots,\ H_{Nr1}\ H_{Nr2}\ H_{Nr3}\ H_{Nr4}\ H_{Nr5}\ H_{Nr6}\ H_{Nr7}\ H_{Nr8}]$ (In this case, the $N_r$ corresponds to the number of reception antennas).

And, a UE may be able to assume that a base station transmits data using a precoding weight matrix (or a vector) $W_m(k)$. The $W_m(k)$ can be represented as $[W_{11}\ W_{12}\ W_{13}\ \ldots\ W_{1m},\ W_{21}\ W_{22}\ W_{23}\ \ldots\ W_{2m},\ W_{31}\ W_{32}\ W_{33}\ \ldots\ W_{3m},\ \ldots;\ W_{81}\ W_{82}\ W_{83}\ \ldots\ W_{8m}]$.

And, the UE can select a rank appropriate for downlink transmission and a precoding weight based on an equivalent channel $H_{eq}$ (In this case, the $H_{eq}$ is calculated by $H_{eq}=HW_m(k)$ or $H_{eq}=RW_m(k)$) and can calculate CQI, which is expected when the selected rank and the precoding weight are applied.

In doing so, in a MIMO system supporting the $N_t$ number of transmission antennas, as mentioned in the foregoing description, a UE can give feedback on CSI (e.g., RI, PMI, CQI) selected/calculated using a CRS or a CSI-RS to a base station. The base station can determine a rank appropriate for downlink transmission, a precoding weight, a modulation and coding scheme, and the like in consideration of the CSI reported by the UE.

2-Dimensional Antenna Structure

Since a beam formed by a 1-dimensional antenna structure such as a legacy ULA is specified by azimuth angle direction (e.g., horizontal domain) only and is unable to be specified by elevation angle direction (e.g., vertical domain), 2-dimensional beamforming is supported only. The 1-dimensional antenna structure (e.g., ULA or cross-polarization array configuration) can support adaptive beamforming of the azimuth angle direction or spatial multiplexing and a MIMO transmission/reception technique is designed for the adaptive beamforming of the azimuth angle direction or the spatial multiplexing only in a legacy wireless communication system (e.g., a system following 3GPP LTE release-8, 9, 10, and 11).

Meanwhile, in case of supporting a 2-dimensional antenna structure-based MIMO transmission/reception technique to enhance system performance, since it is able to specify direction of a beam formed by the 2-dimensional antenna structure in both the azimuth angle direction and the elevation angle direction, it is able to perform 3-dimensional beamforming According to a function of forming a beam by specifying the azimuth angle and the elevation angle, it is able to support a new beamforming such as a sector specifying elevation beamforming (e.g., a vertical pattern beamwidth and/or an adaptive control by downtilt), enhanced sectorization in vertical domain, UE-specific elevation beamforming and the like.

Vertical sectorization can improve average system performance through a gain of a vertical sector pattern and does not require an additional standard technology support in general.

The UE-specific elevation beamforming can enhance SNR for a UE in a manner of designating a vertical antenna pattern in UE direction. On the contrary, unlike the vertical sectorization and the sector-specific vertical beamforming, the UE-specific elevation beamforming requires an additional standard technology support. For example, in order to properly support a 2-dimensional port structure, it is required to have CSI measurement of a UE and a feedback method for the UE-specific elevation beamforming In order to support the UE-specific elevation beamforming, it is required to have a method of improving downlink MIMO. For instance, the method of improving downlink MIMO can include improving a CSI feedback method of a UE (e.g., design of a new codebook, a method of supporting selection/update/modification of a codebook, minimizing increase of a CSI payload size and the like), changing a CSI-RS configuration for the UE-specific elevation beamforming, defining an additional antenna port for the UE-specific elevation beamforming, improving a downlink control operation for supporting the UE-specific elevation beamforming (e.g., when the number of antenna ports increases, method of securing common channel coverage and/or RRM (radio resource management) measurement reliability, etc.) and the like.

And, in designing an improved downlink MIMO operation, it may be able to consider various elements including an eNB antenna calibration error (error in phase and time), an estimation error, downlink overhead, complexity, feedback overhead, backward compatibility, actual UE implementation, reuse of a legacy feedback framework, subband vs wideband feedback and the like.

Figure 12:
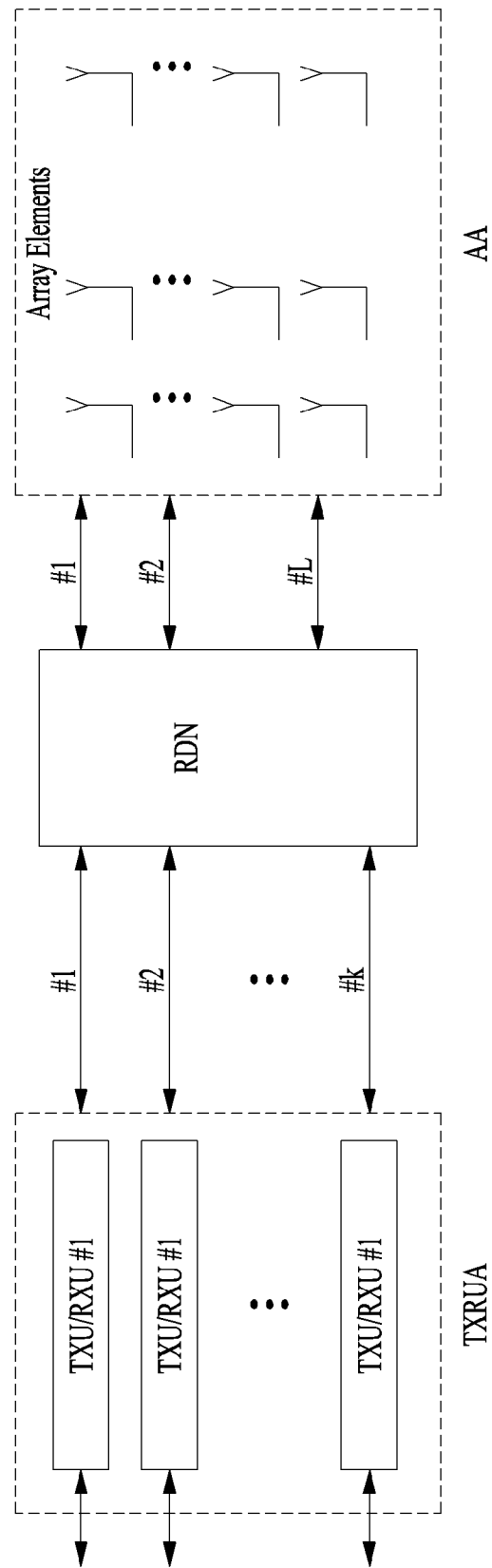
FIG. 12 is a diagram for explaining a general structure of an active antenna array system.

FIG. 12 is a diagram for explaining a general structure of an active antenna array system.

A structure of an active antenna array system (hereinafter abbreviated, AAS) can be logically represented by 3 main function blocks including a transceiver unit array (TXRUA), a radio distribution network (RDN) and an antenna array (AA). TXRUs have an interface with an eNode B and are configured to provide a reception input for base band processing of the eNB or receive transmission output from the base band processing of the eNB.

Specifically, the TXRUA can include a plurality of transmission units and a plurality of reception units. A transmission unit receives a base band input from an AAS base station and may be then able to provide an RF (radio frequency) transmission output. The RF transmission output can be distributed to the AA via the RDN. A reception unit can provide an RF reception input, which is distributed by the AA via the RDN, as an output for the base band processing.

In particular, the AAS can be defined as a base station system configured to combine the AA and an active TXRUA with each other. And, the AAS can include the RDN. The RDN corresponds to a passive network for physically separating the active TXRUA from the AA and defines mapping between the TXRUA and the AA. For instance, the RDN can convert the K number of transmission outputs from the TXRUA into the L number of outputs to the AA. Or, the RDN can convert the L number of reception inputs from the AA into the K number of inputs to the TXRUA.

And, the transmission unit and the reception unit can be separated from each other and mapping to antenna elements can be defined in the transmission unit and the reception unit in a manner of being different from each other.

Figure 13:
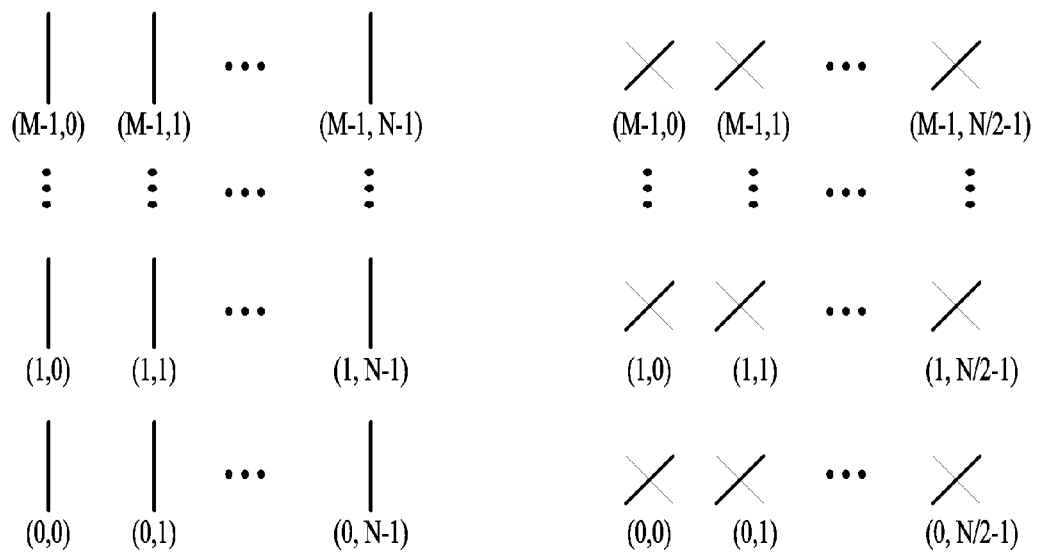
FIG. 13 is a diagram for explaining a 2-dimensional antenna array structure.

It may be able to assume that a base station system including the aforementioned AAS supports transmission diversity, beamforming, spatial multiplexing and a combination thereof FIG. 13 is a diagram for explaining a 2-demensional antenna array structure.

FIG. 13 (a) shows M×N antenna array and an index ranging from (0, 0) to (M−1, N−1) can be assigned to each of antenna elements. In the antenna array of FIG. 13 (a), it may consider that a column or a row is configured by ULA.

FIG. 13 (b) shows M×(N/2) antenna array and an index ranging from (0, 0) to (M−1, N/2−1) can be assigned to each of antenna elements. In the antenna array of FIG. 13 (b), it may consider that a column or a row is configured by a pair of cross-polarization array.

Figure 14:
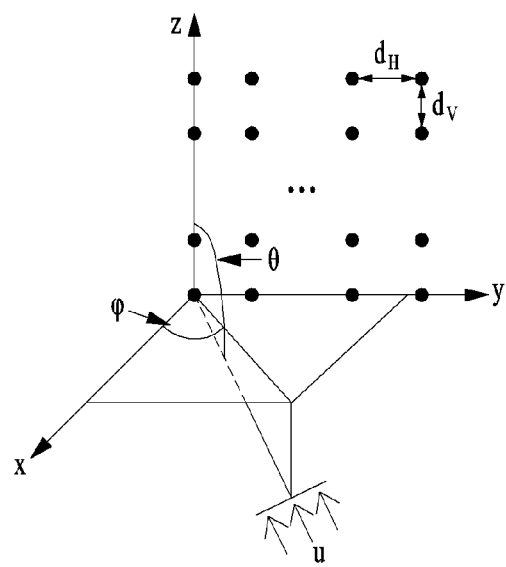
FIG. 14 is a diagram for explaining a geometric AAS.

FIG. 14 is a diagram for explaining a geometric AAS.

FIG. 14 shows a 3-dimensional space (i.e., a space defined by x, y, and z axis) for explaining an array factor including a plurality of columns, which are formed by a URA (uniform rectangular array) antenna structure. In this case, assume that $N_H$ number of antenna elements exist in horizontal direction (or in y axis direction) and $N_V$ number of antenna elements exist in vertical direction (or in z axis direction) on a yz plane. And, a space between antenna elements in horizontal direction is defined as $d_H$ and a space between antenna elements in vertical direction is defined as $d_V$.

Direction of a signal affecting an antenna array element is represented by u. An elevation angle of the signal direction is represented by θ and an azimuth angle of the signal direction is represented by ϕ.

Figure 15:
FIG. 15 is a diagram for explaining definition on an angle direction.

FIG. 15 is a diagram for explaining definition on an angle direction.

As shown in FIG. 15 (a), an elevation angle θ is defined by a value between 90 degrees and −90 degrees. As a value is getting close to 90 degrees, the value indicates an angle heading toward a downside (or a ground) and as a value is getting close to −90 degrees, the value indicates an angle heading toward an upside. 0 degree becomes a value indicating perpendicular direction to an antenna array element. And, as shown in FIG. 15 (b), an azimuth angle ϕ can be defined by a value between 0 degree and 180 degrees.

Or, depending on a reference value, an elevation angle θ of signal direction is defined by a value between 0 degree and 180 degrees. In this case, as the value is getting close to 0 degree, the value indicates an angle heading toward a downside (or ground) and as the value is getting close to 180 degrees, the value indicates an angle heading toward an upside. 90 degrees become a value indicating perpendicular direction to an antenna array element. And, an azimuth angle ϕ can be defined by a value between −180 degrees and 180 degrees.

The RDN can control side lobe levels and a tilt angle in a manner of giving a complex weight to a signal from each port and distributing the signal to a sub array. The complex weight can include an amplitude weight and a phase shift. A complex weight $W_{m,n}$ applied to an antenna element (m, n) can be given as shown in Equation 14 in the following.

$$w_{m,n}=|w_{m,n}|\exp(-j2\pi\lambda_0^{-1}(\bar{\phi}_{etilt}\cdot\bar{r}_{m,n})), (m,n)\in S_p \quad \text{[Equation 14]}$$

In Equation 14, m corresponds to 0, 1, . . . , $N_H$ or 1, 2, . . . , $N_H$ and n corresponds to 0, 1, . . . , $N_V$ or 1, 2, . . . , $N_V$. $S_p$ corresponds to a set of sub arrays associated with an antenna port p. $|w_{m,n}|$ corresponds to an amplitude weight applied to an antenna element (m, n). $\lambda_o$ means a wavelength on a free space. $\bar{r}_{m,n}$ corresponds to an element position vector and is defined as shown in Equation 15 in the following. $\bar{\phi}_{etilt}$ corresponds to a unit direction vector and is defined as shown in Equation 16 in the following.

$$\bar{r}_{m,n}=[0\, n\cdot d_H\, m\cdot d_V]^T \quad \text{[Equation 15]}$$

As shown in Equation 15, a meaning of the $\bar{r}_{m,n}$ may correspond to a distance from a starting point of an antenna element (m, n).

$$\bar{\phi}_{etilt}=[\cos\theta_{etilt}\, \cos\phi_{escan}\, \cos\theta_{etilt}\, \sin\phi_{escan}\, \sin\theta_{etilt}]^T \quad \text{[Equation 16]}$$

In Equation 16, $\theta_{etilt}$ corresponds to a vertical steering angle or an elevation angle and $\phi_{escan}$ corresponds to a horizontal steering angle or an azimuth angle. In particular, Equation 16 represents beam direction in 3-dimensional space by an angle. In this aspect, beamforming can be considered as controlling direction of a beam formed from an antenna array to a specific angle in a manner of identically compensating a phase difference experienced by each antenna.

An antenna pattern $A_p$, which means a radiation pattern for an antenna port p, can be given as shown in Equation 17 in the following. The radiation pattern may correspond to a shape of a beam formed by the antenna port p. For instance, the shape of the beam may have a thin shape concentrated on a prescribed position or a thick shape heading toward a prescribed range.

$$A_p(\theta,\varphi) = A_E(\theta,\varphi) + 10\log_{10}\left(\left|\sum_{(m,n)\in S_p} w_{m,n}\cdot v_{m,n}\right|^2\right) \quad \text{[Equation 17]}$$

In Equation 17, $A_E(\phi,\theta)$ indicates a composite array element pattern in dB unit and may follow what is defined in an element pattern in Table 14 in the following (Values of parameters (e.g., the number of radiation elements per row, the number of rows, maximum array gain in a single row etc.) necessary for applying the element pattern in Table 14 may refer to Technical report (TR) 37.840 document for example).

TABLE 14

| | |
|---|---|
| Horizontal radiation pattern in dB | $A_{E,H}(\varphi) = -\min\left[12\left(\frac{\varphi}{\varphi_{3dB}}\right)^2, A_m\right]$ dB |
| Front to back ratio | $A_m$ = 30 dB |
| Vertical radiation pattern in dB | $A_{E,V}(\theta) = -\min\left[12\left(\frac{\theta}{\theta_{3dB}}\right)^2, SLA_v\right]$ |
| Side lobe lower level | $SLA_v$ = 30 dB |
| Element pattern | $A_E(\phi,\theta) = G_{E,max} - \min\{-[A_{E,H}(\phi) + A_{E,V}(\theta)], A_m\}$ |
| Element Gain | $G_{E,max}$ = 8 dBi |

In Equation 17, $v_{m,n}$ corresponds to a phase shift factor due to array placement and is given as shown in Equation 18 in the following.

$$v_{m,n}=\exp(j2\pi\lambda_0^{-1}(\bar{\phi}\cdot\bar{r}_{m,n})), (m,n)\in S_p \quad \text{[Equation 18]}$$

In Equation 18, $\bar{\phi}$ is given as shown in Equation 19 in the following.

$$\bar{\phi}=[\cos\theta\,\cos\phi\,\cos\theta\,\sin\phi\,\sin\theta]^T \quad \text{[Equation 19]}$$

And, the maximum antenna gain of the AAS should be defined by sum of passive maximum antenna gain and losses of a cable network.

In the following, a plane array antenna (or URA) configuration is explained with reference to FIG. 16 and FIG. 17.

Figure 16:
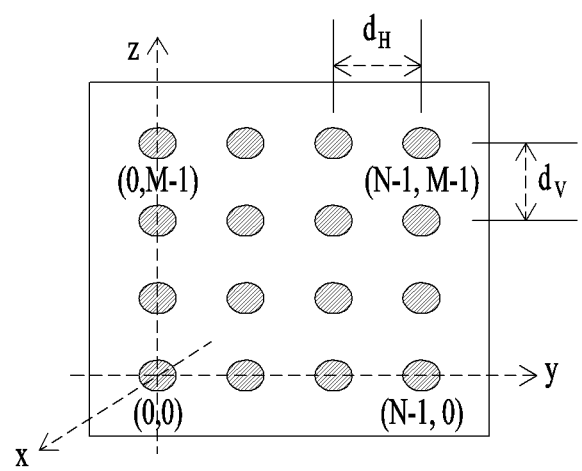
FIG. 16 is a diagram for a plane array antenna configuration.

FIG. 16 is a diagram for a plane array antenna configuration and FIG. 17 is a diagram for explaining different definition on an angle direction.

Although the example of FIG. 14 considers a 2-dimensional array of an antenna element (m, n), an example of FIG. 16 is explained under an assumption of a 2-dimensional array of an antenna element (n, m).

And, in the example of FIG. 15, although an elevation angle θ is defined by a value between −90 degrees and 90 degrees (in this case, 0 degree becomes a value indicating perpendicular angle to an antenna array element) and an azimuth angle φ is defined by a value between 0 degree and 180 degrees, an angle of signal direction can be defined by differentiating a reference value in an example of FIG. 17.

For instance, as shown in FIG. 17 (a), the elevation angle θ is defined by a value between −90 degrees and 90 degrees, as the value is getting close to −90 degrees, the value indicates an angle heading toward a downside (or ground) and as the value is getting close to 90 degrees, the value indicates an angle heading toward an upside. In this case, o degree becomes a value indicating perpendicular angle to an antenna array element. And, as shown in FIG. 17 (b), the azimuth angle φ can be defined by a value between −90 degrees and 90 degrees.

FIG. 18 is a diagram for examples of beamforming according to 2-dimensional antenna configuration.

FIG. 18 (a) shows vertical sectorization by 3-dimensional beamforming and FIG. 18 (b) shows vertical sectorization by 3-dimensional beamforming. Specifically, as shown in FIG. 18 (a), if beamforming is available by an elevation angle, sectorization of a vertical domain becomes available and horizontal beamforming can be performed according to an azimuth angle in each vertical sector. Moreover, as shown in FIG. 18 (b), in case of using elevation angle beamforming, a signal of high quality can be transmitted to users positioned at a location higher than an antenna of a base station.

FIG. 19 is a diagram for explaining examples of vertical beamforming,

Various buildings in height are distributed in city area. In general, a base station antenna is positioned at a rooftop of a building. A height of the building at which the antenna is positioned may or may not higher than a height of a surrounding building.

FIG. 19 (a) shows an example of beamforming in consideration of surrounding buildings higher than a height of a base station antenna. In this case, since there is no barrier between the base station antenna and a high rise building around the base station, a spatial channel of which a LOS (line of sight) component is strong can be generated. And, in case of beamforming aiming at a high rise building, adaptive beamforming according to a height of a building may become an important element compared to adaptive beamforming in horizontal direction in a building.

FIG. 19 (b) shows an example of beamforming in consideration of surrounding buildings lower than a height of a base station antenna. In this case, since a signal transmitted from the base station antenna is refracted by a rooftop of a building or is reflected by a different building or ground, a spatial channel in which many NLOS (non-line of sight) components are included can be generated. Hence, when a base station transmits a signal to a user using vertical beamforming heading toward a downside (or ground), a spatial channel including various paths, which are capable of being represented by an elevation angle and an azimuth angle, can be generated.

Method of Designing Precoding Codebook for Supporting 2-Dimensional Antenna Structure The present invention proposes a method of designing a precoding codebook to properly and efficiently support such a scheme as UE-specific elevation beamforming, vertical sectorization and the like capable of being performed by a 2-dimensional antenna structure.

According to a legacy system, vertical direction of a beam is fixed (i.e., the vertical direction of the beam is unable to be selected/controlled) and beamforming is performed in horizontal direction only. In order for a base station to determine most suitable horizontal beamforming and receive a CSI report including PMI and the like from a UE, the base station indicates the UE a CSI-RS configuration and may be then able to transmit a CSI-RS to the UE according to the CSI-RS configuration. To indicate the CSI-RS configuration means to provide one or more information (e.g., a CSI-RS port, CSI-RS transmission timing, an RE position in which the CSI-RS is transmitted and the like) included in CSI-RS-Config IE shown in Table 2.

In order to perform 3-dimensional beamforming, it is necessary to have not only previously prepared horizontal beamforming but also vertical beamforming (or selection of a vertical beam). A concrete method for the additional vertical beamforming is not defined yet.

In order to explain a basic principle of the present invention, it may assume a 2-dimensional URA (or UPA) as a combination form of a first domain (e.g., horizontal domain) ULA and a second domain (e.g., vertical domain) ULA. For example, a 3-dimensional beam can be formed in a manner of determining an azimuth angle in the horizontal domain after an elevation angle is determined in the vertical domain or in a manner of determining an elevation angle in the vertical domain after an azimuth angle is determined in the horizontal domain. As mentioned above, selecting a ULA from one of the first and the second domain in a 2-dimensional antenna structure is called regional selection or domain selection. As mentioned in the foregoing description, not only horizontal beamforming (or azimuth angle direction beamforming) but also vertical beamforming (or elevation angle direction beamforming) can be performed in the 2-dimensional antenna structure.

In the legacy system, a precoding codebook, which is designed for horizontal direction beamforming, can be designed to divide all directions of an azimuth angle by an equal space or form a random beam direction. For instance, a phase of a codebook, which is designed based on DFT (Discrete Fourier Transform), is determined in a form of $e^{j2\pi nk/N}$. In this case, $2\pi/N$ can be comprehended as a meaning that a phase is divided by an equal space. Or, a random beam direction can be comprehended as a meaning that a codebook is determined in a form of including a random phase value. Hence, if one of element(s) included in a predetermined codebook corresponds to a specific precoding matrix or a specific beam direction and a UE gives feedback on information (e.g., PMI) indicating a specific element in the codebook to a base station, a beam direction preferred by the UE can be reported to the base station.

In order to efficiently support 2-dimensional antenna transmission, it is also necessary for a UE to report a PMI for vertical beamforming To this end, it is required to design a codebook usable for the vertical beamforming. In designing the codebook for the vertical beamforming, similar to the legacy codebook design, if a scheme of dividing an azimuth angle by an equal space is applied as it is, it is not efficient. As mentioned earlier in the examples of FIG. 18 and FIG. 19, this is because it is likely form a beam in direction lower than an antenna in vertical direction beamforming Hence, in case of designing a codebook, it may be efficient to include elements corresponding to a beam direction, which is capable of being most frequently used, in a codeword. If a scheme of dividing an elevation angle by an equal space is applied to a design of the codebook usable for the vertical beamforming, while the number of beam direction capable of being represented by the codebook is limitative, a beamforming weight of low possibility of use can be included in a codebook element. Hence, when an appropriate beamforming weight is calculated in the codebook, unnecessary calculation may increase or an improper codebook element incapable of representing an actual beam direction preferred by a UE can be selected/determined Therefore, the present invention proposes a method of designing a codebook capable of solving the aforementioned problem.

And, in various embodiments proposed by the present invention, definition on an angle direction should be comprehended as following the definition on the angle direction mentioned earlier in FIG. 15, by which a scope of the present invention may be non-limited. It is apparent that the principle proposed by the present invention can also be identically applied to definition on a different angle direction in a manner of replacing a number of an angle.

Implementation Form 1

The implementation form 1 corresponds to a method of configuring a precoding matrix (or a precoding vector) supporting delicate and efficient 3-dimensional beamforming in consideration of a relation between vertical beamforming and horizontal beamforming when a feedback codebook for precoding is configured. And, the implementation form 1 proposes a method of configuring a codebook making a beam of a specific angle range to be formed in elevation angle direction. For instance, the aforementioned principle can be applied to a case of representing a vertical beamforming weight based on DoA (direction of arrival) and a case of representing a vertical beamforming weight based on DFT. Moreover, the principle can be applied to a weight vector for horizontal beamforming as well.

Embodiment 1

If an elevation angle 0 degree corresponds to a value indicating perpendicular direction to an antenna array, a codebook for vertical beamforming can include a weight vector capable of forming a beam ranging from −90 degrees to 90 degrees of elevation angles.

Embodiment 1-1

A weight vector for vertical beamforming to 2-dimensional antenna array can be represented as Equation 20 in the following based on DoA.

$$W_v = e^{j \cdot 2\pi \cdot m \cdot dV \cdot \sin(\theta)/\lambda} / \sqrt{M} \qquad \text{[Equation 20]}$$

In Equation 20, $W_v$ corresponds to a weight vector for vertical beamforming M indicates the number of antennas in vertical domain, m indicates an antenna number (or an antenna index) in vertical domain (e.g., m=0, 1, . . . , M−1) and dv indicates a distance between antennas in vertical domain. $\lambda$ indicates a wavelength and $\theta$ indicates an elevation angle.

If an elevation angle has a value between −90 degrees and 90 degrees, a range of a variable $\theta$ of the weight vector becomes −90 degrees≤$\theta$≤90 degrees. Hence, $\sin(\theta)$ may have a value of −1≤$\sin(\theta)$≤1 range.

Embodiment 1-2

A weight vector for horizontal beamforming to 2-dimensional antenna array can be represented as Equation 21 in the following based on DoA.

$$W_h = e^{j \cdot 2\pi \cdot n \cdot dh \cdot \cos(\theta) \cdot \sin(\psi)/\lambda} / \sqrt{N} \qquad \text{[Equation 21]}$$

In Equation 21, $W_h$ corresponds to a weight vector for horizontal beamforming N indicates the number of antennas in horizontal domain, n indicates an antenna number (or an antenna index) in horizontal domain (e.g., n=0, 1, . . . , N−1) and dh indicates a distance between antennas in horizontal domain. $\lambda$ indicates a wavelength, $\theta$ indicates an elevation angle and $\psi$ indicates an azimuth angle.

If an elevation angle has a value between −90 degrees and 90 degrees, a range of a variable $\theta$ of the weight vector becomes −90 degrees≤$\theta$≤90 degrees. Hence, $\cos(\theta)$ may have a value of 0≤$\cos(\theta)$≤1 range.

If an azimuth angle has a value between −180 degrees and 180 degrees (or between −90 degrees and 90 degrees), a range of a variable $\psi$ of the weight vector becomes −180 degrees≤$\psi$≤180 degrees (or −90 degrees≤$\psi$≤90 degrees). Hence, $\sin(\psi)$ may have a value of −1≤$\sin(\psi)$≤1 range.

Embodiment 1-3

A weight vector for vertical beamforming to 2-dimensional antenna array can be represented as Equation 22 in the following based on DFT.

$$W_v = e^{j \cdot 2\pi \cdot m \cdot k/K} / \sqrt{M} \qquad \text{[Equation 22]}$$

In Equation 22, $W_v$ corresponds to a weight vector for vertical beamforming M indicates the number of antennas in vertical domain, m indicates an antenna number (or an antenna index) in vertical domain (e.g., m=0, 1, . . . , M−1). K indicates the number of beams in vertical domain and k indicates a beam number (or a beam index) in vertical domain. If an elevation angle has a value between −90 degrees and 90 degrees, the k may have a value between 0 and the K (e.g., k=0, 1, . . . , K−1).

In Equation 20 of embodiment 1-1 based on DoA, if dv corresponds to $\lambda/2$, the Wv can be represented as $\exp(j \times \pi \times m \times \sin(\theta))/\sqrt{M}$. In this case, if $\theta$ is equal to or greater than −90 degrees and equal to or less than 90 degrees, it may be represented as −1≤$\sin(\theta)$≤1. Meanwhile, in Equation 22 of the present embodiment 1-3 based on DFT, if 2k/K has a value of a range ranging from 0 to 2 according to a beam index k, it may be able to configure a relation between a range of an elevation angle $\theta$ in a DoA-based scheme and the beam index k in a DFT-based scheme.

In the DFT-based scheme, if the k=0, 1, . . . , K/2, the 2k/K has a value of 0 to 1. In this case, a range of the 2k/K value is identical to a range of $\sin(\theta)$ value in case that an elevation angle $\theta$ has 0°≤$\theta$≤90° range (i.e., 0≤$\sin(\theta)$≤1).

Moreover, if the k=K/2, K/2+1, K, the 2k/K has a value of 1 to 2. In this case, if it is assumed that A corresponds to $\pi \times 2k/K$, a range of the A becomes $\pi$ to $2\pi$. And, in terms of $\exp(jA)$, when the range of the A value corresponds to the range $\pi$ to $2\pi$, a value of the $\exp(jA)$ is identical to a value of $\exp(jA)$ in case that the range of the A value corresponds to $-\pi$ to 0. This can be considered as the 2k/K value has a value ranging from −1 to 0. In this case, a range of the 2k/K value is identical to a range of $\sin(\theta)$ in case that an elevation angle $\theta$ has −90°≤$\theta$≤0° range (i.e., −1≤$\sin(\theta)$≤0).

For example, if an elevation angle $\theta$ is configured as 0°≤$\theta$≤90° in the DoA-based scheme, it may correspond to a case that the beam index k is configured by a value of a range 0 to K/2 in the DFT-based scheme.

And, if an elevation angle $\theta$ is configured as 0°≤$\theta$≤90° in the DoA-based scheme, it may correspond to a case that the beam index k is configured by a value of a range K/2 to K in the DFT-based scheme.

Embodiment 1-4

A weight vector for horizontal beamforming to 2-dimensional antenna array can be represented as Equation 23 in the following based on DFT.

$$W_h = e^{j \cdot 2\pi \cdot n \cdot c \cdot h/H} / \sqrt{N} \qquad \text{[Equation 23]}$$

In Equation 23, $W_h$ corresponds to a weight vector for horizontal beamforming N indicates the number of antennas in horizontal domain, n indicates an antenna number (or an antenna index) in horizontal domain. H indicates the number of beams in horizontal domain, h indicates a beam number (or a beam index) in horizontal domain and c is a value determined according to a beam index for vertical beamforming If an azimuth angle has a value between −180 degrees and 180 degrees (or between −90 degrees and 90 degrees), the n may have a value between 0 and the N (e.g., n=0, 1, . . . , N−1).

If a vertical beam index k has a value between 0 and the K, the c can be configured to have a value between 0 and 1. Specifically, as shown in the embodiment 1-3, if an elevation angle $\theta$ has a value of −90°≤$\theta$≤90° range, a variable k of a weight vector for vertical beamforming may have a value between 0 and K. The weight vector for horizontal beamforming includes a value (i.e., c) which is determined according to a beam index selected in vertical beamforming. The value can be defined as Equation 24 in the following.

$$c=\sqrt{1-(2k/K-1)^2}$$ [Equation 24]

As shown in Equation 24, the c value has a meaning of a coefficient or a variable for matching $\sin^2(\theta)+\cos^2(\theta)=1$. In this aspect, $\sin(\theta)$ corresponds to the k and $\cos(\theta)$ corresponds to the c.

In doing so, an appropriate angle ψ can be selected in horizontal domain according to an angle θ selected in vertical domain. When an azimuth angle is selected in consideration of horizontal domain only irrespective of (separately, independently) the elevation angle selected in vertical domain, if beamforming in elevation angle direction is actually applied, most of originally selected azimuth angle direction is unable to secure optimized performance. Hence, in order to enable more precise beamforming to be performed, it may be preferable to select an appropriate angle ψ in horizontal domain according to the angle selected in vertical domain (or in consideration of the θ or in a manner of being subordinated to the θ).

Hence, according to the present invention, if a precoding codebook including weight vector(s) using the c value is designed, in terms of a UE, the UE can perform CSI feedback including more precise and efficient precoding information. In terms of a base station, the base station can perform more precise and efficient precoding (or beamforming)

Embodiment 1-5

A weight vector for horizontal beamforming to 2-dimensional antenna array can be represented as Equation 25 in the following based on DoA.

$$w_h = e^{j \cdot 2\pi \cdot n \cdot d_h \cdot \sin(\psi)/\lambda}/\sqrt{N}$$ [Equation 25]

In Equation 25, $W_h$ corresponds to a weight vector for horizontal beamforming N indicates the number of antennas in horizontal domain, n indicates an antenna number (or an antenna index) in horizontal domain (e.g., n=0, 1, . . . , N−1) and dh indicates a distance between antennas in horizontal domain. Λ indicates a wavelength and ψ indicates an azimuth angle.

If an azimuth angle has a value between −180 degrees and 180 degrees (or between −90 degrees and 90 degrees), a range of a variable ψ of the weight vector becomes −180 degrees≤ψ≤180 degrees (or −90 degrees≤ψ≤90 degrees). Hence, sin(ψ) may have a value of −1≤sin(ψ)≤1 range.

The present embodiment 1-5 corresponds to a case that θ corresponds to 0 degree in the embodiment 2-1. In this aspect, the present embodiment corresponds to a scheme of selecting an azimuth angle without considering an elevation angle (or in a manner of assuming an elevation angle as 0 degree). Hence, although accuracy of actual beam direction is somewhat degraded, this scheme can be considered as an efficient scheme in the aspect of reducing calculation complexity of a UE.

Embodiment 1-6

A weight vector for horizontal beamforming to 2-dimensional antenna array can be represented as Equation 26 in the following based on DFT.

$$w_h = e^{j \cdot 2\pi \cdot n \cdot h/H}/\sqrt{N}$$ [Equation 26]

In Equation 26, $W_h$ corresponds to a weight vector for horizontal beamforming N indicates the number of antennas in horizontal domain, n indicates an antenna number (or an antenna index) in horizontal domain. H indicates the number of beams in horizontal domain and h indicates a beam number (or a beam index) in horizontal domain.

If an azimuth angle has a value between −180 degrees and 180 degrees (or between −90 degrees and 90 degrees), the n may have a value between 0 and the N (e.g., n=0, 1, . . . , N−1).

The present embodiment 1-6 corresponds to a case that c value is assumed as 1 in the embodiment 1-4. In this aspect, the present embodiment corresponds to a scheme of selecting an azimuth angle without considering an elevation angle (or in a manner of assuming an elevation angle as 0 degree). Hence, although accuracy of actual beam direction is somewhat degraded, this scheme can be considered as an efficient scheme in the aspect of reducing calculation complexity of a UE.

Embodiment 2

If an elevation angle 0 degree corresponds to a value indicating perpendicular direction to an antenna array, a codebook for vertical beamforming can include a weight vector capable of forming a beam ranging from 0 degree to 90 degrees of elevation angles.

Embodiment 2-1

A weight vector for vertical beamforming to 2-dimensional antenna array can be represented as Equation 27 in the following based on DoA.

$$W_v = e^{j \cdot 2\pi \cdot m \cdot d_v \cdot \sin(\theta)/\lambda}/\sqrt{M}$$ [Equation 27]

In Equation 27, $W_v$ corresponds to a weight vector for vertical beamforming M indicates the number of antennas in vertical domain, m indicates an antenna number (or an antenna index) in vertical domain (e.g., m=0, 1, . . . , M−1) and dv indicates a distance between antennas in vertical domain. Λ indicates a wavelength and θ indicates an elevation angle.

If an elevation angle has a value between 0 degree and 90 degrees, a range of a variable θ of the weight vector becomes 0 degree≤θ≤90 degrees. Hence, sin(θ) may have a value of 0≤sin(θ)≤1 range.

Embodiment 2-2

A weight vector for horizontal beamforming to 2-dimensional antenna array can be represented as Equation 28 in the following based on DoA.

$$W_h = e^{j \cdot 2\pi \cdot n \cdot d_h \cdot \cos(\theta) \cdot \sin(\psi)/\lambda}/\sqrt{N}$$ [Equation 28]

In Equation 28, $W_h$ corresponds to a weight vector for horizontal beamforming N indicates the number of antennas in horizontal domain, n indicates an antenna number (or an antenna index) in horizontal domain (e.g., n=0, 1, . . . , N−1) and dh indicates a distance between antennas in horizontal domain. Λ indicates a wavelength, θ indicates an elevation angle and ψ indicates an azimuth angle.

If an elevation angle has a value between 0 degree and 90 degrees, a range of a variable θ of the weight vector becomes 0 degree≤θ≤90 degrees. Hence, cos(θ) may have a value of 0≤cos(θ)≤1 range.

If an azimuth angle has a value between −180 degrees and 180 degrees (or between −90 degrees and 90 degrees), a range of a variable ψ of the weight vector becomes −180 degrees≤ψ≤180 degrees (or −90 degrees≤ψ≤90 degrees). Hence, sin(ψ) may have a value of −1≤sin(ψ)≤1 range.

Embodiment 2-3

A weight vector for vertical beamforming to 2-dimensional antenna array can be represented as Equation 29 in the following based on DFT.

$$w_v = e^{j \cdot 2\pi \cdot m \cdot k/K}/\sqrt{M}$$ [Equation 29]

Equation 29, $W_v$ corresponds to a weight vector for vertical beamforming M indicates the number of antennas in vertical domain, m indicates an antenna number (or an antenna index) in vertical domain (e.g., m=0, 1, . . . , M−1). K indicates the number of beams in vertical domain and k indicates a beam number (or a beam index) in vertical domain. If an elevation angle has a value between 0 degree and 90 degrees, the k may have a value between 0 and the K/2 (e.g., k=0, 1, . . . , K/2−1).

In Equation 27 of embodiment 2-1 based on DoA, if dv corresponds to $\lambda/2$, the Wv can be represented as $\exp(j\times\pi\times m\times\sin(\theta))/\sqrt{M}$. In this case, if $\theta$ is equal to or greater than 0 degree and equal to or less than 90 degrees, it may be represented as $0\leq\sin(\theta)\leq1$. Meanwhile, in Equation 29 of the present embodiment 2-3 based on DFT, if 2k/K has a value of a range ranging from 0 to 2 according to a beam index k, it may be able to configure a relation between a range of an elevation angle $\theta$ in a DoA-based scheme and the beam index k in a DFT-based scheme.

In the DFT-based scheme, if the k=0, 1, . . . , K/2, the 2k/K has a value of 0 to 1. In this case, a range of the 2k/K value is identical to a range of $\sin(\theta)$ value in case that an elevation angle $\theta$ has $0°\leq\theta\leq90°$ range (i.e., $0\leq\sin(\theta)\leq1$).

Hence, if an elevation angle $\theta$ is configured as $0°\leq\theta\leq90°$ in the DoA-based scheme, it may correspond to a case that the beam index k is configured by a value of a range 0 to K/2 in the DFT-based scheme.

Embodiment 2-4

A weight vector for horizontal beamforming to 2-dimensional antenna array can be represented as Equation 30 in the following based on DFT.

$$w_h = e^{j\cdot 2\pi\cdot n\cdot c\cdot h/H}/\sqrt{N} \quad \text{[Equation 30]}$$

In Equation 30, $W_h$ corresponds to a weight vector for horizontal beamforming N indicates the number of antennas in horizontal domain, n indicates an antenna number (or an antenna index) in horizontal domain. H indicates the number of beams in horizontal domain, h indicates a beam number (or a beam index) in horizontal domain and c is a value determined according to a beam index for vertical beamforming If an azimuth angle has a value between −180 degrees and 180 degrees (or between −90 degrees and 90 degrees), the n may have a value between 0 and the N (e.g., n=0, 1, . . . , N−1).

If a vertical beam index k has a value between 0 and the K/2, the c can be configured to have a value between 0 and 1.

Specifically, as shown in the embodiment 2-3, if an elevation angle $\theta$ has a value of $0°\leq\theta\leq90°$ range, a variable k of a weight vector for vertical beamforming may have a value between 0 and K/2. The weight vector for horizontal beamforming includes a value (i.e., c) which is determined according to a beam index selected in vertical beamforming. The value can be defined as Equation 31 in the following.

$$c = \sqrt{1-(2k/K-1)^2} \quad \text{[Equation 31]}$$

As shown in Equation 31, the c value has a meaning of a coefficient or a variable for selecting an appropriate angle $\psi$ in horizontal domain according to an angle $\theta$ selected in vertical domain (or in consideration of $\theta$ or in a manner of being subordinated to $\theta$).

Meanwhile, as described in the present implementation form, if an elevation angle is restricted (e.g., $0°\leq\theta\leq90°$), calculation complexity of a UE can be reduced in a manner of simply setting the c value to 1 (or in a manner of assuming an elevation angle $\theta$ as 0 degree). Regarding this, it is described in the following with reference to examples.

Embodiment 2-5

A weight vector for horizontal beamforming to 2-dimensional antenna array can be represented as Equation 32 in the following based on DoA.

$$w_h = e^{j\cdot 2\pi\cdot n\cdot d_h\cdot\sin(\phi)/\lambda}/\sqrt{N} \quad \text{[Equation 32]}$$

In Equation 32, $W_h$ corresponds to a weight vector for horizontal beamforming N indicates the number of antennas in horizontal domain, n indicates an antenna number (or an antenna index) in horizontal domain (e.g., n=0, 1, . . . , N−1) and dh indicates a distance between antennas in horizontal domain. $\lambda$ indicates a wavelength and $\psi$ indicates an azimuth angle.

If an azimuth angle has a value between −180 degrees and 180 degrees (or between −90 degrees and 90 degrees), a range of a variable $\psi$ of the weight vector becomes −180 degrees$\leq\psi\leq$180 degrees (or −90 degrees$\leq\psi\leq$90 degrees). Hence, $\sin(\psi)$ may have a value of $-1\leq\sin(\psi)\leq1$ range.

The present embodiment 2-5 corresponds to a case that $\theta$ corresponds to 0 degree in the embodiment 2-2. In this aspect, the present embodiment corresponds to a scheme of selecting an azimuth angle without considering an elevation angle (or in a manner of assuming an elevation angle as 0 degree). Hence, although accuracy of actual beam direction is somewhat degraded, this scheme can be considered as an efficient scheme in the aspect of reducing calculation complexity of a UE.

Embodiment 2-6

A weight vector for horizontal beamforming to 2-dimensional antenna array can be represented as Equation 33 in the following based on DFT.

$$w_h = e^{j\cdot 2\pi\cdot n\cdot h/H}/\sqrt{N} \quad \text{[Equation 33]}$$

In Equation 33, $W_h$ corresponds to a weight vector for horizontal beamforming N indicates the number of antennas in horizontal domain, n indicates an antenna number (or an antenna index) in horizontal domain. H indicates the number of beams in horizontal domain and h indicates a beam number (or a beam index) in horizontal domain.

If an azimuth angle has a value between −180 degrees and 180 degrees (or between −90 degrees and 90 degrees), the n may have a value between 0 and the N (e.g., n=0, 1, . . . , N−1).

The present embodiment 2-6 corresponds to a case that c value is assumed as 1 in the embodiment 2-4. In this aspect, the present embodiment corresponds to a scheme of selecting an azimuth angle without considering an elevation angle (or in a manner of assuming an elevation angle as 0 degree). Hence, although accuracy of actual beam direction is somewhat degraded, this scheme can be considered as an efficient scheme in the aspect of reducing calculation complexity of a UE.

Embodiment 3

If an elevation angle 0 degree corresponds to a value indicating perpendicular direction to an antenna array, a codebook for vertical beamforming can include a weight vector capable of forming a beam ranging from −90 degrees to 0 degree of elevation angles.

Embodiment 3-1

A weight vector for vertical beamforming to 2-dimensional antenna array can be represented as Equation 34 in the following based on DoA.

$$W_v = e^{j\cdot 2\pi\cdot m\cdot d_v\cdot\sin(\theta)/\lambda}/\sqrt{M} \quad \text{[Equation 34]}$$

In Equation 34, $W_v$ corresponds to a weight vector for vertical beamforming M indicates the number of antennas in vertical domain, m indicates an antenna number (or an antenna index) in vertical domain (e.g., m=0, 1, . . . , M−1) and dv indicates a distance between antennas in vertical domain. $\lambda$ indicates a wavelength and $\theta$ indicates an elevation angle.

If an elevation angle has a value between −90 degrees and 0 degree, a range of a variable $\theta$ of the weight vector becomes −90 degrees$\leq\theta\leq0$ degree. Hence, $\sin(\theta)$ may have a value of $-1\leq\sin(\theta)\leq0$ range.

Embodiment 3-2

A weight vector for horizontal beamforming to 2-dimensional antenna array can be represented as Equation 35 in the following based on DoA.

$$W_h = e^{j\cdot 2\pi\cdot n\cdot d_h\cdot\cos(\theta)\cdot\sin(\phi)/\lambda}/\sqrt{N} \quad \text{[Equation 35]}$$

In Equation 35, $W_h$ corresponds to a weight vector for horizontal beamforming N indicates the number of antennas in horizontal domain, n indicates an antenna number (or an antenna index) in horizontal domain (e.g., n=0, 1, ..., N−1) and dh indicates a distance between antennas in horizontal domain. Λ indicates a wavelength, θ indicates an elevation angle and ψ indicates an azimuth angle.

If an elevation angle has a value between −90 degrees and 0 degree, a range of a variable θ of the weight vector becomes −90 degrees≤θ≤0 degree. Hence, cos(θ) may have a value of 0≤cos(θ)≤1 range.

If an azimuth angle has a value between −180 degrees and 180 degrees (or between −90 degrees and 90 degrees), a range of a variable ψ of the weight vector becomes −180 degrees≤ψ≤180 degrees (or −90 degrees≤ψ≤90 degrees). Hence, sin(ψ) may have a value of −1≤sin(ψ)≤1 range.

Embodiment 3-3

A weight vector for vertical beamforming to 2-dimensional antenna array can be represented as Equation 36 in the following based on DFT.

$$w_v = e^{j \cdot 2\pi \cdot m \cdot k/K} / \sqrt{M} \qquad \text{[Equation 36]}$$

In Equation 36, $W_v$ corresponds to a weight vector for vertical beamforming M indicates the number of antennas in vertical domain, m indicates an antenna number (or an antenna index) in vertical domain (e.g., m=0, 1, ..., M−1). K indicates the number of beams in vertical domain and k indicates a beam number (or a beam index) in vertical domain. If an elevation angle has a value between 0 degree and 90 degrees, the k may have a value between K/2 and the K (e.g., k=K/2, K/2+1, ..., K−1).

In Equation 34 of the embodiment 3-1 based on DoA, if dv corresponds to λ/2, the Wv can be represented as exp(j×π×m×sin(θ))/sqrt(M). In this case, if θ is equal to or greater than −90 degrees and equal to or less than 0 degree, it may be represented as −1≤sin(θ)≤0. Meanwhile, in Equation 36 of the present embodiment 3-3 based on DFT, if 2k/K has a value of a range ranging from 1 to 2 according to a beam index k, it may be able to configure a relation between a range of an elevation angle θ in a DoA-based scheme and the beam index k in a DFT-based scheme.

In the DFT-based scheme, if the k=K/2, K/2+1, K, the 2k/K has a value of 1 to 2. In this case, if it is assumed that A corresponds to π×2k/K, a range of the A becomes π to 2π. And, in terms of exp(jA), when the range of the A value corresponds to the range π to 2π, a value of the exp(jA) is identical to a value of exp(jA) in case that the range of the A value corresponds to −π to 0. This can be considered as the 2k/K value has a value ranging from −1 to 0. In this case, a range of the 2k/K value is identical to a range of sin(θ) in case that an elevation angle θ has −90°≤θ≤0° range (i.e., −1≤sin(θ)≤0).

For example, if an elevation angle θ is configured as −90°≤θ≤0° in the DoA-based scheme, it may correspond to a case that the beam index k is configured by a value of a range K/2 to K in the DFT-based scheme.

Embodiment 3-4

A weight vector for horizontal beamforming to 2-dimensional antenna array can be represented as Equation 37 in the following based on DFT.

$$w_h = e^{j \cdot 2\pi \cdot n \cdot c \cdot h/H} / \sqrt{N} \qquad \text{[Equation 37]}$$

In Equation 37, $W_h$ corresponds to a weight vector for horizontal beamforming N indicates the number of antennas in horizontal domain, n indicates an antenna number (or an antenna index) in horizontal domain. H indicates the number of beams in horizontal domain, h indicates a beam number (or a beam index) in horizontal domain and c is a value determined according to a beam index for vertical beamforming If an azimuth angle has a value between −180 degrees and 180 degrees (or between −90 degrees and 90 degrees), the n may have a value between 0 and the N (e.g., n=0, 1, ..., N−1).

If a vertical beam index k has a value between K/2 and K, the c can be configured to have a value between 1 and 0.

Specifically, as shown in the embodiment 3-3, if an elevation angle θ has a value of −90°≤θ≤0° range, a variable k of a weight vector for vertical beamforming may have a value between K/2 and K. The weight vector for horizontal beamforming includes a value (i.e., c) which is determined according to a beam index selected in vertical beamforming. The value can be defined as Equation 38 in the following.

$$c = \sqrt{(1-(2k/K-1)^2}  \qquad \text{[Equation 38]}$$

As shown in Equation 38, the c value has a meaning of a coefficient or a variable for selecting an appropriate angle ψ in horizontal domain according to an angle θ selected in vertical domain (or in consideration of θ or in a manner of being subordinated to θ).

Meanwhile, as described in the present implementation form, if an elevation angle is restricted (e.g., −90°≤θ≤0°), calculation complexity of a UE can be reduced in a manner of simply setting the c value to 1 (or in a manner of assuming an elevation angle θ as 0 degree). Regarding this, it is described in the following with reference to examples.

Embodiment 3-5

A weight vector for horizontal beamforming to 2-dimensional antenna array can be represented as Equation 39 in the following based on DoA.

$$w_h = e^{j \cdot 2\pi \cdot n \cdot d_h \cdot \sin(\psi)/\lambda} / \sqrt{N} \qquad \text{[Equation 39]}$$

In Equation 39, $W_h$ corresponds to a weight vector for horizontal beamforming N indicates the number of antennas in horizontal domain, n indicates an antenna number (or an antenna index) in horizontal domain (e.g., n=0, 1, ..., N−1) and dh indicates a distance between antennas in horizontal domain. Λ indicates a wavelength and ψ indicates an azimuth angle.

If an azimuth angle has a value between −180 degrees and 180 degrees (or between −90 degrees and 90 degrees), a range of a variable ψ of the weight vector becomes −180 degrees≤ψ≤180 degrees (or −90 degrees≤ψ≤90 degrees). Hence, sin(ψ) may have a value of −1≤sin(ψ)≤1 range.

The present embodiment 3-5 corresponds to a case that θ corresponds to 0 degree in the embodiment 3-2. In this aspect, the present embodiment corresponds to a scheme of selecting an azimuth angle without considering an elevation angle (or in a manner of assuming an elevation angle as 0 degree). Hence, although accuracy of actual beam direction is somewhat degraded, this scheme can be considered as an efficient scheme in the aspect of reducing calculation complexity of a UE.

Embodiment 3-6

A weight vector for horizontal beamforming to 2-dimensional antenna array can be represented as Equation 40 in the following based on DFT.

$$w_h = e^{j \cdot 2\pi \cdot n \cdot h/H} / \sqrt{N} \qquad \text{[Equation 40]}$$

In Equation 40, $W_h$ corresponds to a weight vector for horizontal beamforming N indicates the number of antennas in horizontal domain, n indicates an antenna number (or an antenna index) in horizontal domain. H indicates the number of beams in horizontal domain and h indicates a beam number (or a beam index) in horizontal domain.

If an azimuth angle has a value between −180 degrees and 180 degrees (or between −90 degrees and 90 degrees), the n may have a value between 0 and the N (e.g., n=0, 1, ..., N−1).

The present embodiment 3-6 corresponds to a case that c value is assumed as 1 in the embodiment 3-4. In this aspect, the present embodiment corresponds to a scheme of selecting an azimuth angle without considering an elevation angle (or in a manner of assuming an elevation angle as 0 degree). Hence, although accuracy of actual beam direction is somewhat degraded, this scheme can be considered as an efficient scheme in the aspect of reducing calculation complexity of a UE.

The aforementioned method of configuring a precoding codebook proposed by the present invention can additionally consider items described in the following.

In case of configuring a precoding matrix (or a precoding vector) included in the precoding codebook, resolution of vertical beamforming can be differently configured according to a value of an elevation angle (or a range of the elevation angle). Since a physical antenna array is actually deployed at a rooftop of a high rise building, it is expected that the number of a case (e.g., FIG. 19 (b)) of deploying the antenna array at a position higher than a position of a target of transceiving a signal is greater than the number of an opposite case (e.g., FIG. 19 (a)). And, in case of deploying the antenna array at a position higher than a position of the target of transceiving a signal (e.g., FIG. 19 (b)), when refraction due to various barriers, reflection and the like are considered, it is required to control beam direction in more detail compared to the opposite case (e.g., FIG. 19 (a)).

Given this, when an elevation angle 0 degree corresponds to a value indicating perpendicular direction to the antenna array and an elevation angle has a range ranging from −90 degrees to 90 degrees (or a range ranging from 0 degree to 90 degrees), if the elevation angle is getting close to 90 degrees (i.e., if the elevation angle is heading toward down direction), it is able to design a precoding codebook to have vertical beamforming of denser resolution. And, it is able to design a precoding codebook to have vertical beamforming of less dense as the elevation angle is getting close to an opposite direction (−90 degrees or 0 degree). In particular, in a precoding codebook including a precoding weight vector/matrix for vertical beamforming, resolution of the precoding weight vector/matrix for vertical beamforming can be configured to be lower when the elevation angle is close to 0 degree compared to a case that the elevation angle is close to 90 degrees. And, in the precoding codebook, the number of precoding matrixes (or precoding vectors) corresponding to an angle near an elevation angle 90 degrees can be greater than the number of precoding matrixes (or precoding vectors) corresponding to an angle near an elevation angle −90 degrees (or o degree).

Moreover, in case of configuring a precoding matrix (or precoding vector) included in a precoding codebook, resolution of horizontal beamforming can be differently configured according to a value of an elevation angle (or a range of the elevation angle). For a reason identical to what is mentioned above, since it is profitable to configure beam direction in more detail as an elevation angle is getting close to 90 degrees, a precoding codebook can be designed in a manner that horizontal beamforming has denser resolution as the elevation angle is getting close to 90 degrees (i.e., as the elevation angle is heading toward down direction) and horizontal beamforming has less dense resolution as the elevation angle is getting close an opposite direction (−90 degrees or 0 degree). In particular, in a precoding codebook including a precoding weight vector/matrix for horizontal beamforming, resolution of the precoding weight vector/matrix for horizontal beamforming can be configured to be higher when the elevation angle has a value of a range ranging from 0 degree to 90 degrees compared to a case that the elevation angle has a value of a range ranging from −90 degrees to 0 degree. For example, if the elevation angle has a value of a range ranging from 0 degree to 90 degrees, resolution of horizontal beamforming can be configured to be denser and if the elevation angle has a value of a range ranging from −90 degrees to 0 degree, resolution of horizontal beamforming can be configured to be less dense.

Implementation Form 2

The implementation form 2 corresponds to a method of configuring a codebook set including a precoding weight vector for horizontal beamforming and a precoding weight vector for vertical beamforming Embodiment 1

The present embodiment proposes a method of configuring a codebook for vertical-horizontal beamforming A precoding weight vector (or a precoding weight matrix) for beamforming can be determined or indicated by a combination of two indicators (or two PMIs). For instance, the two indicators can be called $I_1$ and $I_2$, respectively. The $I_1$ and the $I_2$ can be reported at the same time or can be reported at different timing to reduce feedback overhead. In this case, the $I_1$ is reported by long-term and can be applied to a wideband.

Embodiment 1-1

Each of one or more elements configuring a codebook can be designed to have both a weight vector/matrix for vertical beamforming and a weight vector/matrix for horizontal beamforming Embodiment 1-2

A precoder set indicated by a first indicator (e.g., $I_1$) includes all of a weight vector/matrix for vertical beamforming and one or more candidate weight vectors/matrixes for horizontal beamforming. Vertical beamforming weight vectors/matrixes different from each other are determined by first indicators ($I_1$) different from each other. An identical horizontal beamforming weight vector/matrix may correspond to the first indicators ($I_1$) different from each other.

For instance, as shown in Table 15 in the following, a precoder vector/matrix for 3-dimensional beamforming can be configured by a first indicator ($I_1$) and a second indicator ($I_2$).

TABLE 15

| $I_1$ | $I_2$ | | | |
|---|---|---|---|---|
| | 0 | 1 | 2 | 3 |
| 0 | Wv(0), Wh(0) | Wv(0), Wh(1) | Wv(0), Wh(2) | Wv(0), Wh(3) |
| 1 | Wv(1), Wh(0) | Wv(1), Wh(1) | Wv(1), Wh(2) | Wv(1), Wh(3) |
| 2 | Wv(2), Wh(0) | Wv(2), Wh(1) | Wv(2), Wh(2) | Wv(2), Wh(3) |
| 3 | Wv(3), Wh(0) | Wv(3), Wh(1) | Wv(3), Wh(2) | Wv(3), Wh(3) |

If the $I_1$ corresponds to 0 in an example of Table 15, one weight vector/matrix Wv(0) for vertical beamforming is indicated and 4 candidate weight vectors/matrixes for horizontal beamforming including Wh(0), Wh(1), Wh(2) and Wh(3) are indicated. In addition, one of the 4 candidate weight vectors/matrixes for horizontal beamforming can be specified by a value of the $I_2$. In a similar way, one of the weight vector/matrix Wv(0) for vertical beamforming is indicated for a different $I_1$ value and one of the 4 candidate weight vectors/matrixes for horizontal beamforming can be indicated by a combination with the $I_2$.

Embodiment 1-3

A precoder set indicated by a first indicator (e.g., $I_1$) includes a part of one or more candidate weight vectors/matrixes for vertical beamforming and all of one or more candidate weight vectors/matrixes for horizontal beamforming A vertical beamforming weight vector/matrix corresponding to a first value of the first indicator ($I_1$) and a vertical beamforming weight vector/matrix corresponding to a second value may be overlapped with each other in some part. An identical horizontal beamforming weight vector/matrix may correspond to the first indicators ($I_1$) different from each other.

For instance, as shown in Table 16 in the following, a precoder vector/matrix for 3-dimensional beamforming can be specified by a first indicator ($I_1$) and a second indicator ($I_2$).

TABLE 16

| $I_1$ | $I_2$ | | | | | | | |
|---|---|---|---|---|---|---|---|---|
| | 0 | 1 | 2 | 3 | 4 | 5 | 6 | 7 |
| 0 | Wv(0), Wh(0) | Wv(0), Wh(1) | Wv(0), Wh(2) | Wv(0), Wh(3) | Wv(1), Wh(0) | Wv(1), Wh(1) | Wv(1), Wh(2) | Wv(1), Wh(3) |
| 1 | Wv(1), Wh(0) | Wv(1), Wh(1) | Wv(1), Wh(2) | Wv(1), Wh(3) | Wv(2), Wh(0) | Wv(2), Wh(1) | Wv(2), Wh(2) | Wv(2), Wh(3) |
| 2 | Wv(2), Wh(0) | Wv(2), Wh(1) | Wv(2), Wh(2) | Wv(2), Wh(3) | Wv(3), Wh(0) | Wv(3), Wh(1) | Wv(3), Wh(2) | Wv(3), Wh(3) |
| 3 | Wv(3), Wh(0) | Wv(3), Wh(1) | Wv(3), Wh(2) | Wv(3), Wh(3) | Wv(0), Wh(0) | Wv(0), Wh(1) | Wv(0), Wh(2) | Wv(0), Wh(3) |

If the $I_1$ corresponds to 0 in an example of Table 16, two weight vectors/matrixes, i.e., Wv(0) and Wv(1), for vertical beamforming are indicated and 4 candidate weight vectors/matrixes for horizontal beamforming including Wh(0), Wh(1), Wh(2) and Wh(3) are indicated. In addition, one of the two weight vectors/matrixes, i.e., Wv(0) and Wv(1), for vertical beamforming is specified according to a value of the $I_2$ and one of the 4 candidate weight vectors/matrixes for horizontal beamforming can be specified. In a similar way, two (candidate) weight vectors/matrixes for vertical beamforming are determined for a different $I_1$ value. One final weight vector/matrix for vertical beamforming is indicated by a combination with the I2 and one of the weight vectors/matrixes for horizontal beamforming can be indicated.

Embodiment 1-4

A precoder set indicated by a first indicator (e.g., $I_1$) includes a part of one or more candidate weight vectors/matrixes for vertical beamforming and all of one or more candidate weight vectors/matrixes for horizontal beamforming Vertical beamforming weight vectors/matrixes are not overlapped with each other by first indicators ($I_1$) different from each other and vertical beamforming weight vectors/matrixes different from each other are determined. An identical horizontal beamforming weight vector/matrix may correspond to the first indicators ($I_1$) different from each other.

For instance, as shown in Table 17 in the following, a precoder vector/matrix for 3-dimensional beamforming can be specified by a first indicator ($I_1$) and a second indicator ($I_2$).

If the $I_1$ corresponds to 0 in an example of Table 17, two weight vectors/matrixes, i.e., Wv(0) and Wv(1), for vertical beamforming are indicated and 4 candidate weight vectors/matrixes for horizontal beamforming including Wh(0), Wh(1), Wh(2) and Wh(3) are indicated. In addition, one of the two weight vectors/matrixes, i.e., Wv(0) and Wv(1), for vertical beamforming is specified according to a value of the $I_2$ and one of the 4 candidate weight vectors/matrixes for horizontal beamforming can be specified. In a similar way, two (candidate) weight vectors/matrixes for vertical beamforming are determined for a different $I_1$ value. One final weight vector/matrix for vertical beamforming is indicated by a combination with the I2 and one of the weight vectors/matrixes for horizontal beamforming can be indicated.

Embodiment 1-5

A precoder set indicated by a first indicator (e.g., $I_1$) includes a part of one or more candidate weight vectors/matrixes for vertical beamforming and a part of one or more candidate weight vectors/matrixes for horizontal beamforming. All or a part of vertical beamforming weight vectors/matrixes corresponding to a first value of the first indicator ($I_1$) may be overlapped with vertical beamforming weight vectors/matrixes corresponding to a second value. Horizontal beamforming weight vectors/matrixes are not overlapped with each other by first indicators ($I_1$) different from each other and horizontal beamforming weight vectors/matrixes different from each other are determined For instance, as shown in Table 18 in the following, a precoder vector/matrix for 3-dimensional beamforming can be specified by a first indicator ($I_1$) and a second indicator ($I_2$).

TABLE 17

| $I_1$ | $I_2$ | | | | | | | |
|---|---|---|---|---|---|---|---|---|
| | 0 | 1 | 2 | 3 | 4 | 5 | 6 | 7 |
| 0 | Wv(0), Wh(0) | Wv(0), Wh(1) | Wv(0), Wh(2) | Wv(0), Wh(3) | Wv(1), Wh(0) | Wv(1), Wh(1) | Wv(1), Wh(2) | Wv(1), Wh(3) |
| 1 | Wv(2), Wh(0) | Wv(2), Wh(1) | Wv(2), Wh(2) | Wv(2), Wh(3) | Wv(3), Wh(0) | Wv(3), Wh(1) | Wv(3), Wh(2) | Wv(3), Wh(3) |
| 2 | Wv(4), Wh(0) | Wv(4), Wh(1) | Wv(4), Wh(2) | Wv(4), Wh(3) | Wv(5), Wh(0) | Wv(5), Wh(1) | Wv(5), Wh(2) | Wv(5), Wh(3) |
| 3 | Wv(6), Wh(0) | Wv(6), Wh(1) | Wv(6), Wh(2) | Wv(6), Wh(3) | Wv(7), Wh(0) | Wv(7), Wh(1) | Wv(7), Wh(2) | Wv(7), Wh(3) |

TABLE 18

| $I_1$ | $I_2$ | | | |
|---|---|---|---|---|
| | 0 | 1 | 2 | 3 |
| 0 | Wv(0), Wh(0) | Wv(0), Wh(1) | Wv(0), Wh(2) | Wv(0), Wh(3) |
| 1 | Wv(0), Wh(4) | Wv(0), Wh(5) | Wv(0), Wh(6) | Wv(0), Wh(7) |
| 2 | Wv(1), Wh(0) | Wv(1), Wh(1) | Wv(1), Wh(2) | Wv(1), Wh(3) |
| 3 | Wv(1), Wh(4) | Wv(1), Wh(5) | Wv(1), Wh(6) | Wv(1), Wh(7) |

If the $I_1$ corresponds to 0 in an example of Table 18, one weight vector/matrix, i.e., Wv(0), for vertical beamforming is indicated and 4 candidate weight vectors/matrixes for horizontal beamforming including Wh(0), Wh(1), Wh(2) and Wh(3) are indicated. In addition, one of the four weight vectors/matrixes for horizontal beamforming can be specified according to a value of the $I_2$. In a similar way, one of the weight vectors/matrixes for vertical beamforming is indicated for a different $I_1$ value and one of the weight vectors/matrixes for horizontal beamforming can be indicated by a combination with the $I_2$.

And, for the aforementioned various examples, a DoA-based precoding weight vector/matrix or a DFT-based precoding weight vector/matrix can be configured according to the scheme mentioned earlier in the implementation form 1.

And, it is able to configure a size of a codebook of horizontal domain to be adaptively changed according to a value of a PMI of vertical domain. For example, a codebook of a big size can be designed in a manner of making 7 horizontal PMIs including Wh(0) to Wh(7) correspond to Wv(0) and a codebook of a smaller size can be designed in a manner of making 2 horizontal domain PMIs including Wh(0) and Wh(1) correspond to Wv(3) only.

And, a codebook of a different size can be designed according to a value (or a range) of an elevation angle in vertical direction. For example, a codebook can be designed in a manner of including more number of vertical and/or horizontal precoding weight matrixes/vectors for a range ranging from 0 to 45 degrees of elevation angles (i.e., support denser beamforming) And, a codebook can be designed in a manner of including less number of vertical and/or horizontal precoding weight matrixes/vectors for a range ranging from 45 to 90 degrees of elevation angles (i.e., support less dense beamforming) As an additional example, a codebook can be designed in a manner of including more number of vertical and/or horizontal precoding weight matrixes/vectors for a range ranging from 0 to −45 degrees of elevation angles (i.e., support denser beamforming) And, a codebook can be designed in a manner of including less number of vertical and/or horizontal precoding weight matrixes/vectors for a range ranging from 0 to 90 degrees of elevation angles (i.e., less dense beamforming) Similar to this, a codebook can be designed in a manner of defining vertical and/or horizontal precoding weight matrixes/vectors to be dense or sparse for a specific elevation angle.

Embodiments described in the following relate to a method of configuring a codebook set in a manner of distinguishing a codebook set for horizontal beamforming from a codebook set for vertical beamforming Embodiment 2

The present embodiment relates to a method of configuring a codebook including a precoding weight vector/matrix(s) for vertical beamforming (hereinafter, a vertical beamforming codebook).

According to the present embodiment, a specific precoding vector/matrix of a vertical beamforming codebook can be determined or indicated by a combination of two indicators (or 2 PMIs). For instance, the two indicators can be called V-$I_1$ and V-$I_2$. The V-$I_1$ and the V-$I_2$ can be reported at the same time or can be reported at different timing to reduce feedback overhead. In this case, a PMI (e.g., V-$I_1$ and/or V-$I_2$) for vertical beamforming is reported by long-term and can be applied to a wideband. Or, among the PMI for vertical beamforming, the V-$I_1$ is reported by long-term compared to the V-$I_2$ and can be applied to a wideband.

As mentioned in the foregoing description, if a precoding weight vector/matrix for vertical beamforming is indicated by two indicators, a final precoding weight vector/matrix for 3-dimensional beamforming can be specified by an additional combination of one (or a plurality of) precoding vector/matrix for horizontal beamforming. For instance, the precoding weight vector/matrix for 3-dimensional beamforming can be indicated by a combination of two V-PMIs and one H-PMI.

A vertical beamforming codebook can be configured in a manner that the V-PMI (e.g., V-$I_1$ and/or V-$I_2$) indicates a precoding weight vector/matrix, which is configured based on DoA or DFT according to the scheme mentioned earlier in the implementation form 1.

And, a size or a length of the V-PMI (e.g., V-$I_1$ and/or V-$I_2$) is determined according to the number of antenna ports in vertical domain.

And, all or a part of a vertical beamforming weight/matrix corresponding to a first value of the V-$I_1$ can be overlapped with a vertical beamforming weight vector/matrix corresponding to a second value. For instance, as shown in Table 19 in the following, a precoding vector/matrix for vertical beamforming can be specified by the V-$I_1$ and/or the V-$I_2$.

TABLE 19

| V-$I_1$ | V-$I_2$ | |
|---|---|---|
| | 0 | 1 |
| 0 | Wv (0) | Wv (1) |
| 1 | Wv (1) | Wv (2) |
| 2 | Wv (2) | Wv (3) |
| 3 | Wv (3) | Wv (0) |

In an example of Table 19, if the V-$I_1$ corresponds to 0, two candidate weight vectors/matrixes for vertical beamforming, i.e., Wv(0) and Wv(1), are indicated and one of the two candidate weight vectors/matrixes for vertical beamforming is determined according to a value of the V-$I_2$. If the V-$I_1$ corresponds to 1, two candidate weight vectors/matrixes for vertical beamforming, i.e., Wv(1) and Wv(2), are indicated and one of the two candidate weight vectors/matrixes for vertical beamforming is determined according to a value of the V-$I_2$. In a similar way, a candidate set of weight vectors/matrixes for vertical beamforming is indicated for a different V-$I_1$ value and one of the weight vectors/matrixes for vertical beamforming can be indicated by a combination with the V-$I_2$.

If the V-$I_1$ and/or the V-$I_2$ are reported at timing different from each other, a report interval can be configured as follows.

In a relation between the V-$I_1$ and the V-$I_2$, the V-$I_2$ can be more frequently reported compared to the V-$I_1$ (Or, a report interval of the V-$I_2$ can be configured to be shorter than a report interval of the V-$I_1$).

In a relation between the V-$I_2$ and the H-PMI, the V-$I_2$ can be more frequently reported compared to the H-PMI (Or, a report interval of the V-$I_2$ can be configured to be shorter than a report interval of the H-PMI). Or, the V-$I_2$ and the H-PMI can be reported at the same time.

If the H-PMI is configured by two indicators (e.g., H-$I_1$ and H-$I_2$), the H-$I_1$ and the V-$I_2$ can be reported at the same time. Or, the H-$I_1$ and an RI can be reported at the same time. Or, the H-$I_1$ can be solely reported without being reported with a different PMI or a different CSI at the same time. Or, the H-$I_1$ and the H-$I_2$ can be reported at the same time.

Embodiment 3

The present embodiment relates to another method of configuring a codebook including a precoding weight vector/matrix(s) for vertical beamforming (hereinafter, a vertical beamforming codebook).

According to the present embodiment, a specific precoding vector/matrix of a vertical beamforming codebook can be determined or indicated by a single indicator (or a single PMI). For instance, the single indicator can be called V-I. In this case, a PMI (e.g., V-I) for vertical beamforming is reported by long-term and can be applied to a wideband.

As mentioned in the foregoing description, if a precoding weight vector/matrix for vertical beamforming is indicated by a single indicator (e.g., V-I), a final precoding weight vector/matrix for 3-dimensional beamforming can be specified by an additional combination of one (or a plurality of) precoding vector/matrix for horizontal beamforming. For instance, the precoding weight vector/matrix for 3-dimensional beamforming can be indicated by a combination of one V-I and one or more H-PMIs (e.g., H-I, or H-$I_1$ and H-$I_2$.)

A vertical beamforming codebook can be configured in a manner that the V-I indicates a precoding weight vector/matrix, which is configured based on DoA or DFT according to the scheme mentioned earlier in the implementation form 1.

And, a size or a length of the V-I is determined according to the number of antenna ports in vertical domain.

For instance, as shown in Table 20 in the following, a specific precoding vector/matrix for vertical beamforming can be specified by the V-I.

TABLE 20

| V-I | |
|---|---|
| 0 | Wv (0) |
| 1 | Wv (1) |
| 2 | Wv (2) |
| 3 | Wv (3) |

Meanwhile, the V-I and the H-PMI (e.g., H-I, or the H-$I_1$ and H-$I_2$) can be reported at timing different from each other. In this case, the V-I can be more frequently reported compared to the H-PMI (Or, a report interval of the V-I can be configured to be shorter than a report interval of the H-PMI).

As a modified example of the aforementioned embodiments, a weight vector/matrix for 3-dimensional beamforming (i.e., determining vertical beamforming and horizontal beamforming at the same time) can be configured in a manner of combining a vertical beamforming weight vector/matrix and a horizontal beamforming weight vector/matrix with each other. For example, it may be able to configure a codebook in a manner that a single PMI indicates one precoding vector/matrix, which is applied to both vertical domain and horizontal domain. When the codebook is configured, a specific 3-dimensional precoding vector/matrix can be indicated by a single PMI or a combination of a plurality of PMIs.

Implementation Form 3

The present implementation form 3 relates to a method of defining a PUCCH report type. Specifically, when UE-specific vertical beamforming and horizontal beamforming are performed in MIMO system including AAS-based 2-dimensional array antenna configuration, the present implementation form 3 proposes a method of reporting an index of a precoder for vertical beamforming and an index of a precoder for horizontal beamforming In a legacy 3GPP LTE system (e.g., 3GPP LTE release-8, 9, 10 and 11), a PUCCH resource is designed to transmit maximum 11 bits to maximum 13 bits. And, in case of transmission of rank 2 or higher, 2 transport blocks (or 2 codewords) can be supported and the 2 transport blocks are one-to-one mapped to 2 codewords. And, CQI is measured and reported for each of the transport blocks (or codewords). In this case, CQI for a first transport block (or codeword) is represented by 4 bits and CQI for a second transport block (or codeword) is represented by 3 bits. Hence, total 7 bits are required to report the CQI for the two transport blocks (or two codewords). And, if 4 bits are required to report a PMI in a system to which precoding is applied, it may use maximum 11 bits to report the precoding and the CQI at the same time.

The legacy 3GPP LTE system supports horizontal beamforming only. In case of using PUCCH to report CSI for the horizontal beamforming, a scheme of reporting the CSI is defined as follows. In particular, a codebook for 8Tx transmission is designed based on two indicators (a first indicator ($i_1$) and a second indicator ($i_2$)). To this end, the first indicator and the second indicator can be reported using three schemes in a PUCCH report mode.

A first scheme is to report the second indicator ($i_2$) and CQI at the same time after the first indicator ($i_1$) is reported.

A second scheme is to report the first indicator ($i_1$), the second indicator ($i_2$) and CQI at the same time.

A third scheme is to define a specific indicator (e.g., a precoding type indicator (PTI)) indicating whether the first indicator ($i_1$) is reported and apply a different reporting scheme according to the specific indicator. If the specific indicator indicates that the first indicator ($i_1$) is reported, the second indicator ($i_2$) and the CQI are reported at the same time on prescribed time after the first indicator ($i_1$) is reported. If the specific indicator indicates that the first indicator ($i_1$) is not reported, the second indicator ($i_2$) and the CQI are reported at the same time on prescribed time (In this case, since it is not possible to determine a specific precoding vector/matrix using the second indicator ($i_2$) only without the first indicator ($i_1$), a specific precoding vector/matrix can be determined or indicated under an assumption that a previously reported first indicator ($i_1$) is used).

In an enhanced 3GPP LTE system (e.g., 3GPP LTE release-11 and later), ongoing study for maximizing a potential benefit for a MIMO system in which AAS-based 2-dimensional array antenna configuration is assumed is in progress. The AAS-based 2-dimensional array antenna configuration has a characteristic distinguished from a legacy system in that vertical domain beamforming is variably and/or UE-specifically performed. Unlike the legacy system, when the vertical beamforming is applied, a UE selects vertical domain beam direction most suitable for the UE (or preferred by the UE) and reports the vertical domain beam direction to a base station. In the following, when a PMI for vertical beamforming and horizontal beamforming is reported, additionally considered UE operation is proposed.

In the present invention, when CSI is reported via PUCCH, a specific indicator (or a flag indicator) indicating whether a PMI (V-PMI) for vertical beamforming is reported is defined. The specific indicator is called a V-PMI reporting type indicator (RTI). The V-PMI RTI can be included in CSI, which is transmitted by a UE on PUCCH. And, the UE may or may not perform V-PMI reporting according to a value of the V-PMI RTI (or, it may also be able to represent as the value of the V-PMI RTI is determined according to whether the UE performs the V-PMI reporting).

If the V-PMI RTI is configured by a first value (or a value indicating On), V-PMI can be reported after the V-PMI RTI is reported. In this case, H-PMI can be reported after the V-PMI is reported. Or, the V-PMI and the H-PMI can be reported at the same time. Or, a part of the H-PMI and the V-PMI can be reported at the same time and then the rest of the H-PMI can be reported (e.g., the V-PMI and H-PMI$_1$ are reported at the same time and then H-PMI$_2$ and CQI can be reported at the same time).

If the V-PMI RTI is configured by a second value (or a value indicating Off), V-PMI is not reported after the V-PMI RTI is reported and H-PMI is reported only. In this case, it may assume that a precoder indicated by a most recently reported V-PMI (e.g., a lastly reported V-PMI before the V-PMI RTI is reported) is used as it is for a precoder for vertical beamforming Or, a precoder indicated by a specific V-PMI, which is configured as default, can be used for the precoder for vertical beamforming A default V-PMI may correspond to a V-PMI of a lowest number (or index).

The V-PMI can be reported in a manner of being combined with an RI. In this case, it is assumed that V-PMI is selected/determined based on a rank-1. The reported RI can be used for the purpose of indicating a rank value becoming a base of selecting/determining H-PMI (e.g., the RI can indicate a transmission rank value associated with H-PMI, which is reported after the V-PMI RTI, irrespective of whether the value of the V-PMI RTI indicates On or Off). Or, the reported RI can be used for the purpose of indicating a rank value of a precoding vector/matrix (or, a precoding vector/matrix obtained by a result of combining (e.g., Kronecker product) a precoding vector/matrix indicated by the V-PMI and a precoding vector/matrix indicated by the H-PMI with each other) indicated by a combination of the V-PMI and the H-PMI.

Or, the V-PMI RTI can be reported before the RI is reported. In this case, it is assumed that V-PMI is selected/determined based on a rank-1 and the reported RI can be used for the purpose of indicating a rank value (i.e., a rank value associated with the H-PMI) becoming a base of selecting/determining the H-PMI. And, a reporting interval of the V-PMI RTI can be determined by an integer multiple of a reporting interval of the RI. When the V-PMI RTI is reported before the RI is reported, it can be indicated by an offset on the basis of a prescribed reporting timing (e.g., RI reporting timing).

Implementation Form 4

The present implementation form 4 relates to a method of generating a precoding vector and a matrix using two indicators and an operation of a UE in case of using a precoding weight vector for vertical beamforming and a precoding vector for vertical beamforming When a UE selects a precoder for vertical beamforming and a precoder for horizontal beamforming from a channel measurement reference signal, respectively, the UE can report an indicator of the precoder for vertical beamforming and an indicator of the precoder for horizontal beamforming to a base station, respectively.

If the precoder for vertical beamforming and the precoder for horizontal beamforming are selected, the UE measures channel quality of a transmission signal using the two precoders and reports the channel quality to the base station.

In order to measure a state of beamforming channel, it is necessary for the UE to assume that the two precoders are transmitted in a manner of being combined with each other. To this end, it is necessary to have definition agreed between the UE and the base station. If there is no agreed definition, there may exist a big difference between measured and reported channel information and actual transmission. Hence, in order to precisely measure and report a channel, it is required to define a scheme of generating a precoder, which is assumed for transmission.

According to a first scheme, If a precoding weight for vertical beamforming corresponds to Wv (Nv_Tx×1) vector and a precoding weight for horizontal beamforming corresponds to Wh (Nh_Tx×1) vector, a precoder for transmission can be assumed as Equation 41 to Equation 44 in the following. (In this case, Knonecker product is defined as kron([a b;c d],[e f;g h])=[a[e f;g h] b[e f;g h]; c[e f;g h] d[e f;g h]].)

$$W=\mathrm{kron}(Wv, Wh) \qquad [\text{Equation 41}]$$

$$W=[Wh0_{Nh\_Tx \times Nv\_Tx-1}; 0_{Nh\_Tx \times 1} \\ Wh0_{Nh\_Tx \times Nh\_Tx-2}; \cdots; 0_{Nh\_Tx \times Nv\_Tx-1}Wh]/[Wv \\ (1)Wv(2) \ldots Wv(Nv\_Tx)] \qquad [\text{Equation 42}]$$

$$W=\mathrm{kron}(Wh, Wv) \qquad [\text{Equation 43}]$$

$$W=[Wv0_{Nv\_Tx \times Nh\_Tx-1}; 0_{Nv\_Tx \times 1} \\ Wv0_{Nv\_Tx \times Nh\_Tx-2}; \cdots; 0_{Nv\_Tx \times Nh\_Tx-1}Wv]/[Wh \\ (1)Wh(2) \ldots Wh(Nh\_Tx)] \qquad [\text{Equation 44}]$$

According to a second scheme, for higher rank transmission, a precoding weight for vertical beamforming assumes a rank-1 and a precoding weight for horizontal beamforming assumes a higher rank. In this case, if the precoding weight for vertical beamforming corresponds to Wv (Nv_Tx×1) vector and the precoding weight for horizontal beamforming corresponds to Wh (Nh_Tx×r) vector, a precoder for transmission can be assumed as Equation 45 to Equation 48 in the following. (r: transmission rank)

$$W=\mathrm{kron}(Wv, Wh) \qquad [\text{Equation 45}]$$

$$W=[Wh0_{Nh\_Tx \times Nv\_Tx-1}; 0_{Nh\_Tx \times 1} \\ Wh0_{Nh\_Tx \times Nh\_Tx-2}; \cdots; 0_{Nh\_Tx \times Nv\_Tx-1}Wh]/[Wv \\ (1)Wv(2) \ldots Wv(Nv\_Tx)] \qquad [\text{Equation 46}]$$

$$W=\mathrm{kron}(Wh, Wv) \qquad [\text{Equation 47}]$$

$$W=[Wv0_{Nv\_Tx \times Nh\_Tx-1}; 0_{Nv\_Tx \times 1} \\ Wv0_{Nv\_Tx \times Nh\_Tx-2}; \cdots; 0_{Nv\_Tx \times Nh\_Tx-1}Wv]/[Wh \\ (1)Wh(2) \ldots Wh(Nh\_Tx)] \qquad [\text{Equation 48}]$$

Implementation Form 5

The implementation form 5 relates to a method of indicating an antenna port in 2-dimensional array antenna configuration and an antenna port mapping relation.

In the present implementation form, parameters of horizontal domain antenna ports and/or parameters of vertical domain antenna ports can be configured to be semi-statically indicated.

Embodiment 1

According to the present embodiment, when the number of horizontal domain antenna ports (e.g., 1Tx, 2Tx, 4Tx and 8Tx) are defined (via RRC signaling), if parameters (e.g., 1, 2, 4, 8, . . . ) of vertical domain antenna ports are additionally indicated via RRC signaling, antenna ports can be mapped in consideration of an additionally received signal. In this case, mapping of a CSI-RS port can be configured to be performed on the basis of priority of horizontal domain first and vertical domain later. And, in case of an array antenna consisting of a pair of cross-pole antennas, a CSI-RS port is mapped to antenna ports of polarization identical to each other first and then the CSI-RS port can be mapped to antenna ports of polarizations different from each other.

Figure 20A:
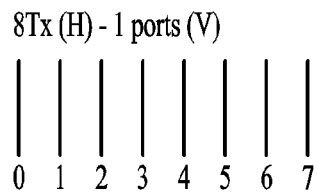
FIGS. 20 to 23 are diagrams for explaining 2-dimensional array antenna mapping.
Figure 20B:
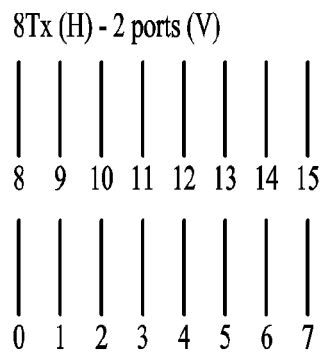
Figure 20C:
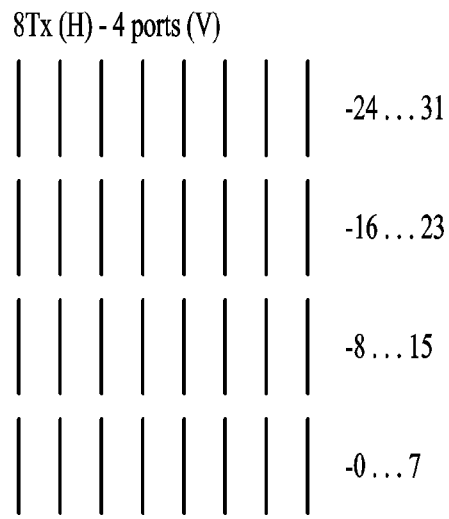
Figure 20D:
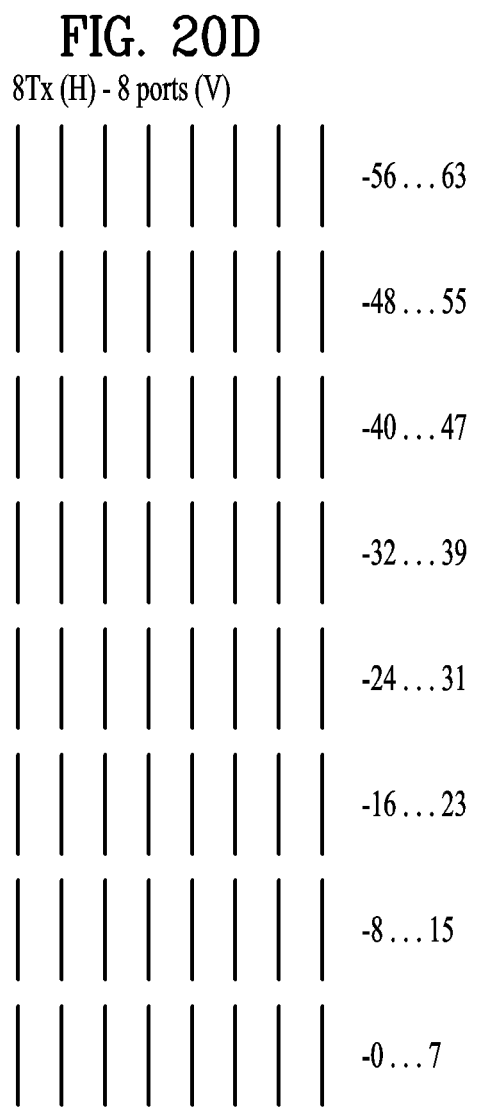
Figure 21D:
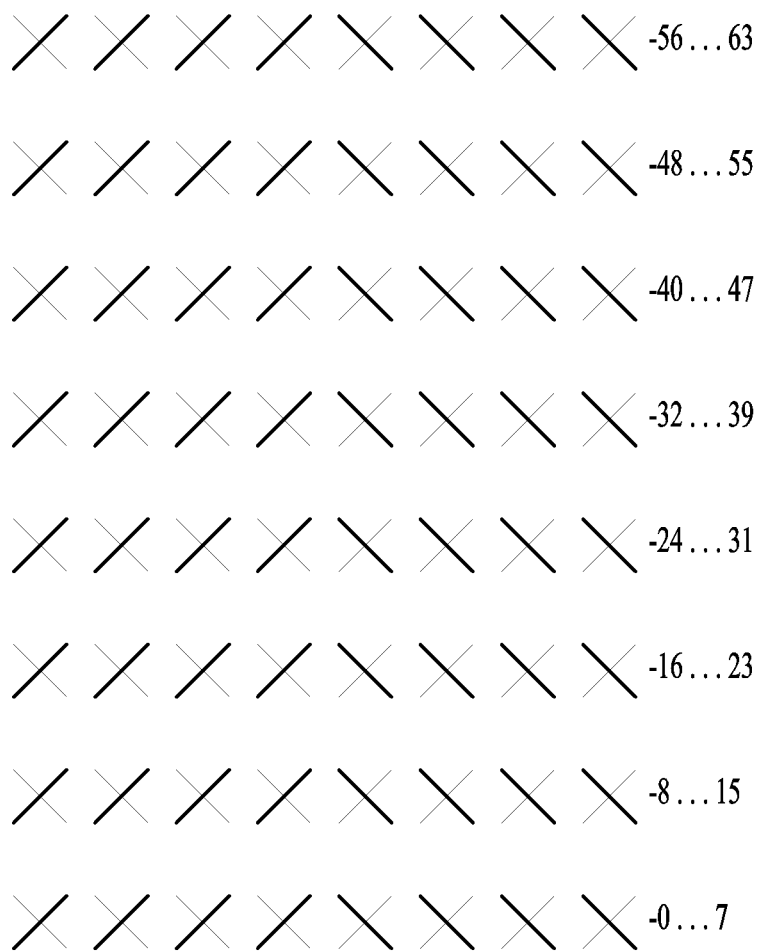
Figure 22A:
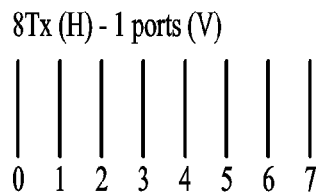
Figure 22B:
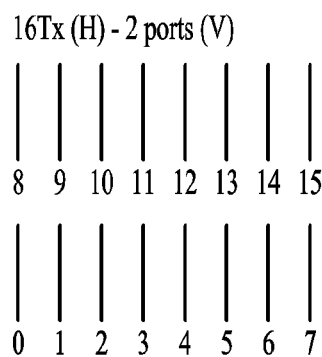
Figure 22C:
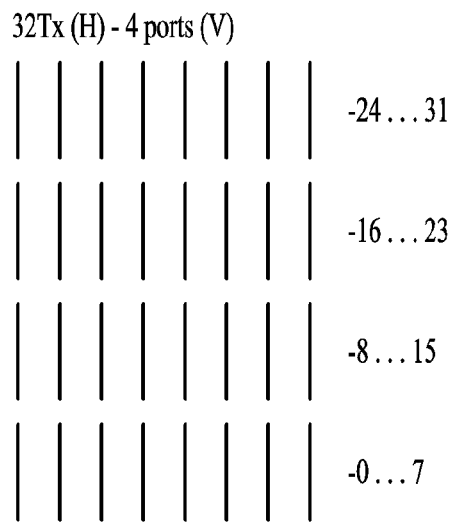
Figure 22D:
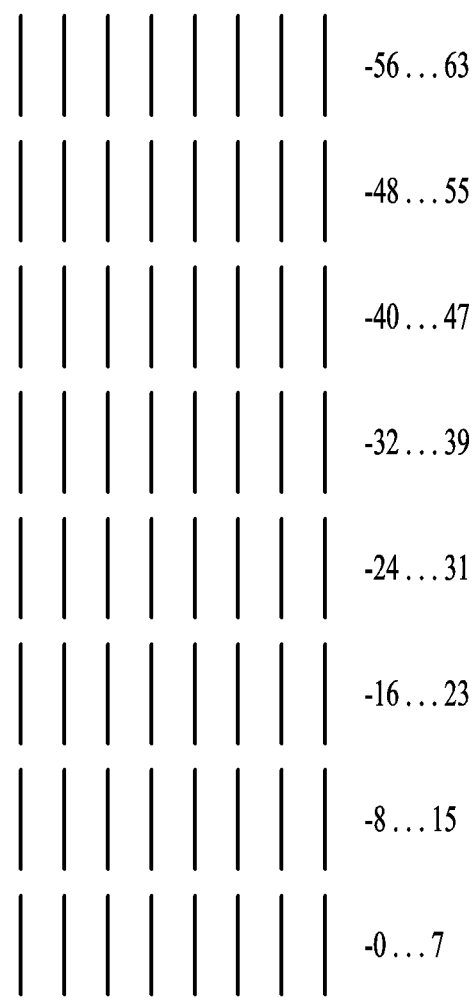

FIG. 20 and FIG. 21 are diagrams for antenna port mapping according to the present embodiment.

FIG. 20 is a diagram for an array antenna configured by ULA. FIG. 20 (a) shows a case that 1 is additionally indicated as a parameter of vertical domain antenna ports when horizontal domain antennas are configured by 8 transmission antennas (i.e., 8Tx).

FIG. 20 (b) to FIG. 20 (d) shows a case that 2, 4 and 8 are additionally indicated as parameters of vertical domain antenna ports when horizontal domain antennas are configured by 8 transmission antennas (i.e., 8Tx). One column or one row is configured by ULA.

FIG. 21 is a diagram for an array antenna configured by a pair of cross-pole antennas. FIG. 21 (a) shows a case that 1 is additionally indicated as a parameter of vertical domain antenna ports when horizontal domain antennas are configured by 8 transmission antennas. In this case, in FIG. 21 (a), since the array antenna is configured by a pair of cross-pole antennas, when total 8 transmission antennas are deployed, it may be able to configure a group 1 including an index 1, 2, . . . , 8/2 and a group 2 including an index 8/2+1, 8/2+2, . . . , 8 to have polarization orthogonal to each other.

FIG. 21 (b) to FIG. 21 (d) shows a case that 2, 4 and 8 are additionally indicated as parameters of vertical domain antenna ports when horizontal domain antennas are configured by 8 transmission antennas. As mentioned earlier in FIG. 21 (a), since it is configured by a pair of cross-pole antennas, pairs of cross-pole antennas constructing a row can be configured to have polarization orthogonal to each other.

Embodiment 2

According to the present embodiment, when parameters (e.g., 16Tx, 32Tx, and 64Tx) of total antenna ports are indicated via RRC signaling and parameters (e.g., 1, 2, 4 and 8) of vertical domain antenna ports are additionally indicated via RRC signaling, antenna ports can be mapped in consideration of the received parameters of the total antenna ports and the vertical domain antenna parameters.

Figure 23D:
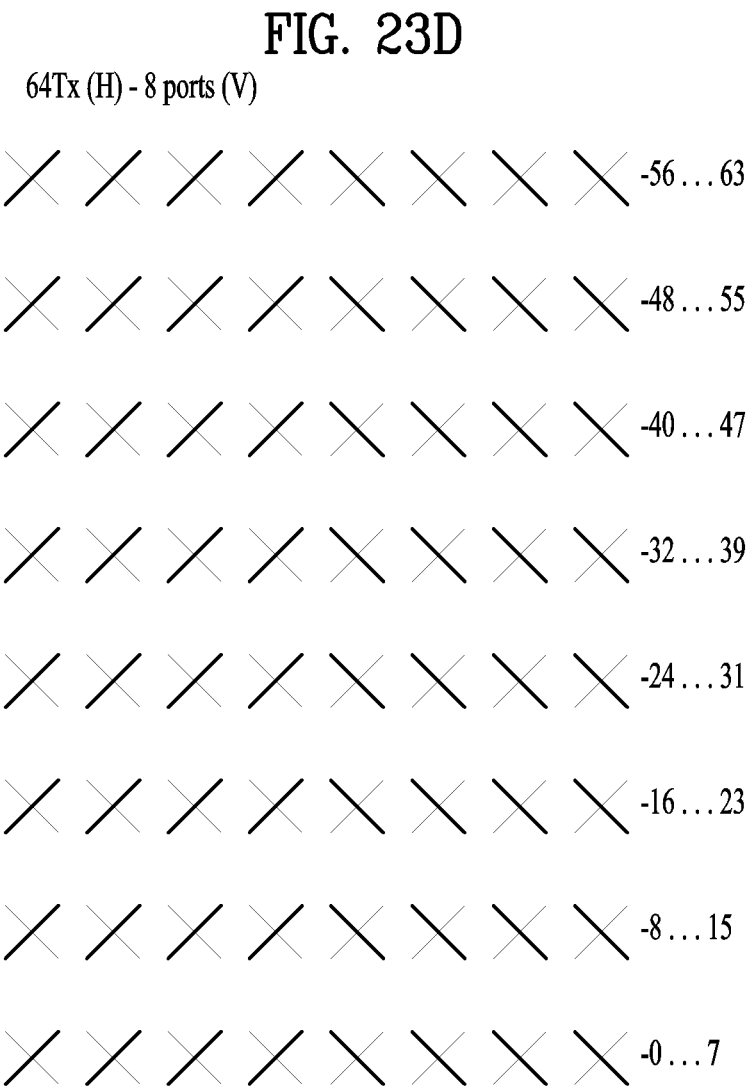

FIG. 22 and FIG. 23 are diagrams for antenna port mapping according to the present embodiment.

FIG. 22 is a diagram for an array antenna configured by ULA. FIG. 22 (a) shows a case that parameters of total antenna ports are indicated by 8Tx and parameters of vertical domain antenna ports are indicated by 1. In particular, if the parameters of the vertical antenna ports are indicated by 1, the total antenna ports are configured by ULA constructing a single row.

And, as shown in FIG. 22 (b), if parameters of total antenna ports are indicated by 16Tx and parameters of vertical domain antenna ports are indicated by 2, the total antenna ports can be configured by two rows (configured by an identical antenna parameter). Similarly, FIG. 22 (c) and FIG. 22 (d) shows a case that parameters of antenna ports correspond to 32Tx and parameters of vertical domain antenna ports corresponds to 4 and a case that parameters of antenna ports correspond to 64Tx and parameters of vertical domain antenna ports corresponds to 4, respectively.

FIG. 23 is a diagram for an array antenna configured by a pair of cross-pole antennas. FIG. 23 (a) shows a case that parameters of total antennas are indicated by 8Tx and 1 is additionally indicated as a parameter of vertical domain antenna ports. In this case, in FIG. 23 (a), since the array antenna is configured by a pair of cross-pole antennas, when total 8 transmission antennas are deployed, it may be able to configure a group 1 including an index 1, 2, . . . , 8/2 and a group 2 including an index 8/2+1, 8/2+2, . . . , 8 to have polarization orthogonal to each other.

FIG. 23 (b) to FIG. 23 (d) shows cases that a relation between {parameters of total antennas and parameters of vertical domain antenna ports} corresponds to {16Tx, 2}, {32Tx, 4} and {64Tx, 8}, respectively. As mentioned earlier in FIG. 23 (a), since it is configured by a pair of cross-pole antennas, pairs of cross-pole antennas constructing a row can be configured to have polarization orthogonal to each other.

Moreover, according to the present implementation form 5, the aforementioned new transmission mode and transmission scheme, the CSI reporting mode and the RRM measurement method can be configured to be applied only when parameters of vertical domain antenna ports are indicated to exceed 1 (i.e., 2 or more).

Implementation Form 6

The implementation form 6 relates to a method of supporting vertical beamforming and an operation of a base station (eNB) and an operation of a UE. Transmission modes defined in a legacy 3GPP LTE system (e.g., 3GPP LTE release-8/9/10/11) are briefly summarized in Table 21 in the following.

TABLE 21

| | Release-8/9 TM 1-8 | Release-9 TM 8 | Release-10 TM 9 | Release-11 TM 10 |
| --- | --- | --- | --- | --- |
| Deployment | 1D array antenna config. BS antenna: 1, 2, 4 Single TP | 1D array antenna config. BS antenna: 1, 2, 4 Single TP | 1D array antenna config. BS antenna: 1, 2, 4, 8 Single TP | 1D array antenna config. BS antenna: 1, 2, 4, 8 Single/Multiple TPs RRH |
| Measurement RS | Cell specific CRS | Cell specific CRS | Cell specific CRS Single CSI-RS set NZP CSI-RS, ZP CSI-RS | Cell specific CRS Multiple CSI-RS set |
| CSI measurement process | Single CSI process RI, PMI, CQI | Single CSI process RI, PMI, CQI | Single CSI process RI, PMI, CQI | Multiple CSI processes (Per CSI process, RI, PMI, CQI + IM) |

TABLE 21-continued

|  | Release-8/9<br>TM 1-8 | Release-9<br>TM 8 | Release-10<br>TM 9 | Release-11<br>TM 10 |
|---|---|---|---|---|
| Data De-<br>modulation<br>RS | Cell specific CRS<br>UE specific RS (5) | UE specific RS (7, 8) | UE specific RS (7-14) | UE specific RS (7-14) |
| L3<br>measurement | CRS based RSRP | CRS based RSRP | CRS based RSRP | CRS based RSRP |
| ETC |  |  | PRS | QCL condition<br>E-PDCCH |

In particular, since the legacy 3GPP LTE system has not introduced a 2-dimensional array antenna, the present implementation form proposes a transmission mode for a MIMO system (i.e., a wireless communication system appearing after 3GPP LTE release-11) supporting vertical domain beamforming The present implementation form 6 is explained on the basis of a wireless communication system in which 2-dimensional array antenna is deployed, the wireless communication system in which an antenna of a base station is configured as 1, 2, 4 8, . . . etc. and the wireless communication system in which single/multiple transmission points and an RRH (remote radio head) are supported. And, for clarity, assume a co-located 2-dimensional array antenna and a rank for vertical domain beamforming And, assume that a CSI-RS is precoded using a vertical beamforming weight vector and a horizontal domain PMI is selected. Yet, interpretation of the present invention may be non-limited by the aforementioned assumptions. The present invention can also be extensively applied to a case of applying UE-specific vertical beamforming.

Embodiment 1

In the present embodiment, a case of applying a beamforming weight vector of vertical domain to an antenna element is explained.

In case of using the beamforming weight vector of vertical domain, the identical vertical domain beamforming weight vector can be applied to a plurality of horizontal domain antenna ports. Hence, it is able to generate a CSI-RS set for generated antenna ports. Similarly, a plurality of CSI-RS sets can be generated according to a plurality of vertical domain beamforming weight vectors. Hence, if feedback on a specific CSI-RS set among a plurality of CSI-RS sets of which a vertical domain beamforming weight vector is different from each other is reported from a UE, a base station can determine it as preference of the UE for a plurality of horizontal domain antenna ports to which a corresponding vertical domain beamforming weight vector is applied is high. In this case, one CSI-RS set can be configured by a non-zero power CSI-RS and/or a zero power CSI-RS. An eNB configures a CSI-RS set to a UE via RRC signaling. In this case, the eNB can configure a plurality of CSI-RS sets to the UE.

If multiple CSI-RS sets are indicated, the UE performs CSI processing according to each of a plurality of the CSI-RS sets. In particular, the UE selects/calculates (horizontal) RI/PMI/CQI according to each CSI process and measures interference. And, the UE can measure RSRP/RSRQ according to each CSI-RS.

After the CSI processing is performed, the UE can report RI/PMI/CQI, which is measured according to each of a plurality of the CSI-RS sets, to the base station. The measurement report can be reported using two schemes.

A first scheme is to report RI/PMI/CQI information, which is calculated by the UE via a plurality of CSI processes, to the base station according to definition of a PUSCH feedback mode/PUCCH feedback mode.

As a second scheme, the UE can select a CSI-RS set preferred by the UE via the measured RSRP or RSRQ. In particular, one or a plurality of CSI-RS sets preferred by the UE can be reported to the base station. In case of the PUSCH feedback mode, the UE can report information on a CSI-RS set preferred by the UE to the base station together with RI/PMI/CQI information corresponding to a CSI-RS. In case of the PUCCH feedback mode, the UE reports the information on the CSI-RS set preferred by the UE to the base station and may be then able to report the RI/PMI/CQI information related to the CSI-RS set to the base station.

Embodiment 2

In the present embodiment, when a base station configures a plurality of CSI-RS sets to a UE via RRC signaling, a case of combining specific vertical domain antenna ports with each other is explained. In particular, a method for a UE to select/calculate RI/PMI/CQI for a plurality of CSI processes and a method for the UE to measure interference are explained.

In the present implementation form, a CSI process i) calculates a single PMI-H (horizontal domain PMI) and CQI according to a CSI-process and ii) calculates a single PMI-V (vertical domain PMI) in a manner of combining CSI-RS sets different from each other and calculates average CQI of a plurality of the CSI-RS sets combined with each other. And, a single RI can be calculated for a plurality of the CSI-RS sets. And, it is able to measure interference for each of CSI processes.

For example, as a first scheme, antenna ports belonging to CSI-RS sets different from each other can be combined with each other using a precoding weight. If the precoding weight corresponds to a weight vector/matrix defined by a codebook, a preferred index can be reported to a base station. In particular, it is able to calculate RI/PMI/CQI applied to a CSI-RS set consisting of a plurality of vertical domain CSI-RS ports combined with each other and the calculated RI/PMI/CQI can be reported to the base station according to a PUSCH feedback mode or a PUCCH feedback mode.

As a second scheme, a UE can calculate RI/PMI/CQI according to each of CSI-RS sets (for horizontal domain antenna ports). In this case, each CSI-RS set selects/calculates PMI/CQI on the basis of an RI becoming a reference. And, a precoding weight for combining (vertical domain) antenna ports belonging to CSI-RS sets different from each other is applied and CQI is calculated according to the precoding weight.

Hence, the UE can report the RI/PMI/CQI calculated according to each CSI-RS set, information (an index in case of a codebook) on the precoding weight for combining the antenna ports belonging to the CSI-RS sets different from each other and the CQI to which the precoding weight is applied to the base station.

In this case, in order to combine the antenna ports belonging to the CSI-RS sets different from each other, it is required to define an antenna port and a mapping rule when a precoding weight is applied.

When a plurality of CSI-RS sets are configured, each of a plurality of the CSI-RS sets is configured by a plurality of (horizontal domain) antenna ports. For clarity, assume that an antenna port number ranges from 0 to N. For instance, if a CSI-RS set includes 4 antenna ports, it can be represented as an antenna port (AP) 0, 1, 2, and 3.

And, when the M number of CSI-RS sets are configured, each CSI-RS set is configured by (AP 0, . . . , N). For example, if 4 CSI-RS sets are configured and each CSI-RS set includes 4 antenna ports, a set 0 to a set 3 mat become (AP#0, AP#1, AP#2, AP#3) (AP#0, AP#1, AP#2, AP#3) (AP#0, AP#1, AP#2, AP#3) (AP#0, AP#1, AP#2, AP#3). In this case, a precoding weight, which combines antenna ports belonging to CSI-RS sets different from each other, selects a $k^{th}$ antenna port of each CSI-RS set and the precoding weight can be applied to the antenna port. Each element of a precoding weight vector can be applied according to an order of a CSI-RS set.

Hence, when a plurality of CSI-RS sets are configured and each CSI-RS set is configured by (0,1,2,3), if a specific (e.g., $1^{st}$) CSI-RS antenna port is selected (i.e., CSI-RS set (0,1, 2,3), (0',1,2,3), (0",1,2,3), (0''',1,2,3)), a plurality of PMIs can be reported for the specific CSI-RS antenna port. Yet, it may report a single PMI to reduce signaling overhead.

If a PMI is selected on the basis of vertical domain for a specific antenna port (e.g., $1^{st}$) (i.e., CSI-RS set (0,1,2,3), (0',1,2,3), (0",1,2,3), ( 0''',1,2,3)), a single PMI is reported.

Moreover, if CQI is calculated according to a CSI-RS set, it is able to report an average CSI for all CSI-RS ports and a plurality of CQIs according to a CSI-RS set.

Embodiment 3

In the present embodiment, a case of reporting an index of a preferred antenna port to perform UE-specific vertical domain beamforming is explained.

In a wireless communication system to which 2-dimensional array antenna is deployed, a base station can configure a plurality of CSI-RS sets to a UE to efficiently support vertical beamforming A specific CSI-RS set among a plurality of the CSI-RS sets can configure precoded antenna ports as a single CSI-RS set using a weight vector for vertical beamforming By doing so, the UE measures strength of each of the antenna ports in the specific CSI-RS set and reports the measured strength to the base station. In this case, the UE can report at least one selected from the group consisting of information listed in the following to the base station when the measure strength is reported to the base station. In this case, an index of an antenna port may correspond to a UE-specific index or a cell-specific index.

An index of a preferred antenna port

An index of a preferred antenna port and index strength of the antenna port

Strength of all measured antenna ports

Information on precoding used for combining antenna ports with each other (in case of being defined by a codebook, an indicator)

Hence, the base station receives the aforementioned information and may be then able to control beamforming for the UE.

If prescribed amount of time elapses after the aforementioned information is reported to the base station, the base station may be able to measure RI/PMI/CQI using a different CSI-RI set assigned to the UE. In this case, it may be able to use a previous vertical domain beamforming CSI-RS port. When the UE reports measurement information to the base station, the UE may follow a PUSCH feedback mode or a PUCCH feedback mode.

Hence, according to the present embodiment, it is able to perform clear vertical domain beamforming for a specific UE. Yet, a beamforming operation can be performed with a scheme similar to a legacy 3GPP LTE system for an operation according to the present embodiment and it may follow an antenna port for a reported reference signal.

Figure 24:
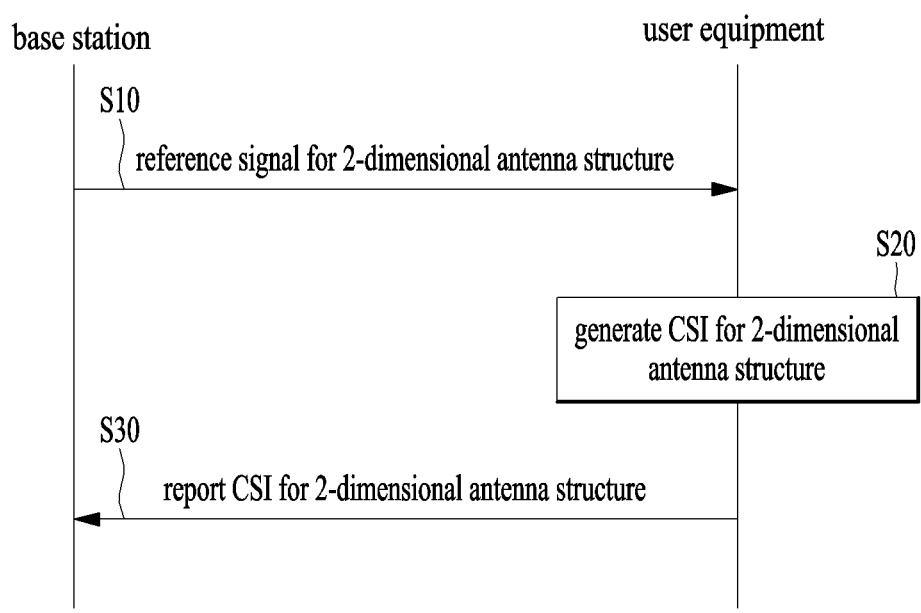
FIG. 24 is a flowchart for a method of transmitting and receiving channel state information (CSI) according to the present invention.

FIG. 24 is a flowchart for a method of transmitting and receiving channel state information (CSI) according to the present invention.

In the step S10, a base station can transmit a reference signal (e.g., a CSI-RS) usable for generating CSI on a 2-dimensional antenna structure to a UE.

In the step S20, the UE can generate the CSI on the 2-dimensional antenna structure using the reference signal received from the base station.

In the step S30, the UE can report the generated CSI to the base station.

In case of generating and/or reporting the CSI on the 2-dimensional antenna structure, it may be able to apply one or more examples of the various examples proposed by the present invention (e.g., a method of configuring a precoding matrix for representing vertical/horizontal beamforming appropriate for 2-dimensional antenna structure, a method of designing a codebook, a method of configuring a precoding matrix indicator, a method of reporting a precoding matrix indicator, a method of supporting an entity of a legacy system and the like) in a manner of combining with each other.

Although the exemplary method described in FIG. 24 is represented as a series of operations for clarity, an order of performing each of steps is not restricted by the method. Each of the steps can be performed at the same time or in a different order in necessary. And, it is not mandatory to perform all steps shown in FIG. 24 to implement the method proposed by the present invention.

Figure 25:
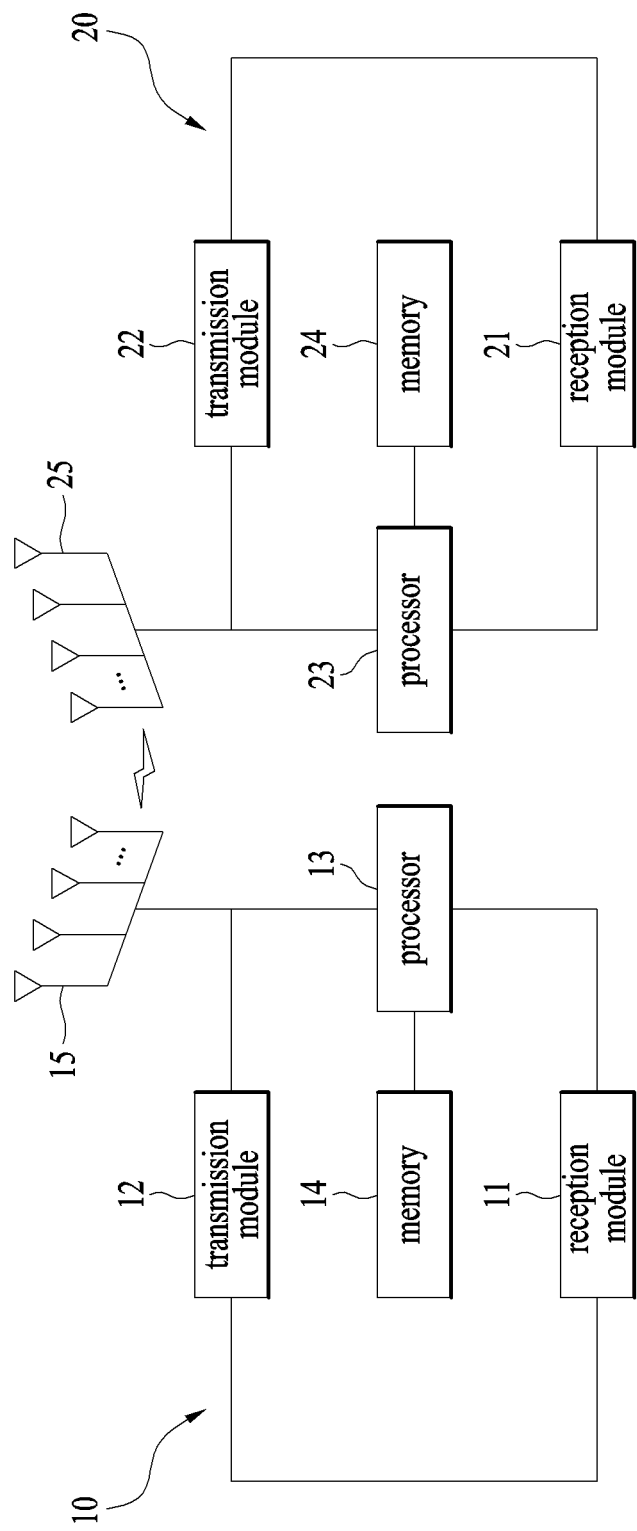
FIG. 25 is a diagram for configuration of a preferred embodiment of a base station and a user equipment according to the present invention.

FIG. 25 is a diagram for configuration of a preferred embodiment of a base station and a user equipment according to the present invention.

Referring to FIG. 25, a base station 10 according to the present invention can include a transmitter 11, a receiver 12, a processor 13, a memory 14 and a plurality of antennas 15. The transmitter 11 can transmit various signals, data and information to an external device (e.g., a UE). The receiver 12 can receive various signals, data and information from an external device (e.g., a UE). The processor 13 can control overall operation of the base station 10. A plurality of the antennas 15 can be configured according to a 2-dimensional antenna structure.

The processor 13 of the base station 10 according to an example of the present invention is configured to control the transmitter 11 to transmit a reference signal to a UE and control the receiver 12 to receive CSI generated in the UE using the reference signal from the UE.

When the base station 10 is specifically configured, in case of generating and/or reporting the CSI on the 2-dimensional antenna structure, it may be able to apply one or more examples of the various examples proposed by the present invention (e.g., a method of configuring a precoding matrix for representing vertical/horizontal beamforming appropriate for 2-dimensional antenna structure, a method of designing a codebook, a method of configuring a precoding matrix indicator, a method of reporting a precoding matrix indicator, a method of supporting an entity of a legacy system and the like) in a manner of combining with each other.

Besides, the processor 13 of the base station 10 performs a function of processing information received by the base station 10, information to be transmitted to external and the like. The memory 14 stores the processed information and the like for prescribed time and can be replaced with such a configuration element as a buffer (not depicted) and the like.

Referring to FIG. 25, a UE 20 according to the present invention can include a transmitter 21, a receiver 22, a processor 23, a memory 24 and a plurality of antennas 25. A plurality of the antennas 25 correspond to a UE supporting MIMO transmission and reception. The transmitter 21 can transmit various signals, data and information to an external device (e.g., a base station). The receiver 22 can receive various signals, data and information from an external device (e.g., a base station). The processor 23 can control overall operation of the UE 20.

The processor 23 of the UE 20 according to an example of the present invention is configured to control the receiver 22 to receive a reference signal from the base station and control the transmitter 21 to transmit CSI generated using the reference signal to the base station.

When the UE 20 is specifically configured, in case of generating and/or reporting the CSI on the 2-dimensional antenna structure, it may be able to apply one or more examples of the various examples proposed by the present invention (e.g., a method of configuring a precoding matrix for representing vertical/horizontal beamforming appropriate for 2-dimensional antenna structure, a method of designing a codebook, a method of configuring a precoding matrix indicator, a method of reporting a precoding matrix indicator, a method of supporting an entity of a legacy system and the like) in a manner of combining with each other.

Besides, the processor 23 of the UE 20 performs a function of processing information received by the UE 20, information to be transmitted to external and the like. The memory 24 stores the processed information and the like for prescribed time and can be replaced with such a configuration element as a buffer (not depicted) and the like.

In explaining various embodiments of the present invention, a downlink transmission entity or an uplink reception entity is mainly explained with an example of a base station and a downlink reception entity or an uplink transmission entity is mainly explained with an example of a UE, by which a scope of the present invention may be non-limited. For example, when a cell, an antenna port, an antenna port group, an RRH, a transmission point, a reception point, an access point, a relay or the like becomes an entity of downlink transmission to a UE or an entity of uplink reception from the UE, explanation on the base station can be identically applied. Moreover, when a relay becomes an entity of downlink transmission to the UE, an entity of uplink reception from the UE, an entity of uplink transmission to the base station or an entity of downlink reception from the base station, the principle of the present invention, which is explained via various embodiments of the present invention, can be identically applied.

Embodiments of the present invention can be implemented using various means. For instance, embodiments of the present invention can be implemented using hardware, firmware, software and/or any combinations thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

Embodiments of the present invention are applicable to various mobile communication systems.

What is claimed is:

1. A method of reporting channel state information (CSI), which is reported by a user equipment in a wireless communication system, the method comprising:
receiving a reference signal from a base station; and
reporting the CSI generated using the reference signal to the base station,
wherein the CSI is measured based on a specific channel state information-reference signal CSI-RS set among a plurality of CSI-RS sets,
wherein each of the plurality of CSI-RS sets is configured with a vertical domain beamforming weight vector differently configured for each of the plurality of CSI-RS sets,
wherein each of the plurality of CSI-RS sets includes a plurality of CSI-reference signals, and
wherein the plurality of CSI-reference signals are generated from for a plurality of horizontal domain antenna ports to which an identical vertical domain beamforming weight vector is applied.

2. The method of claim 1,
wherein the specific CSI-RS set is configured by combining vertical domain antenna ports selected from each of the plurality of CSI-RS sets with each other, and
wherein the vertical domain antenna ports have an identical horizontal domain antenna port index.

3. The method of claim 1,
wherein the specific CSI-RS set is configured in a manner of combining vertical domain antenna ports selected for each of the plurality of CSI-RS sets with each other, and
wherein the vertical domain antenna ports have an index preferred by the user equipment in a predefined codebook.

4. The method of claim 1, wherein the CSI comprises channel state information measured for each of the plurality of CSI-RS sets and channel state information measured by combining specific vertical domain antenna ports among the plurality of CSI-RS sets.

5. The method of claim 4, wherein, if the CSI is measured by combining a plurality of vertical domain antenna ports, the CSI comprises a single precoding matrix index (PMI).

6. The method of claim 1, wherein the CSI comprises an average CSI for all CSI-RS ports associated with the plurality of CSI-RS sets and a channel quality indicator (CQI) for each of the plurality of CSI-RS sets.

7. The method of claim 1, wherein the specific CSI-RS set is configured by antenna ports precoded using a vertical beamforming weight vector.

8. The method of claim 7, wherein the precoded antenna ports correspond to one of UE-specific antenna ports or cell-specific antenna ports.

9. The method of claim 7, wherein the CSI comprises at least one selected from a group consisting of an index of a preferred antenna port, index strength of an antenna port, strength of all measured antenna ports and information on a precoding used for a combination of antenna ports.

10. The method of claim 1, wherein the plurality of CSI-RS sets are configured via Radio Resource Control (RRC) signaling from the base station.

11. A user equipment reporting channel state information (CSI) in a wireless communication system, comprising:
a radio frequency unit; and
a processor, the processor configured to receive a reference signal from a base station, the processor configured to report the CSI generated using the reference signal to the base station,
wherein the CSI is measured based on a specific channel state information-reference signal (CSI-RS) set among a plurality of CSI-RS sets,
wherein each of the plurality of CSI-RS sets is configured with a vertical domain beamforming weight vector differently configured for each of the plurality of CSI-RS sets,
wherein each of the plurality of CSI-RS sets includes a plurality of CSI-reference signals, and
wherein the plurality of CSI-reference signals are generated from a plurality of horizontal domain antenna ports to which an identical vertical domain beamforming weight vector is applied.

* * * * *